(12) United States Patent
Grip et al.

(10) Patent No.: US 12,287,067 B2
(45) Date of Patent: Apr. 29, 2025

(54) SEGMENTED VACUUM JACKETED TANK SYSTEM AND METHOD OF USING THE SAME

(71) Applicant: The Boeing Company, Arlington, VA (US)

(72) Inventors: Robert E. Grip, Rancho Palos Verdes, CA (US); Aaron J. Kutzmann, Long Beach, CA (US); Nathaniel J. Noel, North Charleston, SC (US)

(73) Assignee: The Boeing Company, Arlington, VA (US)

( * ) Notice: Subject to any disclaimer, the term of this patent is extended or adjusted under 35 U.S.C. 154(b) by 107 days.

(21) Appl. No.: 18/336,991

(22) Filed: Jun. 17, 2023

(65) Prior Publication Data

US 2024/0418318 A1   Dec. 19, 2024

(51) Int. Cl.
  *B64D 37/06* (2006.01)
  *B64D 37/30* (2006.01)
  (Continued)

(52) U.S. Cl.
  CPC .............. *F17C 3/08* (2013.01); *B64D 37/06* (2013.01); *B64D 37/30* (2013.01); *F17C 13/083* (2013.01); *F17C 2201/0109* (2013.01); *F17C 2201/0152* (2013.01); *F17C 2201/035* (2013.01); *F17C 2201/054* (2013.01); *F17C 2203/012* (2013.01); *F17C 2203/0391* (2013.01); *F17C 2203/0602* (2013.01); *F17C 2203/0626* (2013.01); *F17C 2203/0639* (2013.01); *F17C 2203/0643* (2013.01); *F17C 2203/0646* (2013.01); *F17C 2203/066* (2013.01); *F17C 2205/0103* (2013.01); *F17C 2221/012* (2013.01); *F17C 2221/033* (2013.01); *F17C 2260/011* (2013.01);
  (Continued)

(58) Field of Classification Search
  CPC ........ B64D 37/04; B64D 37/06; B64D 37/10; F17C 2205/0119; F17C 2205/026; F17C 2203/012
  See application file for complete search history.

(56) References Cited

U.S. PATENT DOCUMENTS 3,243,150 A * 3/1966 Woodcock ................ F17C 3/02
  244/135 R
2017/0254481 A1* 9/2017 Cadogan .................... F17C 3/04
  (Continued)

*Primary Examiner* — Timothy D Collins
*Assistant Examiner* — Justin Michael Heston

(57) ABSTRACT

There is provided a segmented vacuum jacketed tank system. The system includes a segmented structurally integrated vacuum tank having a vacuum tank main portion between vacuum tank end portions. The vacuum tank main portion includes a vacuum tank skin having an outer surface and an inner surface, vacuum tank skin segments, and a longitudinal cross section with a profile geometry configured for buckling prevention for the vacuum tank skin under external pressure loads. The vacuum tank main portion includes multipurpose stiffener member(s) configured to carry one or more of system transport line(s), a liquid fuel, or a nitrogen gas in an interior. The system includes a pressure tank within the segmented structurally integrated vacuum tank. The pressure tank is configured to store a cryogenic fluid and includes a pressure tank main portion between pressure tank end portions. The system further includes a vacuum cavity.

20 Claims, 33 Drawing Sheets

(51) Int. Cl.
*F17C 3/08* (2006.01)
*F17C 13/08* (2006.01)

(52) U.S. Cl.
CPC .................. *F17C 2260/016* (2013.01); *F17C 2270/0189* (2013.01)

(56) References Cited

U.S. PATENT DOCUMENTS

| | | | |
|---|---|---|---|
| 2023/0107610 A1* | 4/2023 | Minas .................... | B64D 37/30 244/153 R |
| 2023/0313946 A1* | 10/2023 | Bergan ..................... | F17C 1/12 220/560.1 |

* cited by examiner

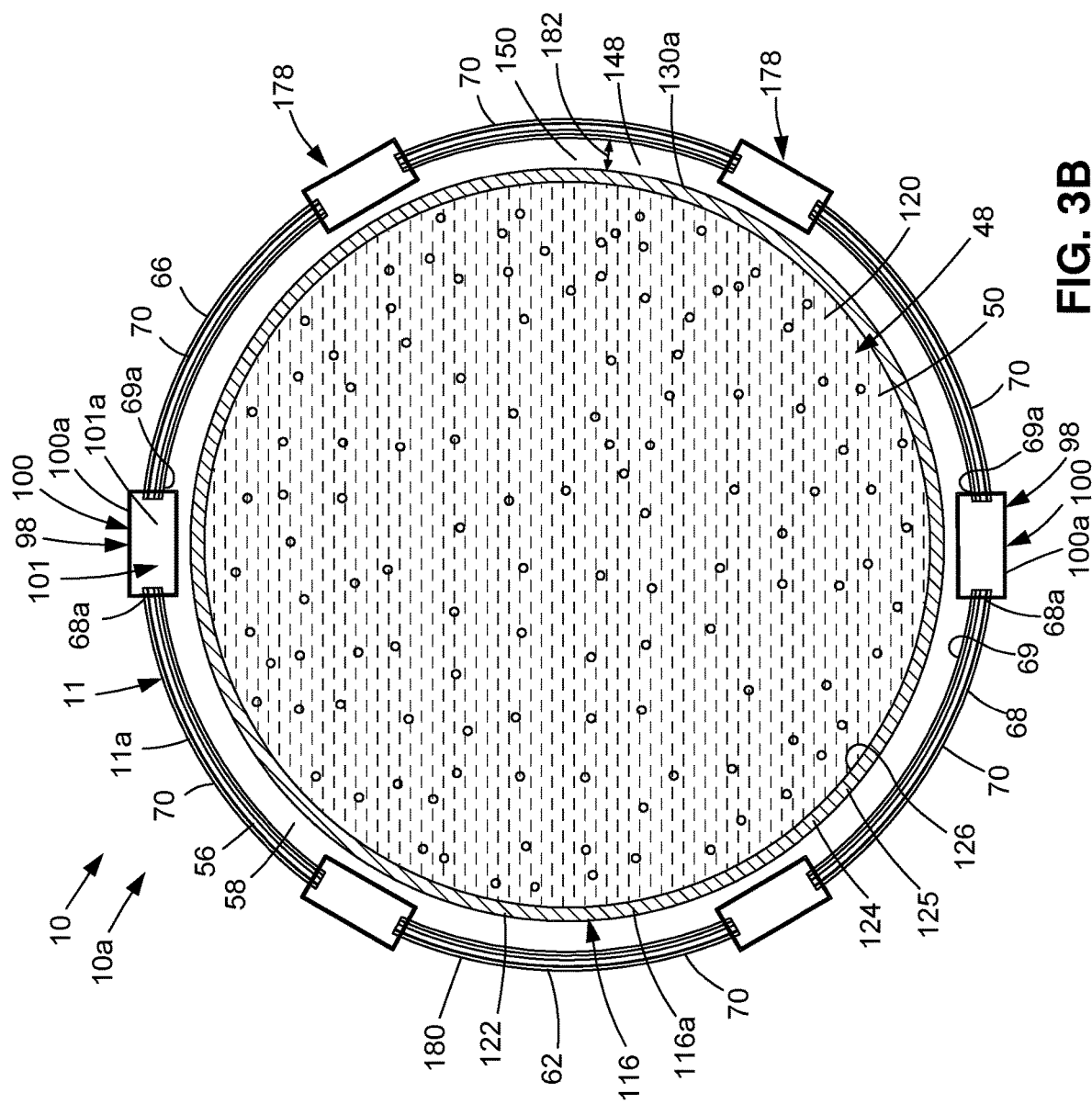

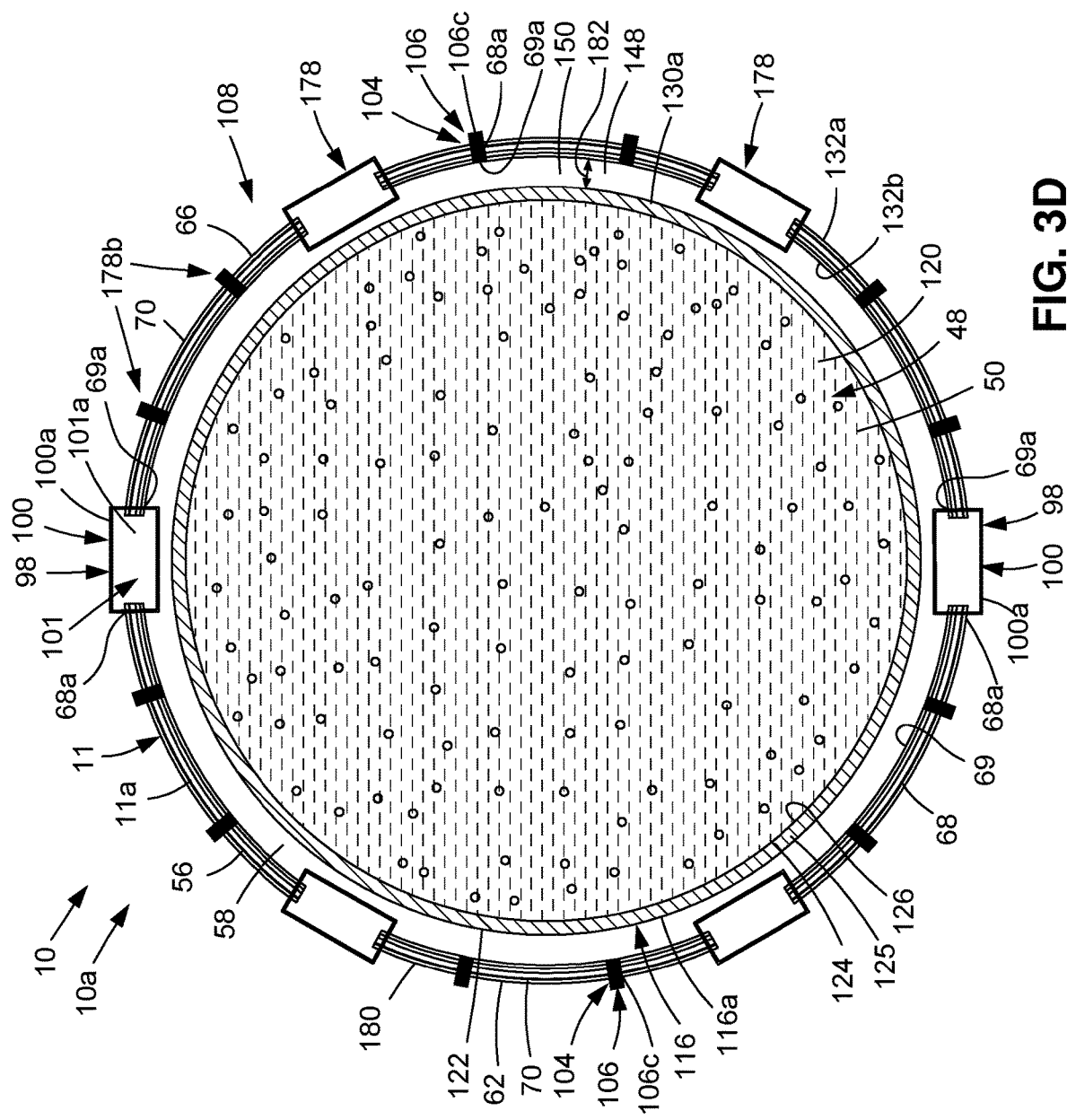

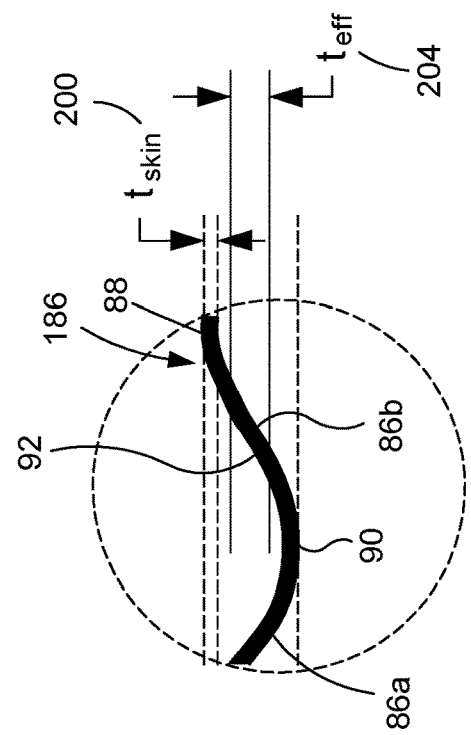
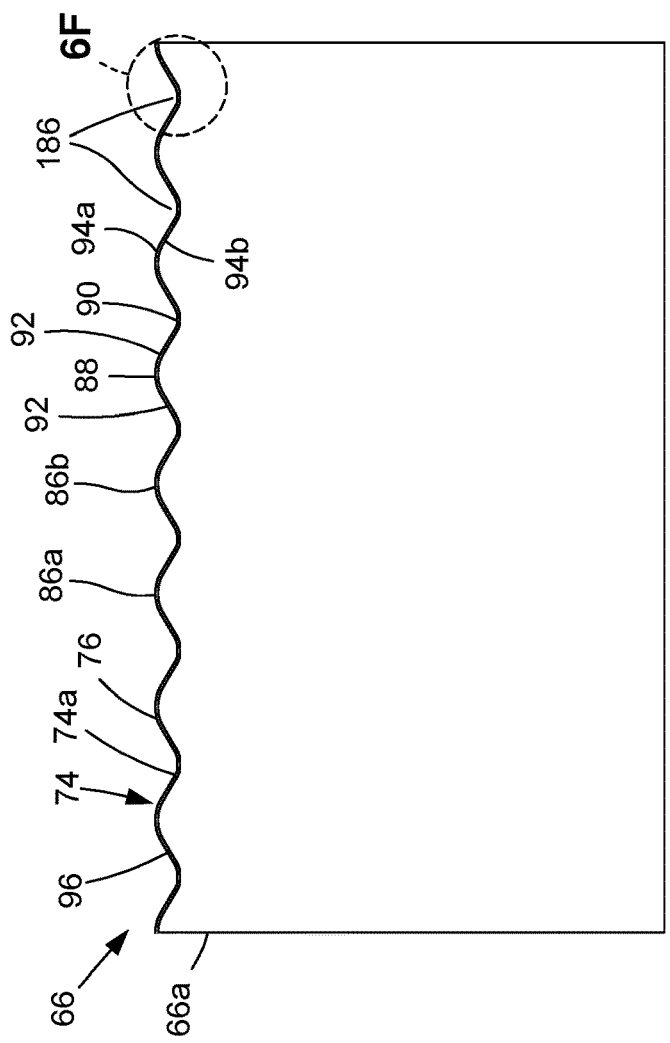
FIG. 6F
FIG. 6E

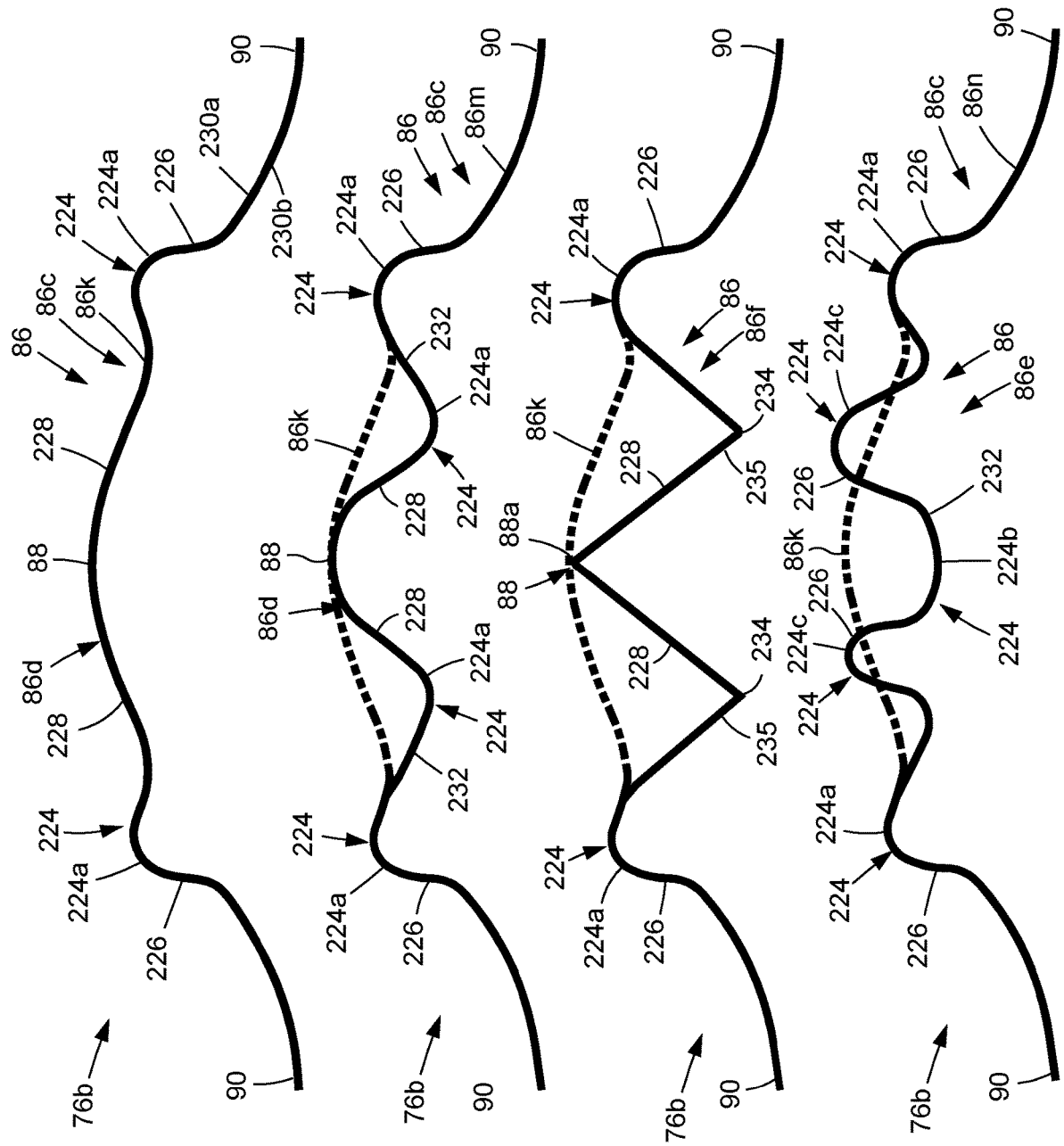

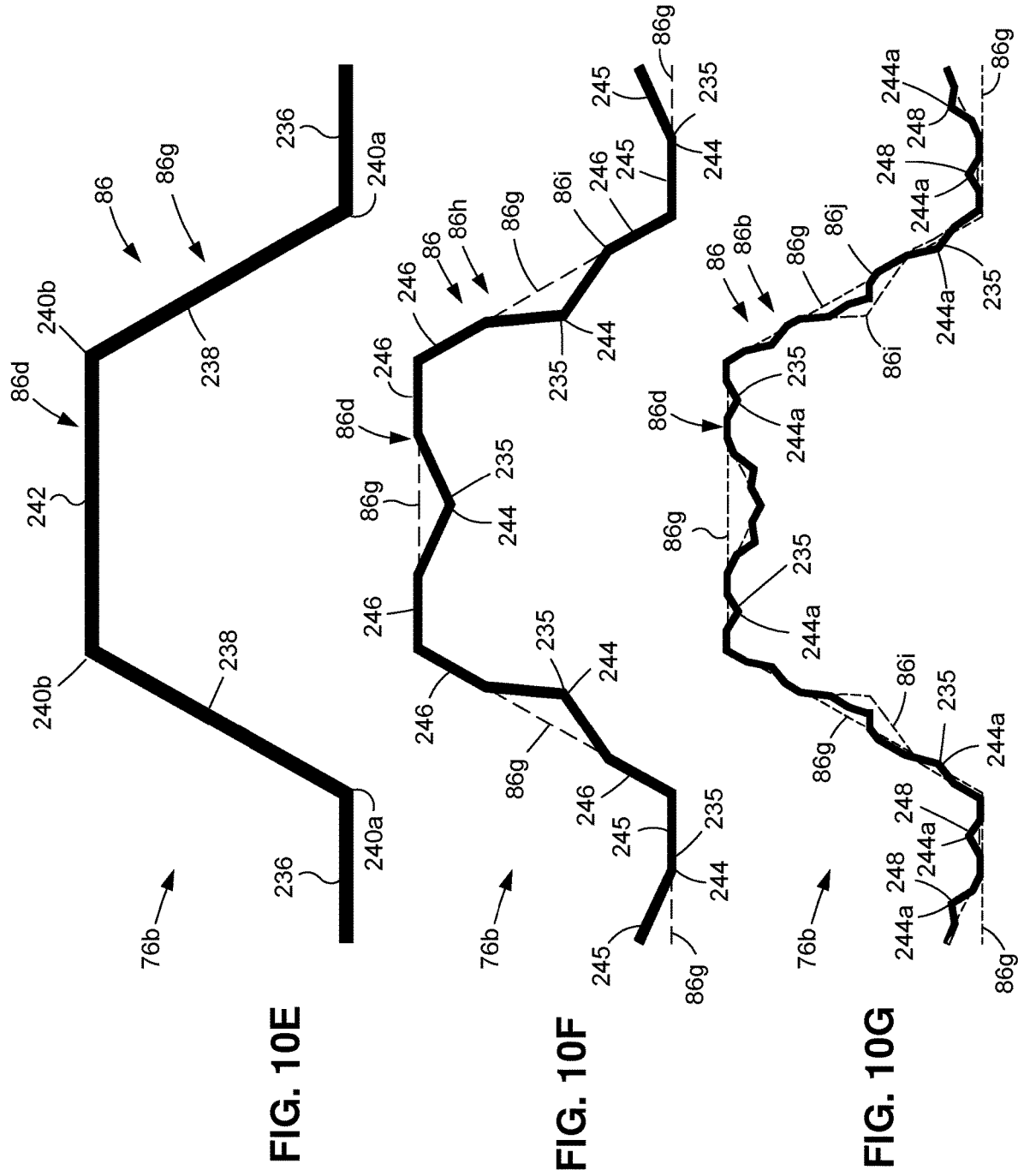

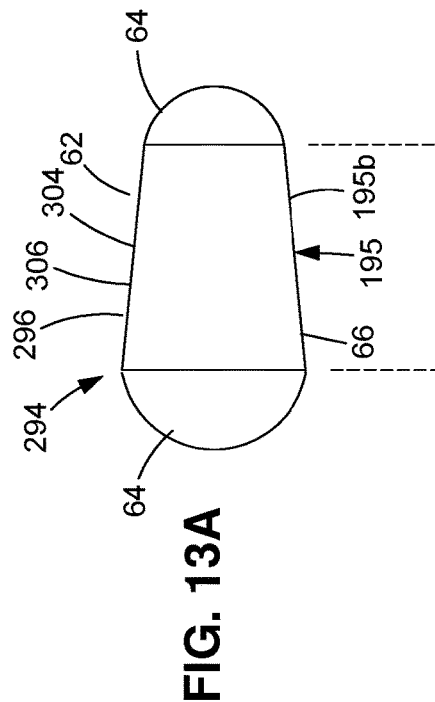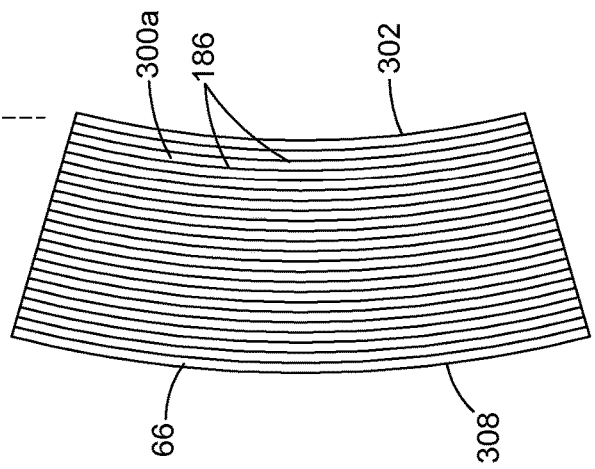
FIG. 13A
FIG. 13B
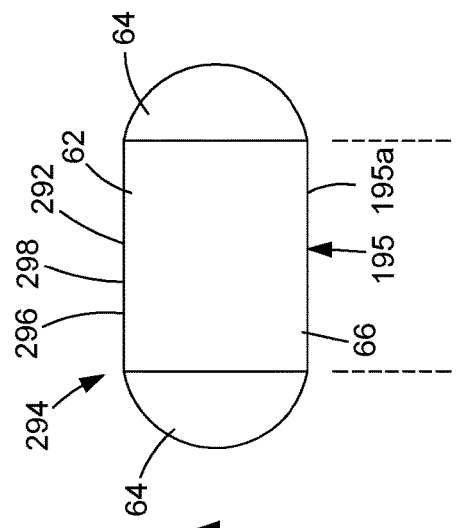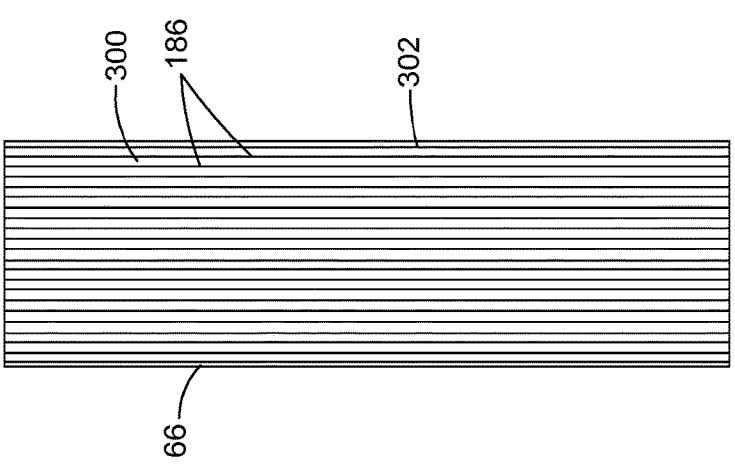
FIG. 12A
FIG. 12B

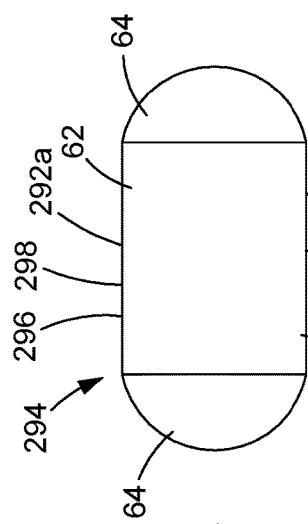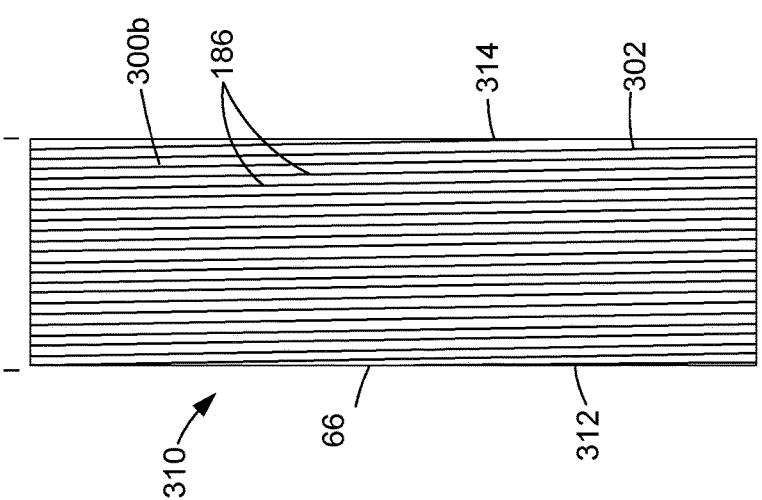

SEGMENTED VACUUM JACKETED TANK SYSTEM AND METHOD OF USING THE SAME

CROSS-REFERENCE TO RELATED APPLICATIONS

This nonprovisional patent application is related to contemporaneously filed U.S. nonprovisional patent application Ser. No. 18/336,989, titled STRUCTURALLY INTEGRATED VACUUM TANK AND METHOD OF USING THE SAME, filed on Jun. 17, 2023, the contents of which are hereby incorporated by reference in their entirety. By mention in this CROSS-REFERENCE TO RELATED APPLICATIONS section, the application 18/336,989 is not admitted to be prior art with respect to this application.

This nonprovisional patent application is also related to contemporaneously filed U.S. nonprovisional patent application Ser. No. 18/336,990, titled TANK SYSTEM HAVING REMOVABLE PLUG ASSEMBLY AND METHOD OF USING THE SAME, filed on Jun. 17, 2023, the contents of which are hereby incorporated by reference in their entirety. By mention in this CROSS-REFERENCE TO RELATED APPLICATIONS section, the application having is not admitted to be prior art with respect to this application having.

This nonprovisional patent application is also related to contemporaneously filed U.S. nonprovisional patent application Ser. No. 18/336,992, titled SYSTEM AND METHOD OF CONTROLLING THE CIRCUMFERENCE OF A PRESSURE TANK MOUNTED WITHIN A VACUUM TANK filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,993, titled SYSTEM AND METHOD OF CONTROLLING THE DEFLECTIONS OF A PRESSURE TANK MOUNTED WITHIN A VACUUM TANK filed on Jun. 17, 2023, the contents of which are hereby incorporated by reference in their entirety. By mention in this CROSS-REFERENCE TO RELATED APPLICATIONS section, the application is not admitted to be prior art with respect to this application.

FIELD

The disclosure relates generally to vacuum tank systems and methods, and more particularly, to segmented vacuum jacketed tank systems and methods for integrating system transport lines for a structure, such as an aircraft, and for maximizing storage of cryogenic fluid in the structure, such as the aircraft.

BACKGROUND

Vehicles and structures, including aircraft, powered with a cryogenic fluid, such as liquid hydrogen or liquid natural gas, typically require storage tanks for such cryogenic fluid that have a significantly larger volume than storage tanks for conventional fuels, such as jet fuel or gasoline, because the cryogenic fluid has a lower density than such conventional fuels. For some aircraft configurations, due to the larger volume required for the cryogenic fluid storage tank or tanks, the fuselage is a preferred location in which to install such tank or tanks. Installing the tank or tanks outside of the fuselage, such as under a wing, or alongside the fuselage, may increase drag.

In addition, the cryogenic fluid, such as liquid hydrogen or liquid natural gas, is typically stored in a cryogenic storage tank at extremely cold temperatures, e.g., 20 degrees Kelvin (−423.4 degrees Fahrenheit) for liquid hydrogen, to prevent the cryogenic fluid from transitioning into its gaseous form. Sufficient thermal insulation is needed around the cryogenic storage tank to prevent the cryogenic liquid from boiling off from heat transferring from ambient air around the vehicle, such as the aircraft, to the cryogenic storage tank.

A known solution exists for thermally insulating a cryogenic storage tank for vehicles and structures, including aircraft. Such known solution may include enclosing a cryogenic storage tank, which is pressurized, within an external vacuum tank or an external vacuum jacket, which is under a vacuum, to form a vacuum jacketed tank system. A vacuum cavity having a sufficient gap clearance is formed between the internal cryogenic storage tank and the external vacuum tank or vacuum jacket.

For a known vacuum jacketed tank system installed in the fuselage of an aircraft, where the fuselage has a typical semi-monocoque structure, the external vacuum tank or vacuum jacket typically requires fuselage structure and structural attachments between the exterior of the external vacuum tank or vacuum jacket and the interior of the fuselage to hold or support the external vacuum tank or vacuum jacket with respect to the fuselage. There is a space of typically 3-5 inches between a loft surface of the fuselage structure and the exterior of the external vacuum tank or vacuum jacket, which is comprised of a clearance between an inner flange of a frame and the external vacuum tank and a depth of the frame itself. Such clearance space is not useful for the external vacuum tank or vacuum jacket. Moreover, the fuselage structure and structural attachments used to hold or support the external vacuum tank or vacuum jacket may increase the overall weight of the aircraft, and may increase the overall part count in manufacturing the aircraft. Further, the volume of the internal cryogenic storage tank and the amount of cryogenic fluid that can be stored in the internal cryogenic storage tank are limited by the size of the external vacuum tank or vacuum jacket surrounding the internal cryogenic storage tank.

In addition, in an aircraft, known external vacuum tanks or vacuum jackets may be attached to stiffener members, such as stringers, for example, standard stringers, that run lengthwise along the aircraft's fuselage. Such standard stringers are typically attached to fuselage frames and bulkheads. The fuselage frames are transverse support members that generally take the form of open rings connected continuously around their peripheries to fuselage skin. Such fuselage frames connected to the standard stringers that are attached to the known external vacuum tanks or vacuum jackets may increase the overall weight of the aircraft, and may increase the overall part count in manufacturing the aircraft.

Moreover, the number of standard stringers may typically include 30-60, or more, standard stringers around a circumference of known external vacuum tanks or vacuum jackets, which may increase the overall part count in manufacturing the aircraft. Further, such standard stringers do not have an interior volume that is designed to be large enough to carry system transport lines, for example, fuel lines, electrical lines, hydraulic lines, pneumatic lines, and the like, for the aircraft, and may not have a sufficient size and depth to equip a bottommost standard stringer with a tail skid against a tail strike by a tail of the aircraft.

In addition, a vacuum tank skin of known external vacuum tanks or vacuum jackets may include a solid panel vacuum tank skin that may be simple and inexpensive to manufacture, or may include a sandwich panel vacuum tank skin that is light in weight since two face sheets provide an increased effective thickness while maintaining the light weight from using thin face sheets. However, the solid panel vacuum tank skin may be heavy since a thickness required for buckling is typically much larger than a thickness required for hoop compression strength. Moreover, the sandwich panel vacuum tank skin may be more expensive and vulnerable to damage compared to a solid panel vacuum tank skin.

Thus, it would be desirable to solve the problem of a separate external vacuum tank that is located and supported by fuselage structure of an aircraft and structural attachments, and that limits the volume of the internal cryogenic storage tank and that limits the amount of cryogenic fluid that can be stored in the internal cryogenic storage tank. Further, it would be desirable to have a solution where stiffener members attached to an external vacuum tank or vacuum jacket do not require attachment to fuselage frames. In addition, it would be desirable to have a solution where fewer stiffener members are used and where the stiffener members have a sufficiently large interior volume to carry system transport lines and where a bottommost stiffener member may be equipped with a tail skid. Further, it would be desirable to have an alternative solution to a solid panel vacuum tank skin and a sandwich panel vacuum tank skin.

Accordingly, there is a need in the art for an improved segmented vacuum jacketed tank system and method that provide an integrated vacuum tank and fuselage structure that eliminates the use of fuselage structural attachments between the vacuum tank and fuselage structure to eliminate a clearance space required between the vacuum tank and the fuselage structure and to result in an improved volume ratio, that provide a single integrated structure that saves weight and cost, that provide a single integrated structure that increases the volume of an internal cryogenic storage tank and an amount of cryogenic fluid that can be stored in the internal cryogenic storage tank and that provide for efficient storage of the cryogenic fluid, that eliminate fuselage frames attached to stiffener members, such as stringers, attached to an external vacuum tank, that decrease the number of stringers and that provide a means for integrating system transport lines for a structure and a means for equipping the improved segmented vacuum jacketed tank with a tail skid, that provide an advantageous solution for a vacuum tank skin, and that provide other advantages over known vacuum tank systems and methods.

SUMMARY

Example implementations of the present disclosure provide a segmented vacuum jacketed tank system and method for a structure. As discussed in the below detailed description, versions of the segmented vacuum jacketed tank system and method may provide significant advantages over known systems and methods.

In a version of the disclosure, there is provided a segmented vacuum jacketed tank system. The segmented vacuum jacketed tank system comprises a segmented structurally integrated vacuum tank having a vacuum tank main portion extending between vacuum tank end portions. The vacuum tank main portion comprises a vacuum tank skin having an outer surface and an inner surface. The vacuum tank skin comprises a plurality of vacuum tank skin segments. The vacuum tank skin has a longitudinal cross section with a profile geometry configured for buckling prevention for the vacuum tank skin under external pressure loads.

The vacuum tank main portion further comprises one or more multipurpose stiffener members, each coupled between two of the plurality of vacuum tank skin segments. The one or more multipurpose stiffener members are configured to carry in an interior of one or more of the one or more multipurpose stiffener members one or more of one or more system transport lines, a nitrogen gas, or a liquid fuel.

The segmented vacuum jacketed tank system further comprises a pressure tank mounted within the segmented structurally integrated vacuum tank. The pressure tank is configured to store a cryogenic fluid and comprises a pressure tank main portion extending between pressure tank end portions. The pressure tank main portion comprises a pressure tank skin having an outer surface and an inner surface. The segmented vacuum jacketed tank system further comprises a vacuum cavity formed between the segmented structurally integrated vacuum tank and the pressure tank.

In another version of the disclosure, there is provided an aircraft. The aircraft comprises a fuselage with a plurality of fuselage barrel sections, and an outer aero skin at a fuselage mold line. The aircraft further comprises a segmented vacuum jacketed tank system.

The segmented vacuum jacketed tank system comprises a segmented structurally integrated vacuum tank integrated with the fuselage. The segmented structurally integrated vacuum tank has a vacuum tank main portion extending between vacuum tank end portions.

The vacuum tank main portion comprises a vacuum tank skin having an outer surface and an inner surface. The vacuum tank skin comprises a plurality of vacuum tank skin segments. The vacuum tank skin has a longitudinal cross section with a profile geometry configured for buckling prevention for the vacuum tank skin under external pressure loads.

The vacuum tank main portion further comprises one or more multipurpose stringers, each coupled between two of the plurality of vacuum tank skin segments and each coupled to the outer aero skin. The one or more multipurpose stringers are configured to carry in an interior of one or more of the one or more multipurpose stringers one or more of one or more system transport lines, a nitrogen gas, or a liquid fuel.

The segmented vacuum jacketed tank system further comprises a pressure tank mounted within the segmented structurally integrated vacuum tank. The pressure tank is configured to store a cryogenic fluid and comprises a pressure tank main portion extending between pressure tank end portions. The pressure tank main portion comprises a pressure tank skin having an outer surface and an inner surface. The segmented vacuum jacketed tank system further comprises a vacuum cavity formed between the segmented structurally integrated vacuum tank and the pressure tank.

In another version of the disclosure, there is provided a method of using a segmented vacuum jacketed tank system in a structure. The method comprises the step of providing the segmented vacuum jacketed tank system.

The segmented vacuum jacketed tank system comprises a segmented structurally integrated vacuum tank integrated with the structure. The segmented structurally integrated vacuum tank has a vacuum tank main portion extending between vacuum tank end portions. The vacuum tank main portion comprises a vacuum tank skin having an outer surface and an inner surface. The vacuum tank skin comprises a plurality of vacuum tank skin segments. The vacuum tank skin has a longitudinal cross section with a profile geometry configured for buckling prevention for the vacuum tank skin under external pressure loads. The vacuum tank main portion further comprises one or more multipurpose stiffener members, each coupled between two of the plurality of vacuum tank skin segments.

The segmented vacuum jacketed tank system further comprises a pressure tank mounted within the segmented structurally integrated vacuum tank. The pressure tank stores a cryogenic fluid and comprises a pressure tank main portion extending between pressure tank end portions. The pressure tank main portion comprises a pressure tank skin having an outer surface and an inner surface. The segmented vacuum jacketed tank system further comprises a vacuum cavity formed between the segmented structurally integrated vacuum tank and the pressure tank.

The method further comprises the step of adding in and through an interior of one or more of the one or more multipurpose stiffener members one or more of one or more system transport lines, a liquid fuel, or a nitrogen gas. The method further comprises the step of using the segmented vacuum jacketed tank system to carry the one or more of the one or more system transport lines, the liquid fuel, or the nitrogen gas, in the structure, and to maximize the volume of the cryogenic fluid stored in the pressure tank.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 3B is an illustration of a cross-sectional front view of an exemplary segmented vacuum jacketed tank system showing multipurpose box stringers coupled to a segmented structurally integrated vacuum tank, and showing a pressure tank containing a cryogenic fluid;

FIG. 3D is an illustration of a cross-sectional front view of yet another exemplary segmented vacuum jacketed tank system showing a hybrid arrangement of multipurpose box stringers and single purpose stringers coupled to a segmented structurally integrated vacuum tank, and showing a pressure tank containing a cryogenic fluid;

FIG. 6E is an illustration of a side view of a corrugated solid skin showing corrugations;

FIG. 6F is an illustration of an enlarged side view of a corrugation shown in circle 6F of FIG. 6E;

FIG. 10A is an illustration of a version of a profile geometry portion of a vacuum tank skin of the disclosure showing a superimposed curves shape;

FIG. 10B is an illustration of another version of a profile geometry portion of a vacuum tank skin of the disclosure showing another superimposed curves shape;

FIG. 10C is an illustration of yet another version of a profile geometry portion of a vacuum tank skin of the disclosure showing a pointed corner shape;

FIG. 10D is an illustration of yet another version of a profile geometry portion of a vacuum tank skin of the disclosure showing a non-symmetrical shape;

FIG. 10E is an illustration of yet another version of a profile geometry portion of a vacuum tank skin of the disclosure showing a hat shape;

FIG. 10F is an illustration of yet another version of a profile geometry portion of a vacuum tank skin of the disclosure showing a first approximately fractal shape;

FIG. 10G is an illustration of yet another version of a profile geometry portion of a vacuum tank skin of the disclosure showing a second approximately fractal shape;

FIG. 12A is an illustration of a schematic side view of an untapered cylinder profile for a vacuum tank;

FIG. 12B is an illustration of a schematic side view of a corrugated flat pattern of a vacuum tank skin of the vacuum tank of FIG. 12A;

FIG. 13A is an illustration of a schematic side view of a tapered cylinder profile for a vacuum tank;

FIG. 13B is an illustration of a schematic side view of a corrugated flat pattern of a vacuum tank skin of the vacuum tank of FIG. 13A;

FIG. 14A is an illustration of a schematic side view of another untapered cylinder profile for a vacuum tank;

FIG. 14B is an illustration of a schematic side view of a corrugated flat pattern with a helix arrangement of a vacuum tank skin of the vacuum tank of FIG. 14A;

Figure 1:
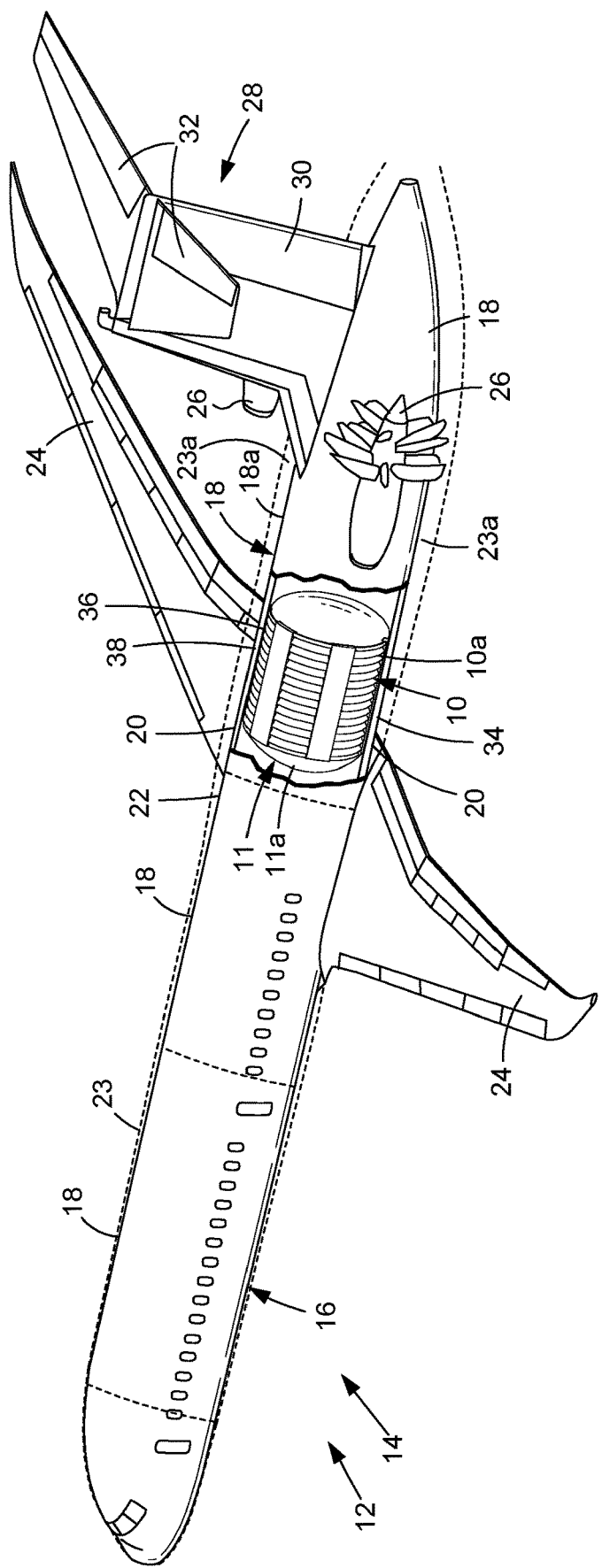
FIG. 1 is an illustration of a perspective view of an exemplary segmented vacuum jacketed tank system of the disclosure implementing an exemplary segmented structurally integrated vacuum tank for a structure in the form of an aircraft.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a perspective view of an exemplary segmented vacuum jacketed tank system 10, such as a segmented structurally integrated vacuum jacketed tank system 10a, implementing an exemplary segmented structurally integrated vacuum tank 11, such as an external segmented structurally integrated vacuum tank 11a, for a structure 12 in the form of an aircraft 14. As shown in FIG. 1, the aircraft 14 comprises a fuselage 16 with a plurality of fuselage barrel sections 18 joined together, and an outer aero skin 20 at a fuselage mold line 22. As shown in FIG. 1, in one version, the segmented structurally integrated vacuum tank 11 is structurally integrated with an aft fuselage barrel section 18a of the fuselage 16. In other versions, the segmented structurally integrated vacuum tank 11 may be structurally integrated with other fuselage barrel sections 18 of the fuselage 16. FIG. 1 further shows a boundary layer 23, including an aft fuselage boundary layer 23a near the exterior of the aft fuselage barrel section 18a. As used herein, "boundary layer" and "aft fuselage boundary layer" mean a thin region of slow moving air next to a bounding surface of a fuselage, including an aft fuselage, of an aircraft that can be a main source of friction drag, and the slow moving air's interaction with the fuselage, including the aft fuselage, induces a no-slip boundary condition of zero velocity at the bounding surface. The flow velocity of the slow moving air increases above the bounding surface until it returns to a bulk flow velocity. As further shown in FIG. 1, the aircraft 14 comprises wings 24, propulsion units 26, and a tail 28. The tail 28 includes a vertical stabilizer 30 (see FIG. 1) and horizontal stabilizers 32 (see FIG. 1). As shown in FIG. 1, the segmented structurally integrated vacuum tank 11 is a single integrated structure 34 that integrates vacuum tank structure 36 and fuselage structure 38, discussed in further detail below, instead of having separate vacuum tank structure and separate fuselage structure.

Figure 2:
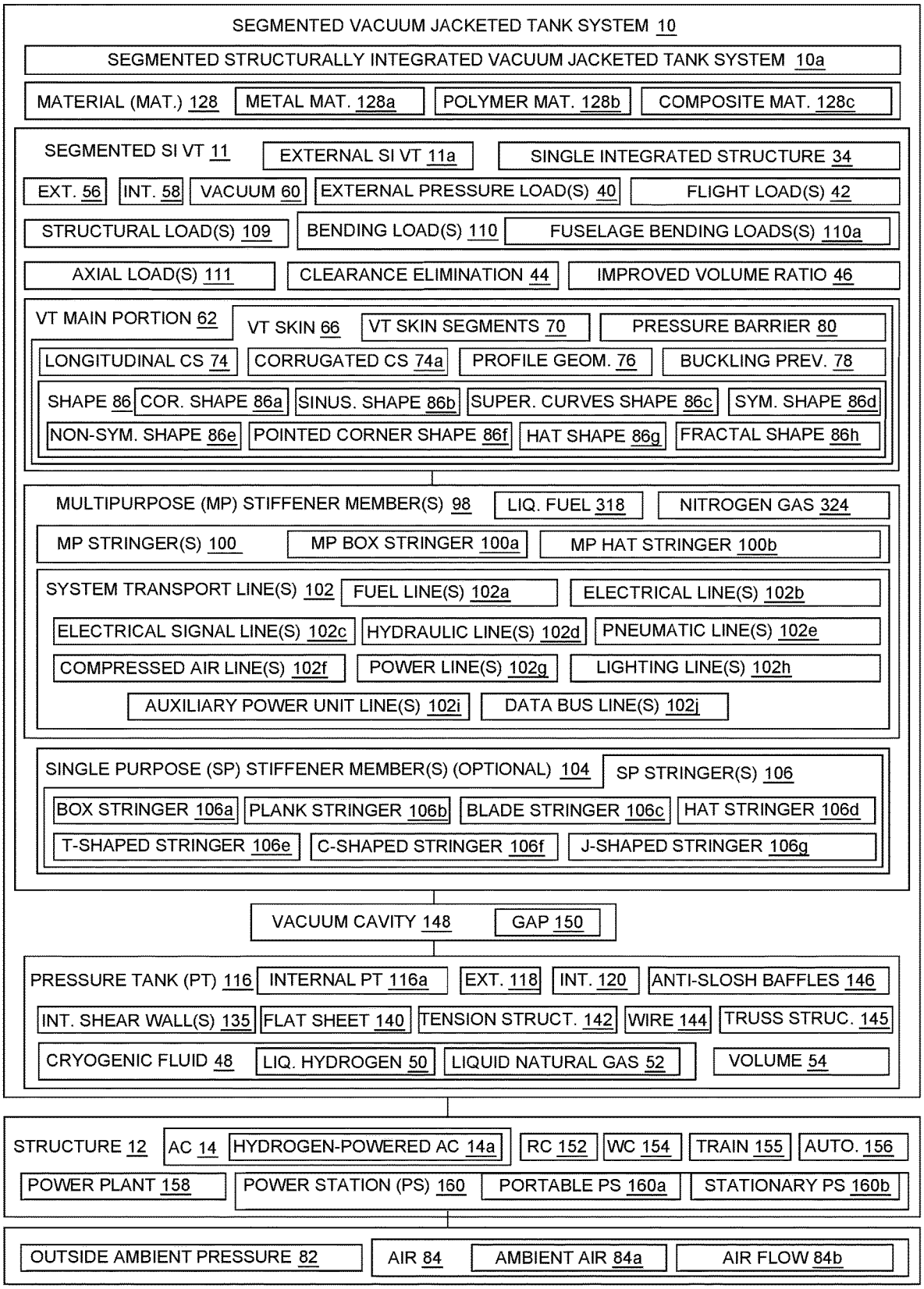
FIG. 2 is an illustration of a block diagram of an exemplary segmented vacuum jacketed tank system of the disclosure for a structure.

Now referring to FIG. 2, FIG. 2 is an illustration of a block diagram of an exemplary segmented vacuum jacketed tank system 10, such as a segmented structurally integrated vacuum jacketed tank system 10a, including an exemplary segmented structurally integrated (SI) vacuum tank (VT) 11, such as an external segmented structurally integrated (SI) vacuum tank (VT) 11a, of the disclosure, for use with, and powering of, an exemplary structure 12, such as an aircraft 14, for example, a hydrogen-powered aircraft 14a. The blocks in FIG. 2 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the segmented vacuum jacketed tank system 10 and the segmented structurally integrated vacuum tank 11 in FIG. 2 are not meant to imply physical or architectural limitations to the manner in which an illustrative example may be implemented. Other components in addition to, or in place of, the ones illustrated may be used. Some components may be unnecessary.

As shown in FIG. 2, the segmented structurally integrated vacuum tank 11 is a single integrated structure 34. The single integrated structure 34 integrates or combines vacuum tank structure 36 (see FIG. 1) with portions of the structure 12, such as a fuselage structure 38 (see FIG. 1) of the fuselage 16 for an aircraft 14. Known vacuum tank arrangements have a separate vacuum tank and a separate fuselage structure, with fuselage structural attachments between the separate vacuum tank and the separate fuselage structure, such as brackets, fittings, or other support structures, that support the separate vacuum tank, and there is a clearance or space between the separate vacuum tank and the separate fuselage structure, for example, a typical space of 3 inches to 5 inches between a loft surface of the fuselage structure and the exterior of the external vacuum tank or vacuum jacket. With the segmented structurally integrated vacuum tank 11 disclosed herein, instead of having a separate vacuum tank that is located and supported by the separate fuselage structure, the vacuum tank structure 36 and the fuselage structure 38 are a single integrated structure 34. The segmented structurally integrated vacuum tank 11 has a dual function of a separate vacuum tank and one of the plurality of fuselage barrel sections 18, for example, the aft fuselage barrel section 18a, but without requiring a separate vacuum tank and a separate fuselage structure arrangement.

As shown in FIG. 2, the segmented structurally integrated vacuum tank 11 comprising the single integrated structure 34 carries external pressure loads 40 and flight loads 42. Further, as shown in FIG. 2, the segmented structurally integrated vacuum tank 11 comprising the single integrated structure 34 provides clearance elimination 44 of the clearance or space between the separate vacuum tank and the separate fuselage structure, such as present with a typical known arrangement. Such clearance elimination 44 results in an improved volume ratio 46 (see FIG. 2) and a greater potential for reduced cost due to the elimination of fuselage structural attachments to support the separate vacuum tank, and a greater potential for reduced cost due to substituting a single integrated structure 34 (see FIG. 2) for two components including a separate vacuum tank and a separate fuselage barrel structure.

Further, the segmented structurally integrated vacuum tank 11 provides for an efficient storage of cryogenic fluid 48 (see FIG. 2), such as liquid hydrogen 50 (see FIG. 2), liquid natural gas 52 (see FIG. 2), or another suitable cryogenic fluid 48, in the structure 12, such as the aircraft 14, for example, in the fuselage 16 of the aircraft 14, without requiring separate fuselage structure and a separate vacuum tank. The segmented structurally integrated vacuum tank 11 maximizes a volume 54 (see FIG. 2) of the cryogenic fluid 48 stored in the structure 12, such as the aircraft 14, for example, in the fuselage 16 of the aircraft 14.

As shown in FIG. 2, the segmented structurally integrated vacuum tank 11 comprises an exterior (EXT.) 56 and an interior (INT.) 58. The interior 58 of the segmented structurally integrated vacuum tank 11 is under a vacuum 60 (see FIG. 2).

Figure 3A:
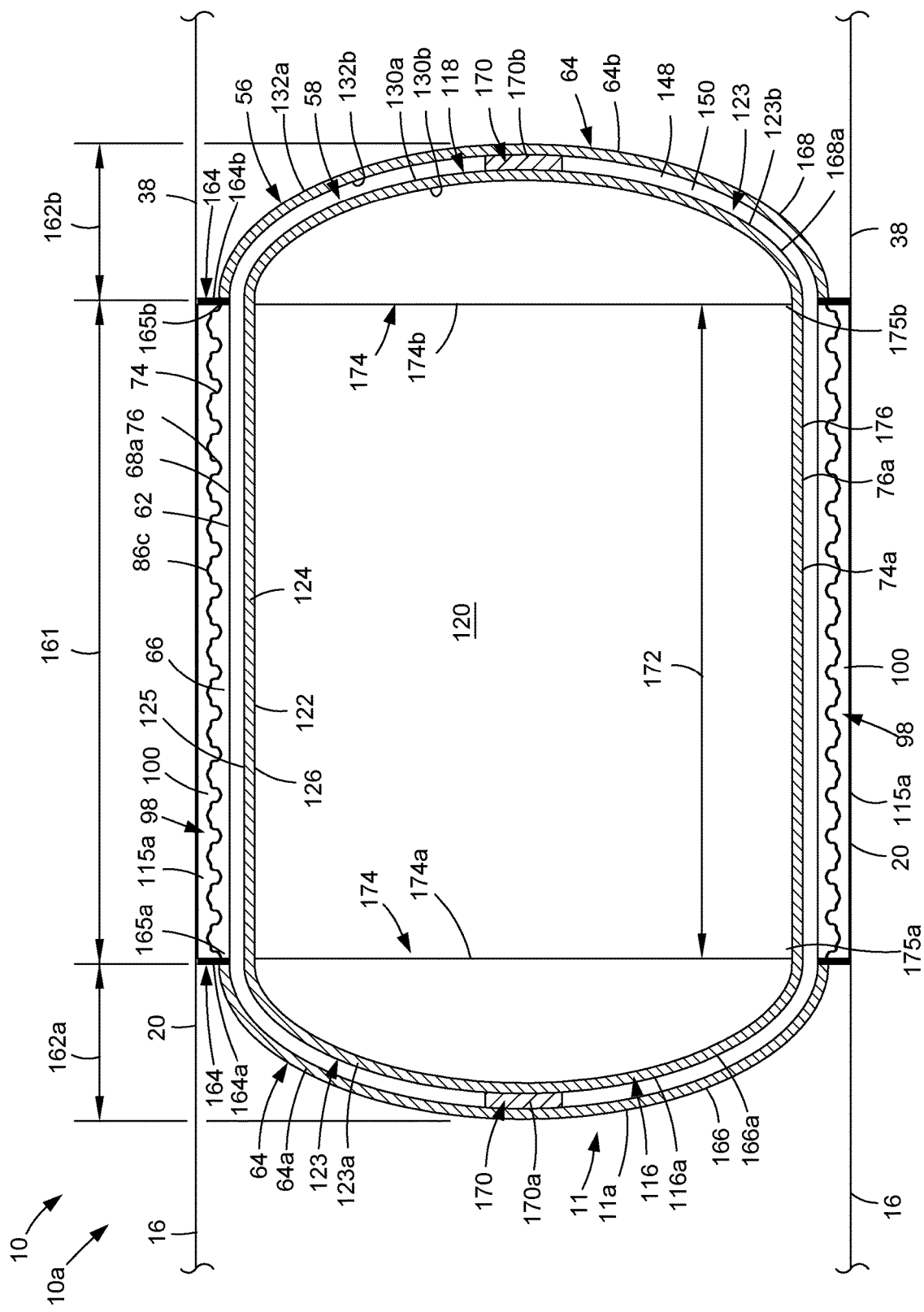
FIG. 3A is an illustration of a cross-sectional side view of an exemplary segmented vacuum jacketed tank system of the disclosure.

The segmented structurally integrated vacuum tank 11, such as the external segmented structurally integrated vacuum tank 11a, further comprises a vacuum tank main portion 62 (see FIG. 3A) extending between vacuum tank end portions 64 (see FIG. 3A), such as a forward vacuum tank end portion 64a (see FIG. 3A) and an aft vacuum tank end portion 64b (see FIG. 3A). The vacuum tank main portion 62 comprises a vacuum tank (VT) skin 66 (see FIGS. 2, 3A) having an outer surface 68 (see FIGS. 3B-3D, 4A-4C, 5A-5C, 7-9) and an inner surface 69 (see FIGS. 3B-3D, 4A-4C, 5A-5C, 7-9).

The vacuum tank skin 66 further comprises a plurality of vacuum tank (VT) skin segments 70 (see FIGS. 2, 3B-3D, 4A-4C, 5A-5C, 7-9), such as vacuum tank skin arc segments 70a (see FIGS. 4A-4C, 5A-5C, 7-9). The vacuum tank skin 66 further has an outer mold line 72 (see FIG. 6A) and an inner mold line 73 (see FIG. 6A). In preferred versions, the vacuum tank skin 66 comprises the plurality of vacuum tank skin segments 70 in a range of two (2) vacuum tank skin segments 70 to eight (8) vacuum tank skin segments 70. In other versions, the vacuum tank skin 66 may have greater than eight (8) vacuum tank skin segments 70.

As shown in FIG. 2, the vacuum tank skin 66 and has a longitudinal cross section (CS) 74, such as in one version a corrugated cross section (CS) 74a, with a profile geometry (GEOM.) 76 configured for buckling prevention (PREV.) 78 for the vacuum tank skin 66 under external pressure loads 40. The longitudinal cross section 74 with the profile geometry 76 is configured to prevent buckling of the vacuum tank skin 66 under external pressure loads 40 and flight loads 42

(see FIG. 2), such as when the structure 12 comprises an aircraft 14. The vacuum tank skin 66 is configured to provide a pressure barrier 80 (see FIG. 2) between an outside ambient pressure 82 (see FIG. 2) and the vacuum 60 in the interior 58 of the segmented structurally integrated vacuum tank 11. The vacuum tank skin 66 carries hoop compression resulting from this pressure difference. Further, the vacuum tank skin 66 carries some flight loads 42 (see FIG. 2), such as fuselage torsion, when the structure 12 (see FIG. 2) comprises an aircraft 14 (see FIG. 2).

The vacuum tank skin 66 comprising the plurality of vacuum tank skin segments 70 is capable of sustaining significant levels of external pressure, such as external pressure loads 40 (see FIG. 2). The vacuum tank skin 66 is designed to withstand external pressure caused by air 84 (see FIG. 2), such as ambient air 84a (see FIG. 2), on the outside of the segmented structurally integrated vacuum tank 11 and the vacuum tank skin 66, and the vacuum 60 (see FIG. 2) inside the interior 58 of the segmented structurally integrated vacuum tank 11. The primary stresses in the segmented structurally integrated vacuum tank 11 are compression in both the longitudinal and the hoop directions.

As shown in FIG. 2, the profile geometry 76 of the longitudinal cross section 74 of the vacuum tank skin 66 has a shape 86 comprising one or more of, a corrugated (COR.) shape 86a, a sinusoidal (SINUS.) shape 86b, a superimposed (SUPER.) curves shape 86c, a symmetrical (SYM.) shape 86d, a non-symmetrical (NON-SYM.) shape 86e, a pointed corner shape 86f, a hat shape 86g, a fractal shape 86h, or another suitable shape. These profile geometries 76 and shapes 86 are discussed in further detail below.

Figure 5A:
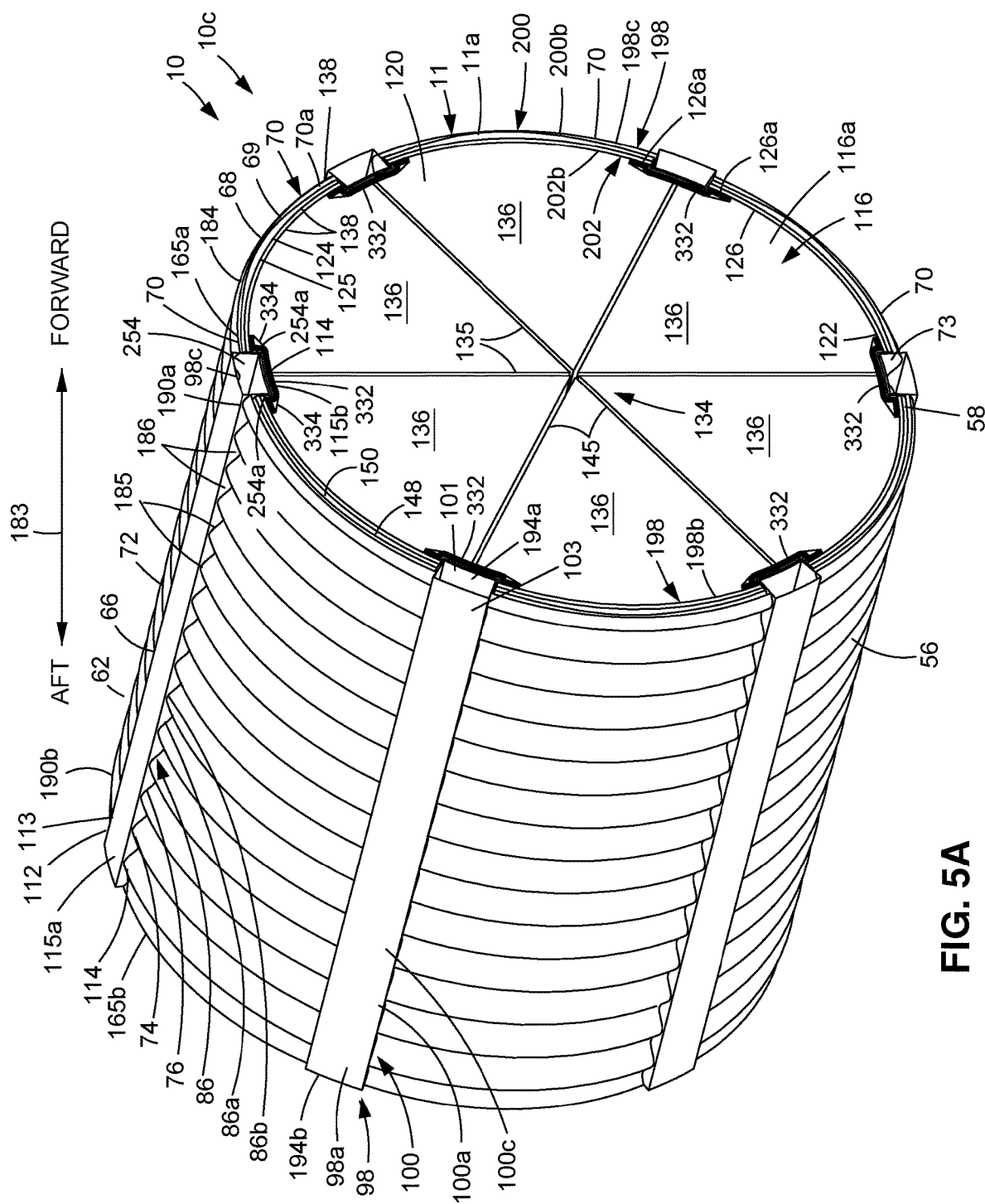
FIG. 5A is an illustration of a front right side perspective view of another version of an exemplary segmented vacuum jacketed tank system of the disclosure in the form of a segmented vacuum jacketed circular and lobed shaped tank system.
Figure 5B:
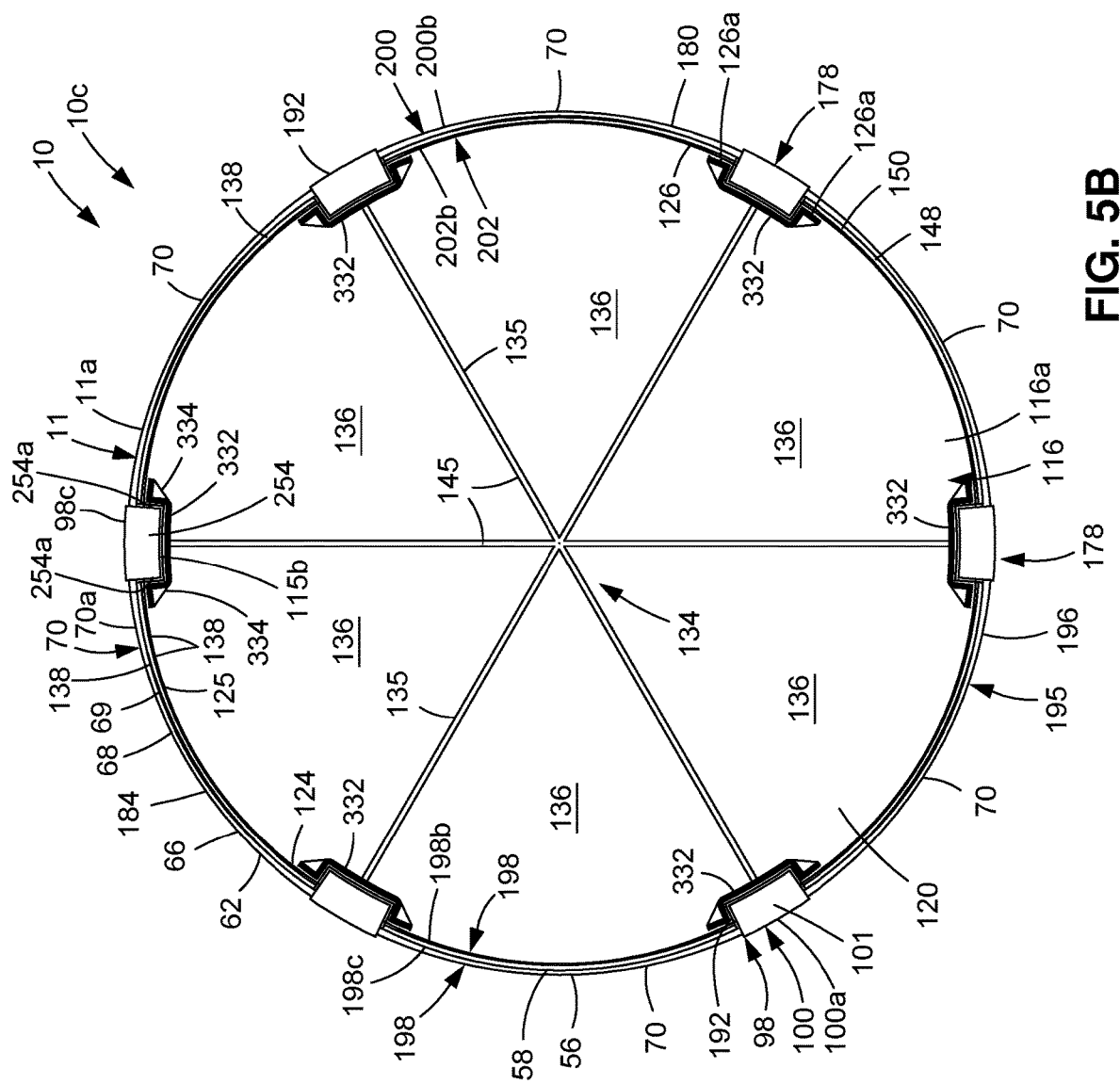
FIG. 5B is an illustration of a front view of the segmented vacuum jacketed tank system of FIG. 5A.
Figure 6A:
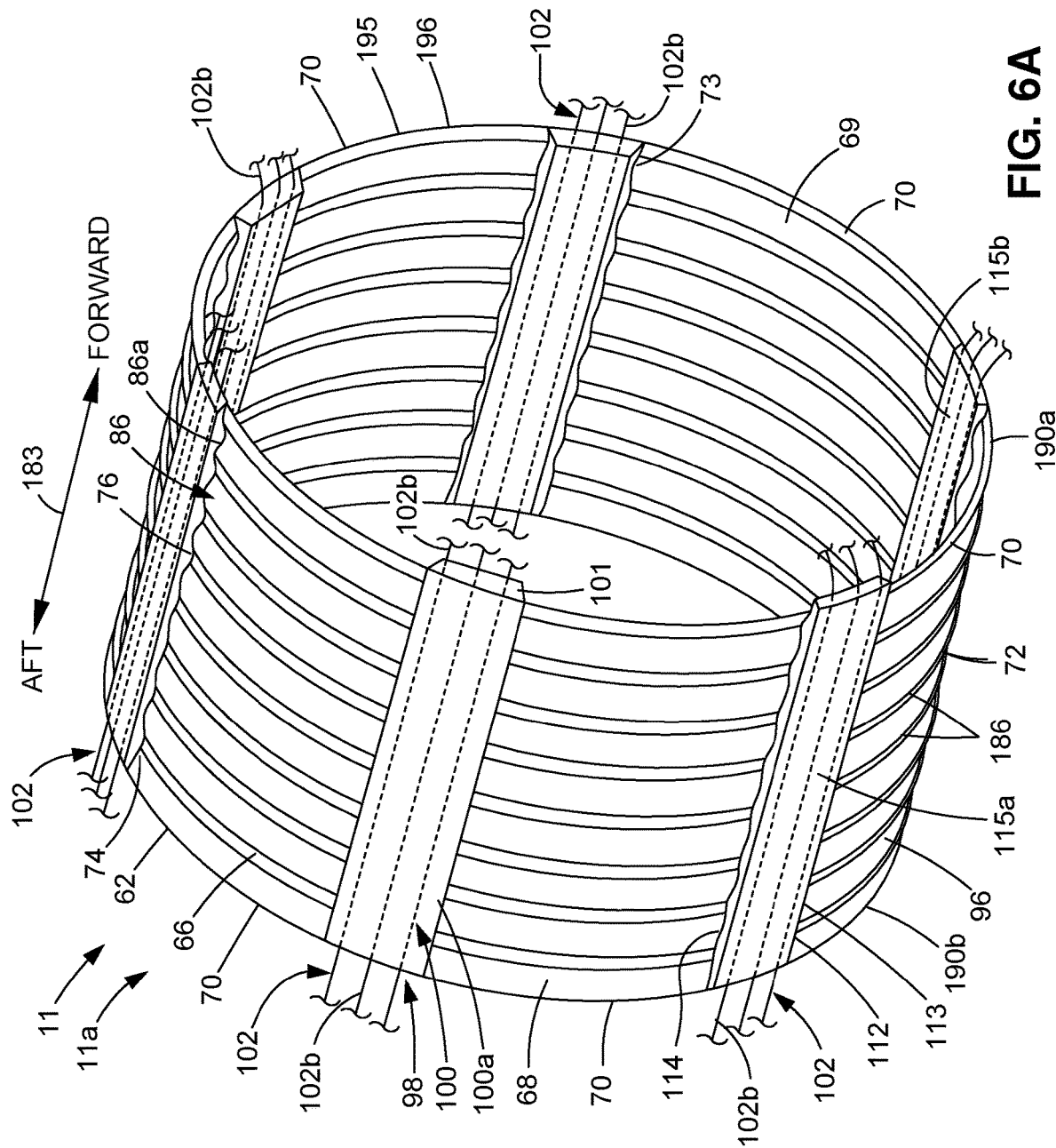
FIG. 6A is an illustration of a front right side perspective view of a version of a segmented structurally integrated vacuum tank with three system transport lines positioned in and through an interior of each multipurpose stiffener member.

In one exemplary version, the longitudinal cross section 74 comprises a corrugated cross section 74a (see FIGS. 2, 6A-6E) and the profile geometry 76 has the corrugated shape 86a (see FIGS. 2, 5B, 6A-6E), such as in the form of the sinusoidal shape 86b (see FIGS. 2, 5B, 6A-6E). As shown in FIG. 6E, the corrugated shape 86a, such as in the form of the sinusoidal shape 86b, has peaks 88 and valleys 90 that alternate, and has a substantially straight portion 92 in between each peak 88 and each valley 90, and the corrugated shape 86a, such as in the form of the sinusoidal shape 86b, has a first side 94a and a second side 94b. As shown in FIG. 6E, in one version, discussed in further detail below, the vacuum tank skin 66 comprises a corrugated solid skin 96, or corrugated solid panel, that combines the advantages of a solid panel and a sandwich panel, such as improved resistance to buckling under hoop compression. A sizing of the vacuum tank skin 66 for thickness and weight is based on a hoop stress and a buckling stress. The hoop stress, or static load condition, that sizes the vacuum tank skin 66 is external pressure load 40 (see FIG. 2). The thickness of the vacuum tank skin 66 is a minimum achievable thickness for a given pressure and radius. It is desirable to arrange the profile geometry 76 of the vacuum tank skin 66 so that the buckling stress is greater than the hoop stress set by the allowable stress.

As shown in FIG. 2, the vacuum tank main portion 62 of the segmented structurally integrated vacuum tank 11 further comprises one or more multipurpose (MP) stiffener members 98, such as one or more multipurpose mega-stiffener members 98a (see FIGS. 4A, 5A), each coupled between two of the plurality of vacuum tank skin segments 70. The one or more multipurpose stiffener members 98 comprise one or more multipurpose (MP) stringers 100 (see FIG. 2), one or more multipurpose beams, one or more multipurpose longitudinal supports, or another suitable multipurpose stiffener members. Where the structure 12 comprises an aircraft 14, the multipurpose stringers 100 may also be referred to as a multipurpose longerons. As shown in FIG. 2, each multipurpose stringer 100 comprises a multipurpose (MP) box stringer 100a, a multipurpose (MP) hat stringer 100b, or another suitable multipurpose stringer. The multipurpose stringer 100 is in the form of a multipurpose mega-stringer 100c (see FIGS. 4A, 5A). In preferred versions, the one or more multipurpose stiffener members 98, such as one or more multipurpose stringers 100, comprise a number in a range of one (1) multipurpose stiffener member 98, such as one (1) multipurpose stringer 100, to eight (8) multipurpose stiffener members 98, such as eight (8) multipurpose stringers 100. In more preferred versions, the one or more multipurpose stiffener members 98, such as one or more multipurpose stringers 100, comprise a number in a range of three (3) multipurpose stiffener members 98, such as three (3) multipurpose stringers 100, to six (6) multipurpose stiffener members 98, such as six (6) multipurpose stringers 100. In other versions, the number of multipurpose stiffener members 98, such as multipurpose stringers 100, may be greater than eight (8), such as nine (9) to twenty (20) multipurpose stiffener members 98, or nine (9) to twenty (20) multipurpose stringers 100, depending on the size of the structure 12 (see FIG. 2). In yet other versions, the number of multipurpose stiffener members 98, such as multipurpose stringers 100, may be greater than twenty (20) multipurpose stiffener members 98, such as twenty (20) multipurpose stringers 100, depending on the size of the structure 12 (see FIG. 2).

The total number, e.g., 2-20 (two to twenty), or greater than twenty (20) of large multipurpose stiffener members 98, such as multipurpose stringers 100, for example, multipurpose mega-stringers 100c, used with the segmented structurally integrated vacuum tank 11 may be much less than the total number, e.g., 30-60 (thirty to sixty), of smaller regular or standard stiffener members or stringers used with known fuselage and tank structures. The multipurpose mega-stiffener members 98a, such as the multipurpose mega-stringers 100c, can be structurally compact. A disadvantage of certain aerospace semi-monocoque structure is that it is thin-gage. Because of the relatively high width-to-thickness ratios, the buckling allowable stresses of those members are some value below the material strength. Concentrating the bending material of the fuselage 16 (see FIG. 1) into fewer stiffener members enables that material to be concentrated into fewer stiffener members, thus allowing the structural feature to have thicker walls. More compact sections, such as with the multipurpose mega-stiffener members 98a, such as the multipurpose mega-stringers 100c, have the potential to be more weight-efficient.

In one version, the multipurpose stiffener members 98, such as the multipurpose stringers 100, for example, the multipurpose mega-stringers 100c, are made of a metal material (MAT.) 128a (see FIG. 2) including steel, stainless steel, aluminum alloy, titanium alloy, copper, copper alloy, or another suitable metal material. The multipurpose stiffener members 98, such as the multipurpose stringers 100, for example, the multipurpose mega-stringers 100c, formed of the metal material 128a can be welded, can include fasteners 264 (see FIG. 11A), or can include other attachment mechanisms. In another version, the multipurpose stiffener members 98, such as the multipurpose stringers 100, for example, the multipurpose mega-stringers 100c, are formed of a composite material (MAT.) 128c (see FIG. 2), including carbon fiber reinforced polymer (CFRP), or another suitable composite material. Carbon composite structures may be laid up and cured in a single step, and in one version, the multipurpose stiffener members 98, such as the multipurpose stringers 100, for example, the multipurpose mega-stringers 100c, may be manufactured with no holes, such as no fastener holes, so fasteners 264 (see FIG. 11A) might not be used. The material 128 (see FIG. 2), such as the metal material 128a or the composite material 128c, used to make the multipurpose stiffener members 98, such as the multipurpose stringers 100, for example, the multipurpose mega-stringers 100c, may the same as or different from the material 128 used to make the vacuum tank skin 66 of the segmented structurally integrated vacuum tank 11. Different coefficients of thermal expansion of the multipurpose stiffener members 98 and the vacuum tank skin 66 may not be an issue because each component carries a different component of load. The multipurpose stiffener members 98, such as the multipurpose stringers 100, for example, the multipurpose mega-stringers 100c, carry fuselage bending loads 110a (see FIG. 2) and axial loads 111 (see FIG. 2), and the vacuum tank skin 66 carries external pressure loads 40 (see FIG. 2), shear load, and torsion load.

Each multipurpose stiffener member 98, such as the multipurpose stringer 100, for example, the multipurpose mega-stringer 100c, has an interior 101 (see FIGS. 3B, 4A, 5A, 7-9). The interior 101 may be part of the segmented structurally integrated vacuum tank 11 (see FIGS. 7-9), or the interior 101 may be raised on the exterior 56 (see FIG. 2) of the segmented structurally integrated vacuum tank 11 and be at outside ambient pressure 82 (see FIG. 2). Further, each multipurpose stiffener member 98, such as the multipurpose stringer 100, for example, the multipurpose mega-stringer 100c, may be a closed section 103 (see FIGS. 4A, 5A), or may be an open section. Any number of shapes may be used to make the multipurpose stiffener members 98, such as the multipurpose stringers 100, for example, the multipurpose mega-stringers 100c, depending on design requirements.

The one or more multipurpose stiffener members 98, such as the one or more multipurpose stringers 100, are configured to carry and hold, and do carry and hold, one or more of one or more system transport lines 102 (see FIG. 2), a liquid fuel 318 (see FIGS. 2, 11D), such as a liquid jet fuel 318a (see FIG. 11D), or a nitrogen gas 324 (see FIGS. 2, 11E), such as an inert nitrogen gas 324a (see FIG. 11E) that is part of a nitrogen gas inerting system 326 (see FIG. 11E), in one or more interior cells 316 (see FIGS. 11D-11G) in an interior 101 (see FIGS. 4A, 5A) of one or more of the one or more multipurpose stiffener members 98, such as the multipurpose stringers 100. The interior 101 of each multipurpose stiffener member 98, such as each multipurpose stringer 100, has an interior volume 101a (see FIGS. 4A, 5A) that is large and preferably hollow and is of a sufficient size and shape to carry and hold one or more system transport lines 102, the liquid fuel 318, such as liquid jet fuel 318a, and/or the nitrogen gas 324, such as the inert nitrogen gas 324a. The interior 101 of each multipurpose stiffener member 98, such as each multipurpose stringer 100, has the one or more interior cells 316 (see FIGS. 11D-11G). For example, in one version, the interior 101 of one or more of the multipurpose stiffener members 98, such as the multipurpose stringers 100, has one interior cell 316 and is in the form of a single interior cell version 317a (see FIG. 11F). In another version, the interior 101 of one or more of the multipurpose stiffener members 98, such as the multipurpose stringers 100, has more than one interior cell 316 and is in the form of a multiple interior cell version 317b (see FIG. 11G), and may include, in one version, a first interior cell 316a (see FIG. 11G), a second interior cell 316b (see FIG. 11G), and a third interior cell 316c (see FIG. 11G), where each interior cell 316 is separated from another interior cell 316 by a wall 330 (see FIG. 11G). In other versions, the interior 101 of one or more of the multipurpose stiffener members 98, such as the multipurpose stringers 100, has two interior cells 316 or more than three interior cell 316.

As shown in FIG. 2, the one or more system transport lines 102 comprise one or more of, one or more fuel lines 102a, one or more electrical lines 102b, one or more electrical signal lines 102c, one or more hydraulic lines 102d, one or more pneumatic lines 102e, one or more compressed air lines 102f, one or more power lines 102g, one or more lighting lines 102h, one or more auxiliary power unit lines 102i, one or more data bus lines 102j, and other suitable system transport lines 102. For aircraft 14 (see FIG. 1), the one or more system transport lines 102 are for various systems on the aircraft 14, for example, electrical systems, hydraulic systems, pneumatic systems, environmental systems, and other suitable systems. For aircraft 14, the multipurpose stiffener members 98, such as the multipurpose stringers 100, allow the one or more system transport lines 102 to run from a forward location forward of the multipurpose stiffener members 98, such as the multipurpose stringers 100, and forward of the segmented structurally integrated vacuum tank 11, through the interior 101 of the multipurpose stiffener members 98, such as the multipurpose stringers 100, and to an aft location aft of the multipurpose stiffener members 98, such as the multipurpose stringers 100, and aft of the segmented structurally integrated vacuum tank 11, such as to the tail 28 (see FIG. 1) of the aircraft 14. The multipurpose stiffener members 98, such as the multipurpose stringers 100, allow systems in the tail 28 (see FIG. 1) of an aircraft 14 (see FIG. 1) to be connected to systems elsewhere on the aircraft 14, by allowing the one or more system transport lines 102 connecting the systems in the tail 28 to the systems elsewhere on the aircraft 14 to run in and through the interior 101 of the multipurpose stiffener members 98, such as the multipurpose stringers 100. The multipurpose stiffener members 98, such as the multipurpose stringers 100, may also offer a degree of protection for those systems and for the system transport lines 102.

In addition, as discussed in detail below with respect to FIG. 7, for aircraft 14, one of the multipurpose stiffener members 98 may comprise a bottommost centered multipurpose stiffener member 98b (see FIG. 7) equipped with a tail skid attachment fitting 206 (see FIG. 7) coupled to an exterior side 115a (see FIG. 7) of the bottommost centered multipurpose stiffener member 98b. A tail skid 207 (see FIG. 7) may be coupled, or attached, to the tail skid attachment fitting 206. The tail skid 207 is used against, or to prevent, a tail strike which occurs when the tail 28 (see FIG. 1) of the aircraft 14 (see FIG. 1) strikes the ground or other stationary object on takeoff or landing of the aircraft 14. The bottommost centered multipurpose stiffener member 98b provides an optimum location to position and attach the tail skid attachment fitting 206 and the tail skid 207 coupled, or attached, to the tail skid attachment fitting 206.

As shown in FIG. 2, the segmented vacuum jacketed tank system 10 may further optionally comprise one or more single purpose (SP) stiffener members 104 coupled to one or more of the outer surfaces 68 of the plurality of vacuum tank skin segments 70, or coupled to one or more of the outer surfaces 68 and one or more of the inner surfaces 69 of the vacuum tank skin segments 70. The one or more single purpose stiffener members 104 comprise one or more single purpose (SP) stringers 106 (see FIG. 2), one or more single purpose beams, one or more single purpose longitudinal supports, or other suitable single purpose stiffener members. As shown in FIG. 2, each single purpose stringer 106 comprises a box stringer 106*a*, a plank stringer 106*b*, a blade stringer 106*c*, a hat stringer 106*d*, a T-shaped stringer 106*e*, a C-shaped stringer 106*f*, a J-shaped stringer 106*g*, or another suitable single purpose stringer, such as an I-shaped stringer, an L-shaped stringer, or a U-shaped stringer. In one version, the single purpose stiffener members 104, such as the single purpose stringers 106, may be all of the same type of single purpose stiffener members 104, such as single purpose stringers 106. In other versions, the single purpose stiffener members 104, such as the single purpose stringers 106, may be two or more different types of single purpose stiffener members 104, such as single purpose stringers 106. In one version, the single purpose stiffener members 104, such as the single purpose stringers 106, are all the same size. In other versions, the single purpose stiffener members 104, such as the single purpose stringers 106, are not all the same size and one or more may be different sizes.

In one version, the one or more single purpose stiffener members 104, such as the one or more single purpose stringers 106, comprise a number in a range of one (1) single purpose stiffener member 104, such as one (1) single purpose stringer 106, to one hundred (100) single purpose stiffener members 104, such as one hundred (100) single purpose stringers 106 coupled to one or more of the outer surfaces 68 of the plurality of vacuum tank skin segments 70. In another version, the one or more single purpose stiffener members 104, such as one or more single purpose stringers 106, comprise a number in a range of six (6) single purpose stiffener members 104, such as six (6) single purpose stringers 106, to sixty (60) single purpose stiffener members 104, such as sixty (60) single purpose stringers 106. In yet another versions, the one or more single purpose stiffener members 104, such as one or more single purpose stringers 106, comprise a number in a range of six (6) single purpose stiffener members 104, such as six (6) single purpose stringers 106, to thirty (30) single purpose stiffener members 104, such as thirty (30) single purpose stringers 106. The number of single purpose stiffener members 104, such as single purpose stringers 106, used may depend on the size of the structure 12 (see FIG. 2) and may depend on the number of multipurpose stiffener members 98, such as the number of multipurpose stringers 100, used.

Figure 3C:
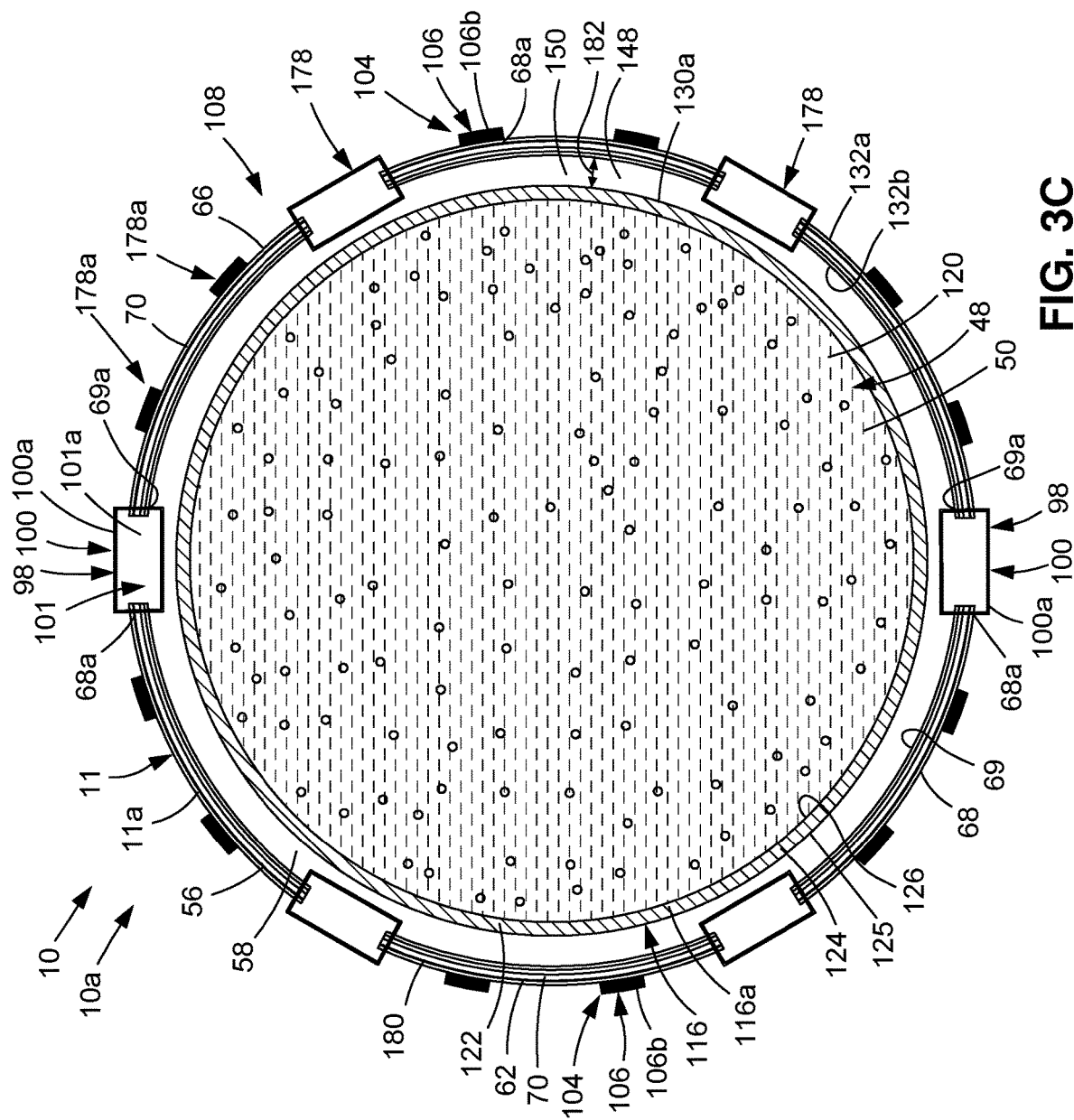
FIG. 3C is an illustration of a cross-sectional front view of another exemplary segmented vacuum jacketed tank system showing a hybrid arrangement of multipurpose box stringers and single purpose stringers coupled to a segmented structurally integrated vacuum tank, and showing a pressure tank containing a cryogenic fluid.

The combination of the multipurpose stiffener members 98, such as the multipurpose stringers 100, and the single purpose stiffener members 104, such as the single purpose stringers 106, comprises a hybrid arrangement 108 (see FIGS. 3C-3D).

The vacuum tank skin 66 and the multipurpose stiffener members 98, such as the multipurpose stringers 100, and if present, the single purpose stiffener members 104, such as the single purpose stringers 106, are configured to carry structural load(s) 109 (see FIG. 2). The structural load(s) 109 can include axial load(s) 111 (see FIG. 2), which enable the fuselage 16 (see FIG. 1) to carry fuselage bending load(s) 110*a* (see FIG. 2) and axial load(s) 111 (see FIG. 2) such as tension or compression, or torsion load(s). For aircraft 14 (see FIG. 1), the multipurpose stiffener members 98, such as the multipurpose stringers 100, are designed and sized to carry axial loads 111, which enable the fuselage 16 (see FIG. 1) to carry fuselage bending loads 110*a* (see FIG. 2) carried by the aft fuselage barrel section 18*a* (see FIG. 1) of the fuselage 16 (see FIG. 1). The axial load capability of the multipurpose stiffener members 98, such as the multipurpose stringers 100, and if present, the single purpose stiffener members 104, such as the single purpose stringers 106, enables the fuselage 16 to carry fuselage bending loads 110*a*.

The vacuum tank skin 66 alone is unable to carry the longitudinal loads, which enable the fuselage 16 (see FIG. 1) to carry the fuselage bending loads 110*a*, as it is a mechanism and may collapse and compress or expand similar to an accordion. However, combining the large multipurpose stiffener members 98, such as the multipurpose stringers 100, with the vacuum tank skin 66 provides sufficient stiffness to carry bending loads 110, and for aircraft 14 (see FIG. 1), fuselage bending loads 110*a*. The multipurpose stiffener members 98, such as the multipurpose stringers 100, and if present, the single purpose stiffener members 104, such as the single purpose stringers 106, also carry the longitudinal load and locally stiffen the vacuum tank skin 66 in the area of the multipurpose stiffener members 98, such as the multipurpose stringers 100, and if present, the single purpose stiffener members 104, such as the single purpose stringers 106, so that there is an effective width phenomenon occurring. Thus, the vacuum tank skin 66 carries external pressure loads 40 and flight loads 42, and the multipurpose stiffener members 98, such as the multipurpose stringers 100, and if present, the single purpose stiffener members 104, such as the single purpose stringers 106, carry flight loads 42 by means of carrying a small portion of the longitudinal load carried by the combination of the vacuum tank skin 66 and the multipurpose stiffener members 98, such as the multipurpose stringers 100, and if present, the single purpose stiffener members 104, such as the single purpose stringers 106. The effective width phenomenon is only active if the single purpose stringers 106 are substantially continuously attached to the vacuum tank skin 66 in the longitudinal direction. Single purpose stringers 106 such as blade stringers 106*c* (see FIG. 3D) function this way, but the plank stringers 106*b* (see FIG. 3C) do not as the plank stringers 106*b* would likely be attached to the vacuum tank skin 66 only at the crest locations.

The multipurpose stiffener members 98, such as the multipurpose stringers 100, and if present, the single purpose stiffener members 104, such as the single purpose stringers 106, locally stiffen the vacuum tank skin 66 in the area of the multipurpose stiffener members 98, such as the multipurpose stringers 100, and if present, the single purpose stiffener members 104, such as the single purpose stringers 106, so that a narrow portion of the vacuum tank skin 66 carries some of the longitudinal load. In the field, this additional capacity of the vacuum tank skin 66 to carry load in this direction is called the "effective width phenomenon". Because the vacuum tank skin 66 has a corrugated shape 86*a*, this phenomenon may be less than if the vacuum tank skin 66 radius did not vary with the longitudinal position.

Figure 4A:
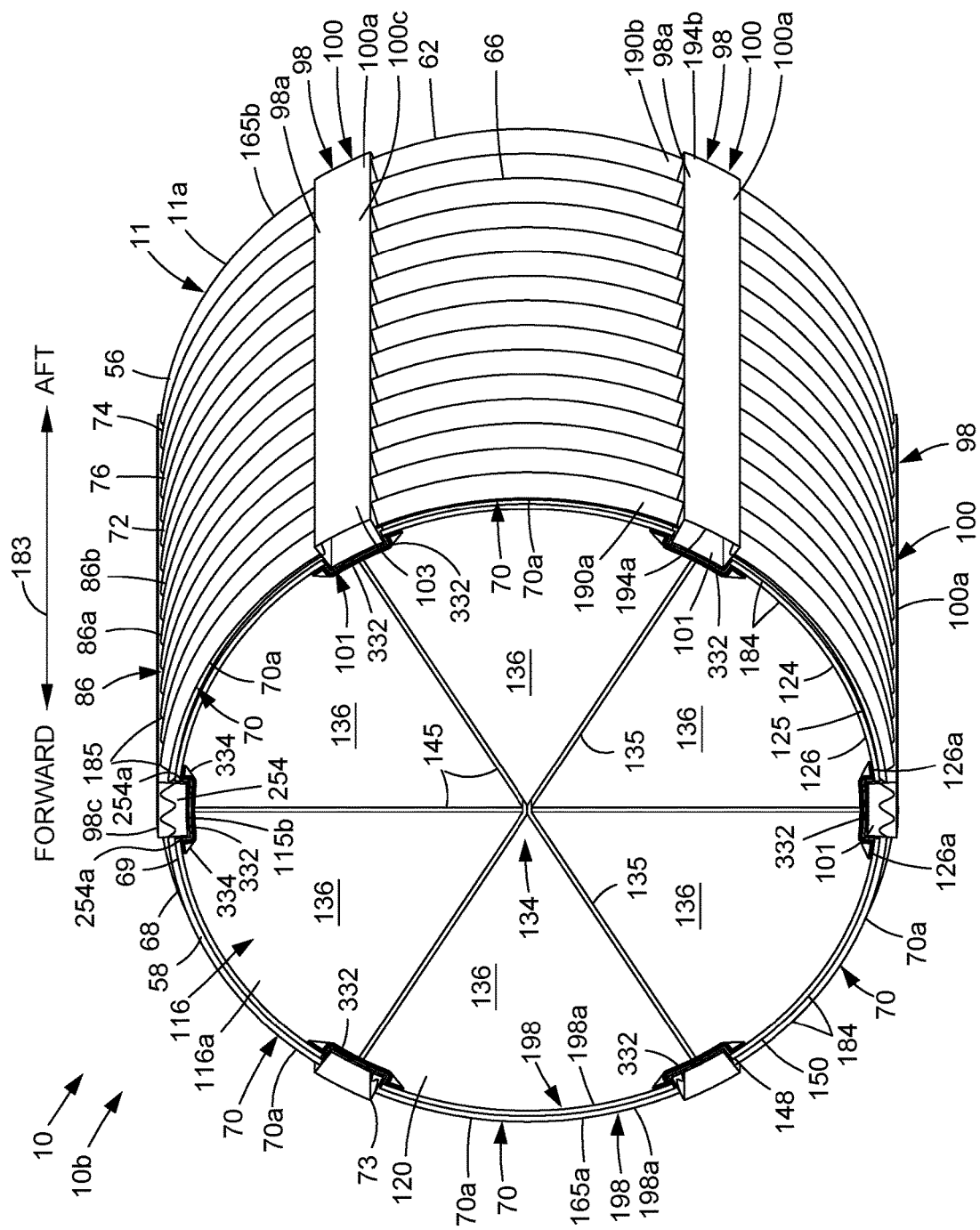
FIG. 4A is an illustration of a front left side perspective view of a version of an exemplary segmented vacuum jacketed tank system of the disclosure in the form of a segmented vacuum jacketed circular shaped tank system.
Figure 4B:
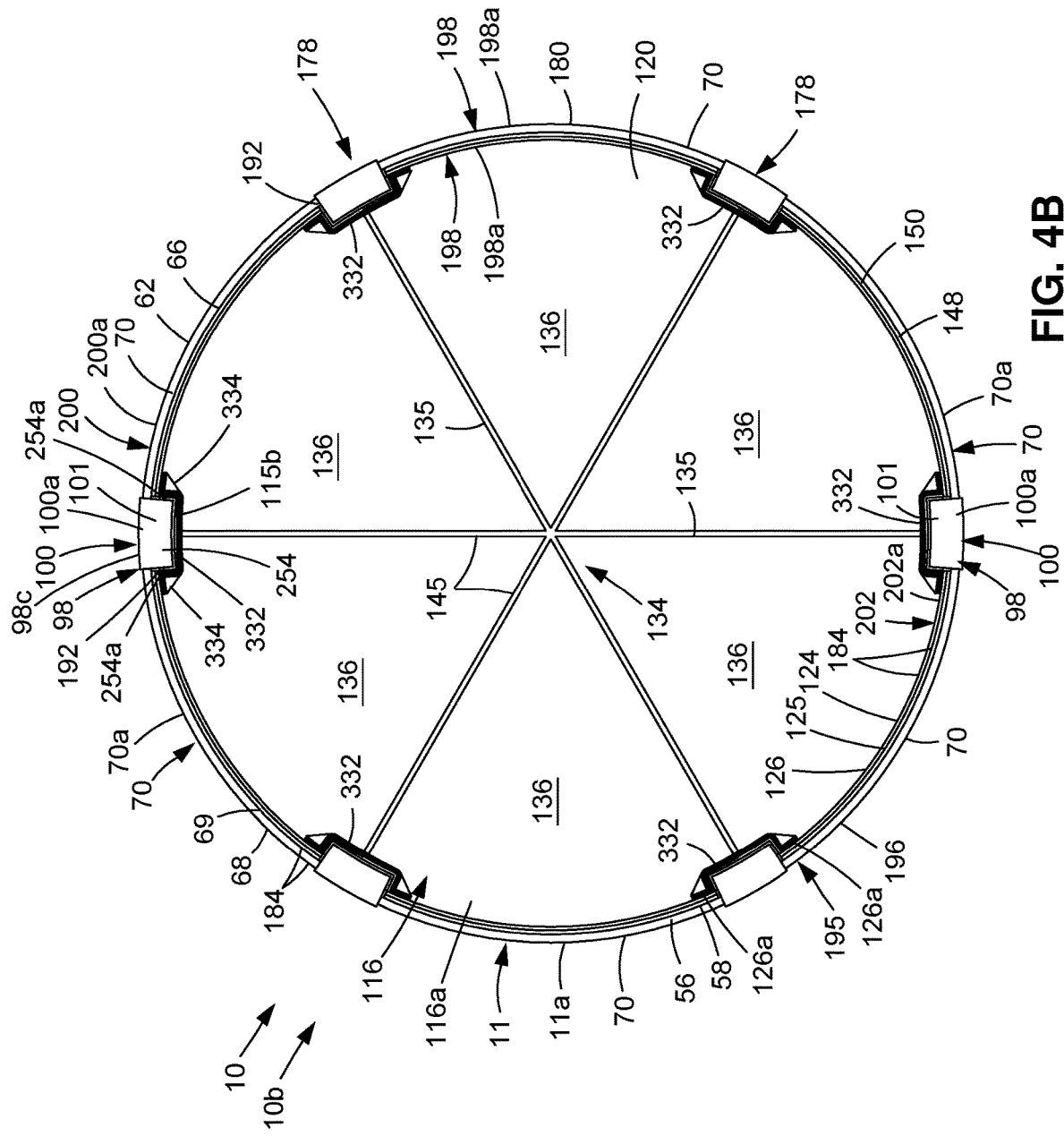
FIG. 4B is an illustration of a front view of the segmented vacuum jacketed tank system of FIG. 4A.
Figure 4C:
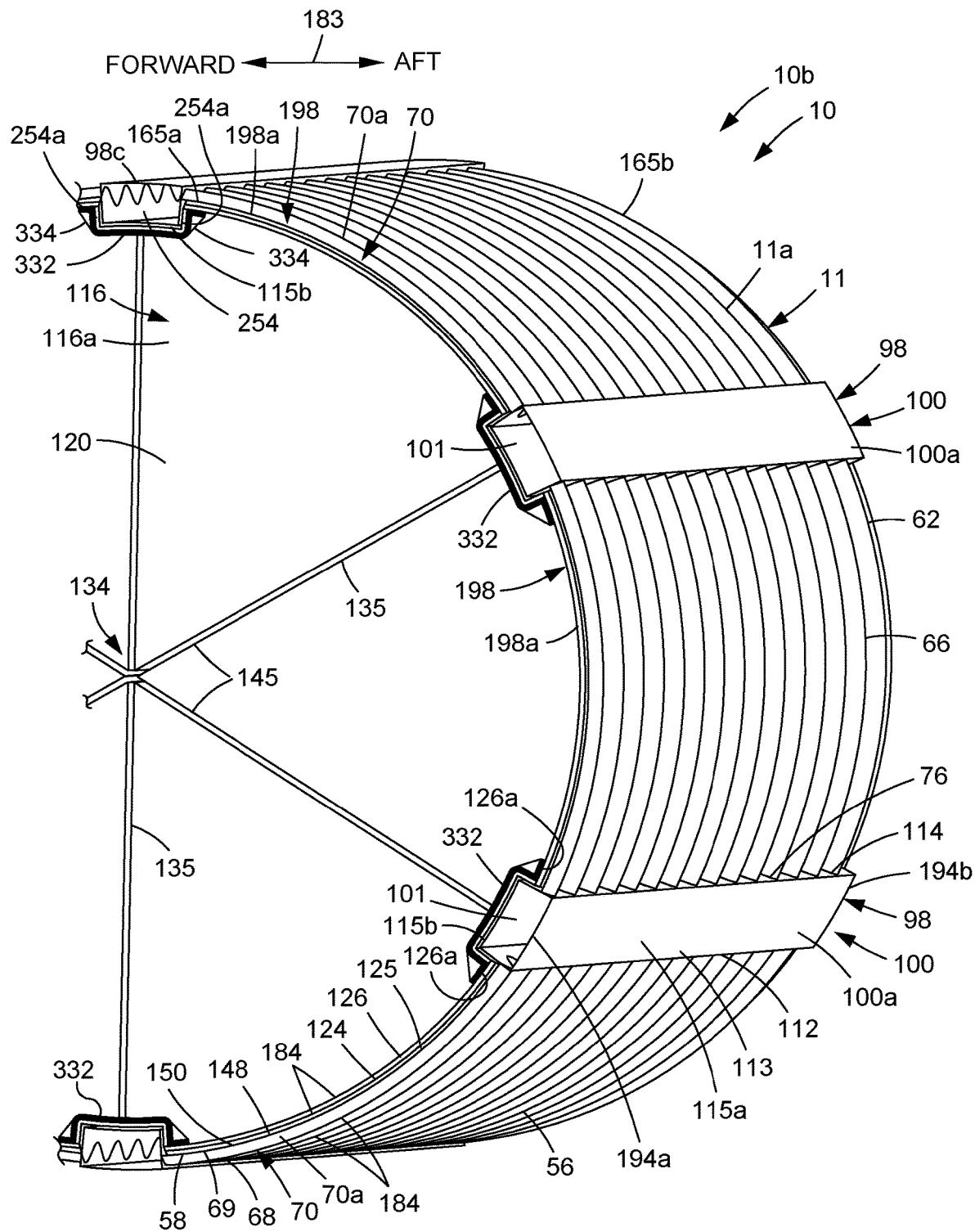
FIG. 4C is an illustration of an enlarged partial front left side perspective view of the segmented vacuum jacketed tank system of FIG. 4A.
Figure 11A:
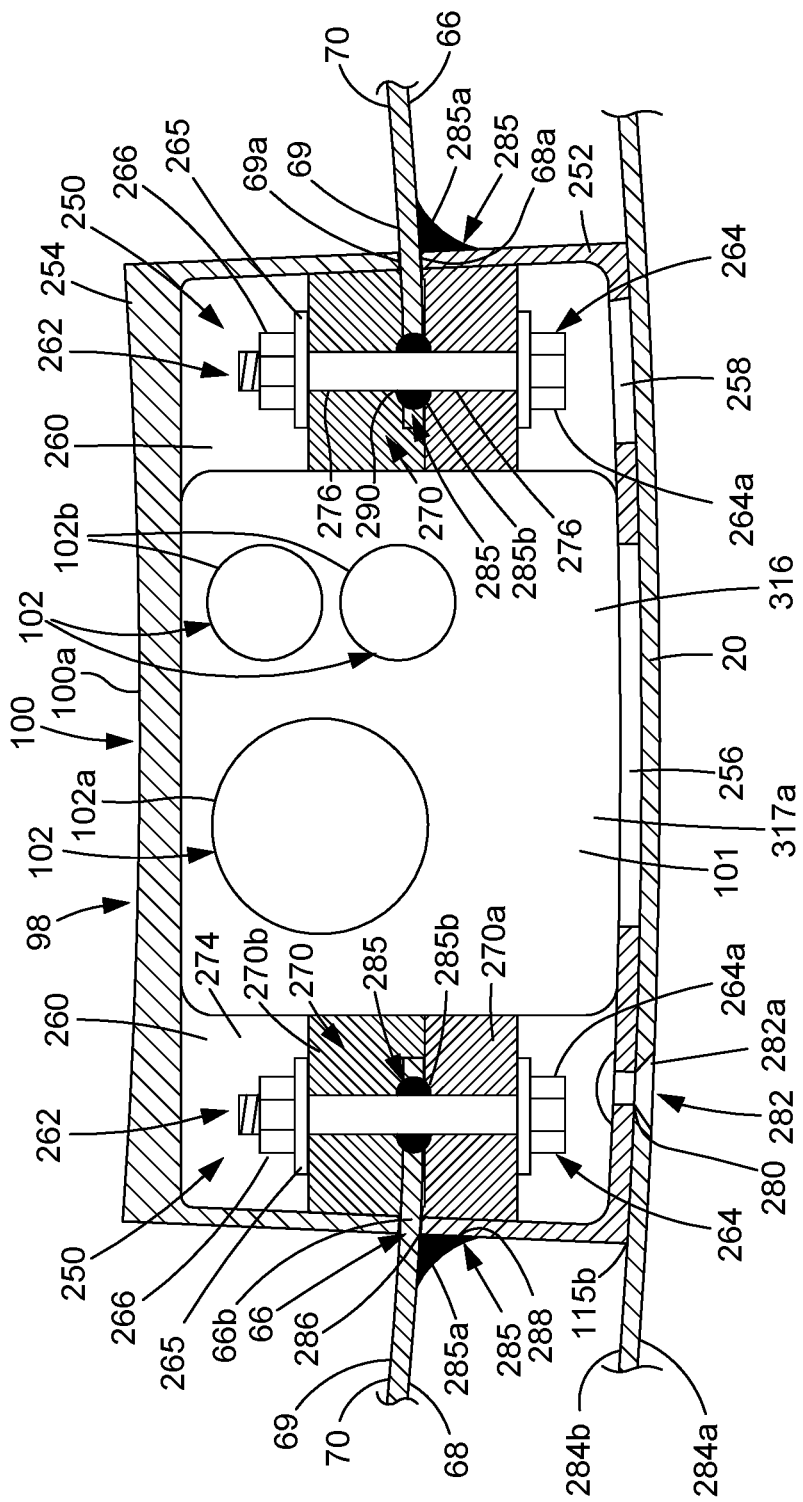
FIG. 11A is an illustration of a cross-sectional front view showing a vacuum tank skin sandwiched between a multi-purpose box stringer and clamped together with fastener assemblies, and showing an outer aero skin attached to the multipurpose box stringer.

Each of the multipurpose stiffener members 98, such as the multipurpose stringers 100, has an external profile 112 (see FIGS. 4C, 5A, 6A) that is preferably a substantially straight external profile 113 (see FIGS. 4C, 5A, 6A). Each of the multipurpose stiffener members 98, such as the multipurpose stringers 100, further has an internal profile 114 (see FIGS. 4C, 5A, 6A) corresponding to the profile geometry 76 of the vacuum tank skin 66. Each of the multipurpose stiffener members 98, such as the multipurpose stringers 100, further has an exterior side 115*a* (see FIGS. 4C, 5A, 6A) and has an interior side 115*b* (see FIGS. 4C, 5A, 6A). In one version, as shown in FIGS. 3A, 11A, the exterior side 115*a* of the multipurpose stiffener members 98, such as the multipurpose stringers 100, is coupled, or attached, to the outer aero skin 20. The exterior side 115a of the multipurpose stiffener members 98, such as the multipurpose stringers 100, is substantially straight, which facilitates attachment to the outer aero skin 20. The outer aero skin 20 provides an aerodynamic surface for the fuselage 16 (see FIGS. 1, 2, 3A) at the fuselage mold line 22 (see FIG. 1). Since the vacuum tank skin 66 is already carrying flight loads 42, the outer aero skin 20 need not be structural. The outer aero skin 20 may be comprised of fiberglass, carbon composite, plastic, a fabric that is stretched and always in tension, or another suitable material. The outer aero skin 20 may be attached to the exterior side 115a or to the side or sides of the multipurpose stiffener members 98, such as the multipurpose stringers 100, with attachment elements, such as fasteners, bonding, or another suitable attachment element means. In another version, as shown in FIG. 11C, the segmented structurally integrated vacuum tank 11 is configured without the outer aero skin 20, in an omitted outer aero skin configuration 21, so that the vacuum tank skin 66 and the multipurpose stiffener member 98, such as the multipurpose stringer 100, is exposed to an air flow 84b (see also FIG. 2) of the air 84 (see FIG. 2), such as the ambient air 84a (see FIG. 2).

Thus, in one version, the exterior side 115a of the multipurpose stiffener members 98, such as the multipurpose stringers 100, is attached to the outer aero skin 20 of the fuselage 16. In another version, without the outer aero skin 20, the exterior side 115a of the multipurpose stiffener members 98, such as the multipurpose stringers 100, is exposed or open to the air 84 (see FIG. 2). In either version, the multipurpose stiffener members 98, such as the multipurpose stringers 100, may not require attachment to fuselage frames, thus eliminating the need for such fuselage frame attachments for these multipurpose stiffener members 98, such as the multipurpose stringers 100. The elimination of such fuselage frame attachments may result in decreased weight of the aircraft 14 and decreased overall part count in the manufacturing of the aircraft 14.

As used herein, "multipurpose stiffener member" or "multipurpose stringer" or "multipurpose" means multipurpose mega-stiffener members and multipurpose mega-stringer members that have multiple purposes and functions, including carrying and holding system transport lines, as defined herein, in and through their interior to attach or connect tail systems to systems in other areas of the structure, such as an aircraft, including being equipped with a tail skid on a bottommost centered multipurpose stiffener member or multipurpose stringer, to prevent a tail strike, and including carrying flight loads and fuselage bending loads. The multipurpose stiffener members 98, such as the multipurpose stringers 100, are much larger than standard stiffener members or stringers, for example, the single purpose stiffener members 104, such as the single purpose stringers 106, and the multipurpose stiffener members 98, such as the multipurpose stringers 100, have an interior volume 101a that is sufficiently large to carry and hold the system transport lines 102. An area of a multipurpose stiffener member 98, such as the multipurpose stringer 100, for example, the multipurpose mega-stringer 100c, is about ten (10) times the area of a standard stiffener member or stringer, for example, a single purpose stiffener member 104, such as a single purpose stringer 106, and the area for the multipurpose stiffener member 98, such as the multipurpose stringer 100, for example, the multipurpose mega-stringer 100c, is a 3-5 square inch cross-sectional area, whereas the area for the standard stiffener member or stringer, for example, the single purpose stiffener member 104, such as the single purpose stringer 106 is one (1) square inch cross-sectional area or less. Because the multipurpose stiffener member 98, such as the multipurpose stringer 100, for example, the multipurpose mega-stringer 100c, is so much larger than the standard stiffener member or stringer, for example, the single purpose stiffener member 104, such as the single purpose stringer 106, a smaller number of the multipurpose stiffener member 98, such as the multipurpose stringer 100, for example, the multipurpose mega-stringer 100c, are needed. The multipurpose stiffener member 98, such as the multipurpose stringer 100, carries a significant amount of load, for example, 100,000 pounds of load or more.

As shown in FIG. 2, the segmented vacuum jacketed tank system 10, such as the segmented structurally integrated vacuum jacketed tank system 10a, comprises a pressure tank (PT) 116, such as an internal pressure tank (PT) 116a, mounted within the segmented structurally integrated vacuum tank 11. The pressure tank 116 is configured to store, and stores, or contains, the cryogenic fluid 48 (see FIG. 2), such as the liquid hydrogen 50, the liquid natural gas 52, or another suitable cryogenic fluid 48. The cryogenic fluid 48 functions as a fuel to provide fuel power to the structure 12, such as the aircraft 14, or other structure. The pressure tank 116, such as the internal pressure tank 116a, carries the cryogenic fluid 48 under pressure. The primary stresses in the pressure tank 116, such as the internal pressure tank 116a, are tension in both the longitudinal and the hoop directions. As shown in FIG. 2, the pressure tank 116 has an exterior 118 and an interior 120.

As shown in FIG. 3A, the pressure tank 116 has a pressure tank main portion 122 extending between pressure tank end portions 123, such as a forward pressure tank end portion 123a and an aft pressure tank end portion 123b. The pressure tank main portion 122 comprises a pressure tank skin 124 (see FIG. 3A) having an outer surface 125 (see FIGS. 3A, 4C, 5C) and an inner surface 126 (see FIGS. 3A, 4C, 5C).

The pressure tank 116 is designed and made of a material (MAT.) 128 (see FIG. 2) that is durable and suitable to withstand the extremely low temperatures of the cryogenic fluid 48 stored in the pressure tank 116, such as the liquid hydrogen 50, the liquid natural gas 52, or another suitable cryogenic fluid 48. The segmented structurally integrated vacuum tank 11, including the vacuum tank skin 66 and the multipurpose stiffener members 98, such as the multipurpose stringers 100, are also designed or made of the material 128 that is durable and suitable to withstand the extremely low temperatures of the cryogenic fluid 48, if the cryogenic fluid 48 stored in the pressure tank 116 is accidentally released and contacts the segmented structurally integrated vacuum tank 11.

For example, for liquid hydrogen 50 to be in a fully liquid state at atmospheric pressure, the liquid hydrogen 50 needs to be cooled to 20.28 K (Kelvin) (minus 252.87 degrees C. (Celsius); minus 423.17 degrees F. (Fahrenheit)). Further, for example, for the liquid natural gas 52 to be in a fully liquid state at atmospheric pressure, the liquid natural gas 52 needs to be cooled to 110.93 K (Kelvin) (minus 162 degrees C. (Celsius); minus 260 degrees F. (Fahrenheit)).

In one version, the pressure tank 116 and/or the segmented structurally integrated vacuum tank 11 are formed of a metal material (MAT.) 128a (see FIG. 2) including steel, stainless steel, aluminum alloy, titanium alloy, copper, copper alloy, or another suitable metal material. The pressure tank 116 and/or the segmented structurally integrated vacuum tank 11 formed of the metal material 128a can be welded, can include fasteners 264 (see FIG. 11A), or can include other attachment mechanisms. In another version, the pressure tank 116 and/or the segmented structurally integrated vacuum tank 11 are formed of a polymer material (MAT.) 128b (see FIG. 2), including thermoplastic, polytetrafluoroethylene (PTFE), polyetheretherketone (PEEK), high density polyethylene, polyamide, elastomer, rubber, or another suitable polymer material. In another version, the pressure tank 116 and/or the segmented structurally integrated vacuum tank 11 are formed of a composite material (MAT.) 128c (see FIG. 2), including carbon fiber reinforced polymer (CFRP), or another suitable composite material. Carbon composite structures may be laid up and cured in a single step, and in one version, the vacuum tank skin 66 and the multipurpose stiffener members 98, such as the multipurpose stringers 100, may be manufactured with no holes, such as no fastener holes, so fasteners 264 (see FIG. 11A) might not be used. In another version, the pressure tank 116 and/or the segmented structurally integrated vacuum tank 11 are formed or made of a combination of one or more of the metal materials 128a, the polymer materials 128b, and the composite materials 128c, or another suitable material 128 designed to withstand extremely low temperatures of the cryogenic fluid 48. The pressure tank 116 and the segmented structurally integrated vacuum tank 11, including the vacuum tank skin 66 and the multipurpose stiffener members 98, such as the multipurpose stringers 100, may be made of the material 128 that is the same or may be made of the material 128 that is different.

As shown in FIG. 3A, the pressure tank 116 has a pressure tank outer surface 130a and a pressure tank inner surface 130b, and the segmented structurally integrated vacuum tank 11 has a vacuum tank outer surface 132a and a vacuum tank inner surface 132b. In one version, the shape of the pressure tank outer surface 130a corresponds, or substantially corresponds, to the shape of the vacuum tank inner surface 131b. In another version, the shape of the pressure tank outer surface 130a does not correspond to the shape of the vacuum tank inner surface 131b. As shown in FIG. 3A, the pressure tank skin 124 has a pressure tank longitudinal cross section 74b (see FIG. 3A) with a pressure tank profile geometry 76a (see FIG. 3A) that may or may not correspond in shape to the longitudinal cross section 74 with the profile geometry 76 of the vacuum tank skin 66.

The pressure tank 116, such as the internal pressure tank 116a, further comprises an internal structure 134 (see FIGS. 4A, 5A, 7-9) in the interior 120 (see FIGS. 4A, 5A, 6-9) of the pressure tank 116. The internal structure 134 comprises one or more interior shear walls 135 (see FIGS. 2, 4A, 5A, 7-9) forming two or more interior sections 136 (see FIGS. 4A, 5A, 7-9). In one version, the interior sections 136 comprise lobed interior sections 136a (see FIGS. 7-9) having a lobed shape 138 (see FIGS. 7-9). In preferred versions, the pressure tank 116 has a range of two (2) interior sections 136 to eight (8) interior sections 136. In other versions, the pressure tank 116 has greater than eight (8) interior sections 136, such as nine (9) interior sections 136 to twenty (20) interior sections 136, or more than twenty (20) interior sections 136.

As shown in FIG. 2, the one or more interior shear walls 135 of the internal structure 134 may comprise a flat sheet 140, a tension structure 142, a wire 144, a truss structure 145, or another suitable interior shear wall structure. In one version, the one or more interior shear walls 135 of the internal structure 134 support anti-slosh baffles 146 (see FIG. 2) or function as anti-slosh baffles 146 for the hydrogen fuel.

As further shown in FIGS. 2, 3A, the segmented vacuum jacketed tank system 10, such as the segmented structurally integrated vacuum jacketed tank system 10a, further comprises a vacuum cavity 148 that forms a gap 150 between the pressure tank outer surface 130a and the vacuum tank inner surface 132b. The size of the gap 150 is a consequence of the geometry and design of the segmented structurally integrated vacuum tank 11 and the pressure tank 116. For example, the gap 150 has a typical length of 1 (one) inch (2.54 centimeters). However, the gap 150 may have another suitable length. The pressure tank 116 may be designed to fit the internal mold surface of the segmented structurally integrated vacuum tank 11, thus maximizing the volume of the pressure tank 116 relative to the enclosed volume of the segmented structurally integrated vacuum tank 11. If the gap 150 is small, this may result in favorable efficiency.

As further shown in FIG. 2, in addition to the aircraft (AC) 14, such as the hydrogen-powered aircraft (AC) 14a, the structure 12 may also comprise other vehicles such as a rotorcraft (RC) 152, a watercraft (WC) 154, a train 155, an automobile (AUTO.) 156, a truck, a bus, or another suitable vehicle. Further, as shown in FIG. 2, the structure 12 may also comprise a non-vehicle structure, such as a power plant 158, a power station (PS) 160, including a portable power station (PS) 160a or a stationary power station (PS) 160b, or another suitable non-vehicle structure.

In another version of the disclosure, there is provided an aircraft 14 (see FIGS. 1, 2). The aircraft 14 comprises the fuselage 16 (see FIG. 1) with the plurality of fuselage barrel sections 18 (see FIG. 1), and the outer aero skin 20 (see FIG. 1, 3A) at the fuselage mold line 22 (see FIG. 1).

The aircraft 14 comprises the segmented vacuum jacketed tank system 10 (see FIG. 2), such as the segmented structurally integrated vacuum jacketed tank system 10a (see FIG. 2) comprising the segmented structurally integrated vacuum tank 11 (see FIGS. 1, 2, 3A, 4A, 5A) integrated with the fuselage 16. As discussed above, the segmented structurally integrated vacuum tank 11 has the vacuum tank main portion 62 (see FIGS. 2, 3A) extending between vacuum tank end portions 64 (see FIG. 3A). The vacuum tank main portion 62 comprises the vacuum tank skin 66 (see FIG. 2) having an outer surface 68 (see FIGS. 4A, 5A, 6A) and an inner surface 69 (see FIGS. 4A, 5A, 6A). The vacuum tank skin 66 comprises a plurality of vacuum tank skin segments 70 (see FIGS. 2, 4A, 5A, 6A), and having a longitudinal cross section 74 (see FIGS. 2, 4A, 5A, 6A) with a profile geometry 76 (see FIGS. 2, 4A, 5A) configured for buckling prevention 78 (see FIG. 2) for the vacuum tank skin 66 under external pressure loads 40 (see FIG. 2).

The vacuum tank main portion 62 further comprises one or more multipurpose stringers 100 (see FIGS. 2, 3B-3D, 4A, 5A, 6A), each coupled between two of the plurality of vacuum tank skin segments 70 and each coupled to the outer aero skin 20. The one or more multipurpose stringers 100 are configured to carry a plurality of system transport lines 102 (see FIGS. 2, 6A-6D) in an interior 101 (see FIGS. 6A-6D) of one or more of the one or more multipurpose stringers 100.

In one version, as shown in FIG. 11C, the segmented structurally integrated vacuum tank 11 is configured without the outer aero skin 20 (see FIGS. 1, 2, 11B) in an omitted outer aero skin configuration 21, so that the vacuum tank skin 66 and the one or more multipurpose stringers 100 are exposed to an air flow 84b (see FIG. 11C).

The segmented vacuum jacketed tank system 10 further comprises a pressure tank 116 (see FIGS. 2, 3A, 4A, 5A, 7-9) mounted within the segmented structurally integrated vacuum tank 11. The pressure tank 116 is configured to store or contain, and stores or contains, a cryogenic fluid 48 (see FIGS. 2, 3B-3D). The cryogenic fluid 48 comprises liquid hydrogen 50 (see FIG. 2), liquid natural gas 52 (see FIG. 2), or another suitable cryogenic fluid 48.

The pressure tank 116 further comprises a pressure tank main portion 122 (see FIG. 3A) extending between pressure tank end portions 123 (see FIG. 3A). The pressure tank main portion 122 comprises a pressure tank skin 124 (see FIG. 3A) having an outer surface 125 (see FIGS. 3A, 4A, 5A) and an inner surface 126 (see FIGS. 3A, 4A, 5A). In one version, the pressure tank 116 further comprises an internal structure 134 (see FIG. 4A, 5A, 7-9) in an interior 120 (see FIGS. 4A, 5A, 7-9) of the pressure tank 116. The internal structure 134 comprising one or more interior shear walls 135 (see FIGS. 2, 4A, 5A, 7-9) forming two or more interior sections 136 (see FIGS. 4A, 5A, 7-9). Each of the one or more interior shear walls 135 may comprise a flat sheet 140 (see FIG. 2), a tension structure 142 (see FIG. 2), a wire 144 (see FIG. 2), a truss structure 145 (see FIG. 2), or another suitable interior shear wall structure.

The segmented vacuum jacketed tank system 10 further comprises a vacuum cavity 148 (see FIGS. 2, 3A, 4A, 5A, 6A) formed between the segmented structurally integrated vacuum tank 11 and the pressure tank 116.

Now referring to FIG. 3A. FIG. 3A is an illustration of a cross-sectional side view of an exemplary segmented vacuum jacketed tank system 10, such as a segmented structurally integrated vacuum jacketed tank system 10a, of the disclosure. As shown in FIG. 3A, the segmented vacuum jacketed tank system 10, such as a segmented structurally integrated vacuum jacketed tank system 10a, comprises the segmented structurally integrated vacuum tank 11, such as the external segmented structurally integrated vacuum tank 11a, a pressure tank 116, such as an internal pressure tank 116a, mounted within the segmented structurally integrated vacuum tank 11, and the vacuum cavity 148 with the gap 150 formed between the pressure tank outer surface 130a of the pressure tank 116 and the vacuum tank inner surface 131b of the segmented structurally integrated vacuum tank 11.

As shown in FIG. 3A, the segmented structurally integrated vacuum tank 11 comprises the exterior 56 having the vacuum tank outer surface 132a, and the interior 58 (see FIGS. 3B-3C) having the vacuum tank inner surface 132b. The segmented structurally integrated vacuum tank 11 is under a vacuum 60 (see FIG. 2) in the interior 58. The segmented structurally integrated vacuum tank 11 withstands external pressure caused by ambient air 84a (see FIG. 2) on the outside and on the exterior 56 of the segmented structurally integrated vacuum tank 11 and the vacuum 60 inside the interior 58 of the segmented structurally integrated vacuum tank 11.

As further shown in FIG. 3A, the segmented structurally integrated vacuum tank 11 has the vacuum tank main portion 62 extending between vacuum tank end portions 64, such as the forward vacuum tank end portion 64a and the aft vacuum tank end portion 64b. As shown in FIG. 3A, the vacuum tank main portion 62 has a vacuum tank main portion length 161. As further shown in FIG. 3A, the forward vacuum tank end portion 64a has a forward length 162a, and the aft vacuum tank end portion 64b has an aft length 162b. As shown in FIG. 3A, in this version of the segmented structurally integrated vacuum tank 11, the forward length 162a and the aft length 162b are the same size lengths, and the forward length 162a and the aft length 162b are each less length size than the length size of the vacuum tank main portion length 161. In another version, the forward length 162a and the aft length 162b may be different size lengths.

As shown in FIG. 3A, the vacuum tank main portion 62 has end rings 164, including a forward end ring 164a and an aft end ring 164b. The forward end ring 164a is a structure attached around a circumference at a forward end 165a (see FIG. 3A) of the vacuum tank main portion 62, and the forward end ring 164a is positioned between the forward end 165a of the vacuum tank main portion 62 and the forward vacuum tank end portion 64a. The aft end ring 164b is a structure attached around a circumference at an aft end 165b (see FIG. 3A) of the vacuum tank main portion 62, and the aft end ring 164b is positioned between the aft end 165b of the vacuum tank main portion 62 and the aft vacuum tank end portion 64b.

In one version, as shown in FIG. 3A, the segmented structurally integrated vacuum tank 11 has a spherocylinder shape 166, or capsule shape, comprising a three-dimensional geometric shape with the vacuum tank main portion 62 comprising the vacuum tank skin 66, and the vacuum tank end portions 64 each have a semi-ellipsoid shape 168. In other versions, the vacuum tank end portions 64 may have a hemisphere shape, or another curved shape. In other versions, the segmented structurally integrated vacuum tank 11 has another suitable three-dimensional geometric shape.

The vacuum tank main portion 62 has the vacuum tank skin 66 (see FIG. 3A). The vacuum tank skin 66 of the vacuum tank main portion 62 has the longitudinal cross section 74 (see FIG. 3A) with the profile geometry 76 (see FIG. 3A) comprising the superimposed curves shape 86c. However, in other versions, the vacuum tank skin 66 may have the longitudinal cross section 74 with the profile geometry 76 having another shape 86. The longitudinal cross section 74 with the profile geometry 76 is preferably configured for buckling prevention 78 (see FIG. 2) for the vacuum tank skin 66 to prevent buckling of the vacuum tank skin 66 under external pressure loads 40 (see FIG. 2), and the vacuum tank skin 66 is configured to provide a pressure barrier 80 (see FIG. 2) between the outside ambient pressure 82 (see FIG. 2) and the vacuum 60 (see FIG. 2) in the interior 58 of the segmented structurally integrated vacuum tank 11. The vacuum tank skin 66 carries hoop compression resulting from this pressure difference.

FIG. 3A show the multipurpose stiffener members 98, such as the multipurpose stringers 100. As shown in FIG. 3A, multipurpose stiffener members 98, such as multipurpose stringers 100, are coupled, or attached, to outer surface portions 68a of the vacuum tank skin 66. In one version, as shown in FIG. 3A, the multipurpose stiffener members 98, such as the multipurpose stringers 100, are attached between the vacuum tank skin 66 and the outer aero skin 20 of the fuselage 16, and the fuselage structure 38 is integrated with the vacuum tank structure 36. The multipurpose stiffener members 98, such as the multipurpose stringers 100, and the vacuum tank skin 66 are configured to carry structural loads 109 (see FIG. 2). In particular, the multipurpose stiffener members 98, such as the multipurpose stringers 100, and the vacuum tank skin 66 are configured to carry axial loads 111 (see FIG. 2), which enable the fuselage 16 to carry bending loads 110 (see FIG. 2). For aircraft 14 (see FIG. 1), the multipurpose stiffener members 98, such as the multipurpose stringers 100, are designed and sized to carry bending loads 110 (see FIG. 2), such as the fuselage bending loads 110a (see FIG. 2), carried by the aft fuselage barrel section 18a (see FIG. 1) of the fuselage 16 (see FIG. 1).

As shown in FIG. 3A, the pressure tank 116, such as the internal pressure tank 116a, is mounted within the segmented structurally integrated vacuum tank 11, and is attached to the interior 58 of the segmented structurally integrated vacuum tank 11 with tank attach fittings 170, such as a forward tank attach fitting 170a and an aft tank attach fitting 170b. As shown in FIG. 3C, the pressure tank 116, such as the internal pressure tank 116a, is configured to contain, and contains, the cryogenic fluid 48 (see FIGS. 3B-3D), such as liquid hydrogen 50 (see FIGS. 3B-3D), liquid natural gas 52 (see FIG. 2), or another suitable cryogenic fluid 48.

As shown in FIG. 3A, the pressure tank 116 comprises the exterior 118 having the pressure tank outer surface 130a, and the interior 120 having the pressure tank inner surface 130b. As further shown in FIG. 3A, the pressure tank 116 comprises the pressure tank main portion 122 extending between pressure tank end portions 123, such as the forward pressure tank end portion 123a and the aft pressure tank end portion 123b. As shown in FIG. 3A, the pressure tank main portion 122 has a pressure tank main portion length 172. In one version, the pressure tank main portion length 172 is the same length, or substantially the same length, as the vacuum tank main portion length 161 (see FIG. 3A).

As shown in FIG. 3A, the pressure tank main portion 122 has end boundaries 174, including a forward end boundary 174a and aft end boundary 174b. As shown in FIG. 3A, the forward end boundary 174a is positioned between a forward end 175a of the pressure tank main portion 122 and the forward pressure tank end portion 123a, and the aft end boundary 174b is positioned between an aft end 175b of the pressure tank main portion 122 and the aft pressure tank end portion 123b.

As shown in FIG. 3A, in one version, the pressure tank 116 has a spherocylinder shape 166a, or capsule shape, comprising a three-dimensional geometric shape with the pressure tank main portion 122 having a substantially cylindrical shape 196, and the pressure tank end portions 123 each having a semi-ellipsoid shape 168a. In other versions, the pressure tank 116 has another suitable three-dimensional geometric shape.

The pressure tank main portion 122 has the pressure tank skin 124 (see FIG. 3A) with the outer surface 125 and the inner surface 126. As shown in FIG. 3A, in this version, the pressure tank skin 124 of the pressure tank main portion 122 has a pressure tank longitudinal cross section 74a with a pressure tank profile geometry 76a that is a substantially straight profile 176. However, in other versions, the pressure tank skin 124 may have the pressure tank longitudinal cross section 74a with the pressure tank profile geometry 76a having another suitable shape. The pressure tank profile geometry 76a of the pressure tank 116 may or may not correspond to the profile geometry 76 of the segmented structurally integrated vacuum tank 11.

Now referring to FIGS. 3B-3D, FIGS. 3B-3D show exemplary versions of a segmented vacuum jacketed tank system 10, such as a segmented structurally integrated vacuum jacketed tank system 10a, with multipurpose stiffener members 98, or with a hybrid arrangement 108 (see FIGS. 3C-3D) of multipurpose stiffener members 98 and single purpose stiffener members 104. FIG. 3B is an illustration of a cross-sectional front view of an exemplary segmented vacuum jacketed tank system 10 showing multipurpose stiffener members 98, such as multipurpose stringers 100, for example, multipurpose box stringers 100a, each coupled between two vacuum tank skin segments 70 of a vacuum tank skin 66 of a segmented structurally integrated vacuum tank 11, and showing a pressure tank 116 containing a cryogenic fluid 48, such as liquid hydrogen 50 in an interior 120 of the pressure tank 116. FIG. 3C is an illustration of a cross-sectional front view of another exemplary segmented vacuum jacketed tank system 10 showing the hybrid arrangement 108 of both multipurpose stiffener members 98, such as multipurpose stringers 100, for example, multipurpose box stringers 100a, and single purpose stiffener members 104, such as single purpose stringers 106, for example, plank stringers 106b, such as single purpose plank stringers, of the segmented structurally integrated vacuum tank 11, and showing the pressure tank 116 containing the cryogenic fluid 48, such as liquid hydrogen 50 in the interior 120 of the pressure tank 116. FIG. 3D is an illustration of a cross-sectional front view of yet another exemplary segmented vacuum jacketed tank system 10 showing the hybrid arrangement 108 of both multipurpose stiffener members 98, such as multipurpose stringers 100, for example, multipurpose box stringers 100a, and single purpose stiffener members 104, such as single purpose stringers 106, for example, blade stringers 106c, such as single purpose blade stringers, of the segmented structurally integrated vacuum tank 11, and showing the pressure tank 116 containing the cryogenic fluid 48, such as liquid hydrogen 50.

FIGS. 3B-3D show the segmented structurally integrated vacuum tank 11, such as the external segmented structurally integrated vacuum tank 11a, and the pressure tank 116, such as the internal pressure tank 116a, within the segmented structurally integrated vacuum tank 11. FIGS. 3B-3D show the multipurpose stiffener members 98, such as the multipurpose stringers 100, for example, the multipurpose box stringers 100a, each coupled between two of the vacuum tank skin segments 70. The sides of each multipurpose stringer 100, such as each multipurpose box stringer 100a, are coupled to outer surface portions 68a of the outer surface 68 of the vacuum tank skin segments 70 of the vacuum tank skin 66, along the vacuum tank outer surface 132a on the exterior 56 of the segmented structurally integrated vacuum tank 11, and are coupled to inner surface portions 69a of the inner surface 69 of the vacuum tank skin segments 70 of the vacuum tank skin 66, along the vacuum tank inner surface 132b on the interior 58 of the segmented structurally integrated vacuum tank 11. FIGS. 3B-3D show the interior 101 of each multipurpose stringer 100, such as the multipurpose box stringer 100a. The interior 101 has an interior volume 101a (see FIGS. 3B-3D) that is substantially open or hollow so that it can accommodate and hold one or more system transport lines 102 (see FIGS. 6A-6D, 7-9).

FIGS. 3B-3D show six (6) multipurpose stiffener members 98, such as six (6) multipurpose stringers 100, for example, six (6) multipurpose box stringers 100a, positioned in an equal distance spaced relationship 178 around a circumference 180 of the segmented structurally integrated vacuum tank 11. In other versions, the number of multipurpose stiffener members 98, such as the multipurpose stringers 100, for example, the multipurpose box stringers 100a, may be two (2) to five (5), or seven (7) to twenty (20), or greater than twenty (20), depending on the size of the structure 12. In other versions, the multipurpose stiffener members 98, such as the multipurpose stringers 100, may be positioned in a non-equal distance spacing with respect to each other. Although FIGS. 3B-6D and 7-9 show the multipurpose stiffener members 98, such as the multipurpose stringers 100, symmetrically arranged around the circumference 180 of the segmented structurally integrated vacuum tank 11, the multipurpose stiffener members 98, such as the multipurpose stringers 100, need not be equal, or symmetrically arranged, around the circumference 180 of the segmented structurally integrated vacuum tank 11.

FIG. 3C shows the hybrid arrangement 108 of the multipurpose stiffener members 98, such as multipurpose stringers 100, for example, multipurpose box stringers 100a, and the single purpose stiffener members 104, such as the single purpose stringers 106, for example, the plank stringers 106b, such as single purpose plank stringers. The single purpose stringers 106, such as the plank stringers 106b, are coupled, or attached, to outer surface portions 68a of the vacuum tank skin segments 70 of the vacuum tank skin 66, along the vacuum tank outer surface 132a on the exterior 56 of the segmented structurally integrated vacuum tank 11. FIG. 3C, in one version, shows two (2) plank stringers 106b positioned in an equal distance spaced arrangement 178a between two (2) multipurpose box stringers 100a around the circumference 180 of the segmented structurally integrated vacuum tank 11. In other versions, one (1) plank stringer 106b, or more than two (2) plank stringers 106b, may be positioned between two (2) multipurpose box stringers 100a. FIG. 3C, in one version, shows twelve (12) single purpose stiffener members 104, such as twelve (12) single purpose stringers 106, for example, twelve (12) plank stringers 106b, positioned around the circumference 180 of the segmented structurally integrated vacuum tank 11. In other versions, the number of single purpose stiffener members 104, such as single purpose stringers 106, for example, plank stringers 106b, positioned around the circumference 180 of the segmented structurally integrated vacuum tank 11 may be one (1) to eleven (11), or thirteen (13) to twenty (20), or possibly greater than twenty (20), depending on the size of the structure 12.

FIG. 3D shows the hybrid arrangement 108 of the multipurpose stiffener members 98, such as multipurpose stringers 100, for example, multipurpose box stringers 100a, and the single purpose stiffener members 104, such as the single purpose stringers 106, for example, the blade stringers 106c, such as single purpose blade stringers. The single purpose stringers 106, such as the blade stringers 106c, are coupled, or attached, to outer surface portions 68a of the vacuum tank skin segments 70 of the vacuum tank skin 66, along the vacuum tank outer surface 132a on the exterior 56 of the segmented structurally integrated vacuum tank 11, and are also coupled, or attached, to inner surface portions 69a of the vacuum tank skin segments 70 of the vacuum tank skin 66, along the vacuum tank inner surface 132b on the interior 58 of the segmented structurally integrated vacuum tank 11.

FIG. 3D, in one version, shows two (2) blade stringers 106c positioned in an equal distance spaced arrangement 178b between two (2) multipurpose box stringers 100a around the circumference 180 of the segmented structurally integrated vacuum tank 11. In other versions, one (1) blade stringer 106c, or more than two (2) blade stringers 106c, may be positioned between two (2) multipurpose box stringers 100a. FIG. 3D, in one version, shows twelve (12) single purpose stiffener members 104, such as twelve (12) single purpose stringers 106, for example, twelve (12) blade stringers 106c, positioned around the circumference 180 of the segmented structurally integrated vacuum tank 11. In other versions, the number of single purpose stiffener members 104, such as single purpose stringers 106, for example, blade stringers 106c, positioned around the circumference 180 of the segmented structurally integrated vacuum tank 11 may be one (1) to eleven (11), or thirteen (13) to twenty (20), or possibly greater than twenty (20), depending on the size of the structure 12.

The hybrid arrangement 108 of multipurpose stiffener members 98 and single purpose stiffener members 104 may include more than one type of multipurpose stiffener member 98 and more than one type of single purpose stiffener member 104 in any number of arranged positions around the circumference 180 of the segmented structurally integrated vacuum tank 11.

FIGS. 3B-3D further show the vacuum cavity 148 with the gap 150 between the pressure tank outer surface 130a of the pressure tank 116 and the vacuum tank inner surface 132b of the segmented structurally integrated vacuum tank 11. The gap 150 is determined based on the geometry and design of the pressure tank 116 and the segmented structurally integrated vacuum tank 11. As shown in FIGS. 3B-3D, the gap 150 has a width 182 from the pressure tank outer surface 130a to the vacuum tank inner surface 132b, and the width 182 of the gap 150 may be constant and uniform between the pressure tank 116 and the segmented structurally integrated vacuum tank 11. The gap 150 shown in FIGS. 3B-3D is larger than what it might be in practice, and in practice, the gap 150 may be much smaller than shown in FIGS. 3B-3D.

Now referring to FIGS. 4A-4C, FIG. 4A is an illustration of a front left side perspective view of a version of an exemplary segmented vacuum jacketed tank system 10 of the disclosure in the form of a segmented vacuum jacketed circular shaped tank system 10b. FIG. 4B is an illustration of a front view of the segmented vacuum jacketed tank system 10, such as the segmented vacuum jacketed circular shaped tank system 10b, of FIG. 4A. FIG. 4C is an illustration of an enlarged partial front left side perspective view of the segmented vacuum jacketed tank system 10, such as the segmented vacuum jacketed circular shaped tank system 10b, of FIG. 4A. FIGS. 4A, 4C show a forward-aft direction 183 to indicate, for example, the forward end 165a of the vacuum tank main portion 62 and the aft end 165b of the vacuum tank main portion 62. FIGS. 4A-4C do not include the vacuum tank end portions 64 (see FIG. 3A) and the pressure tank end portions 123 (see FIG. 3A).

As shown in FIGS. 4A-4C, the segmented vacuum jacketed tank system 10, such as the segmented vacuum jacketed circular shaped tank system 10b, comprises the segmented structurally integrated vacuum tank 11, such as the external segmented structurally integrated vacuum tank 11a, having the exterior 56, the interior 58, and the vacuum tank main portion 62 comprising the vacuum tank skin 66. As shown in FIGS. 4A-4C, the vacuum tank skin 66 has an outer surface 68, or crest line or peak line, and an inner surface 69, or trough line or valley line, and the vacuum tank skin 66 comprises vacuum tank skin segments 70, such as in the form of vacuum tank skin arc segments 70a. Outer radii, or the crests or peaks, are a circle centered at a center of a fuselage 16 (see FIG. 1), and interior radii, or the troughs or valleys, are a circle centered at a center of the fuselage 16. The outer radii and the inner radii are concentric.

As shown in FIGS. 4A-4C, with the segmented vacuum jacketed circular shaped tank system 10b, the outer surface 68 and the inner surface 69 of the vacuum tank skin 66 comprising the vacuum tank skin segments 70 have a circular shape 184. As further shown in FIGS. 4A-4C, with the segmented vacuum jacketed circular shaped tank system 10b, the outer surface 125 and the inner surface 126 of the pressure tank skin 124 have the circular shape 184 and match the circular shape 184 of the outer surface 68 and the inner surface 69 of the vacuum tank skin 66 comprising the vacuum tank skin segments 70.

As shown in FIG. 4A, the vacuum tank skin 66 comprises vacuum tank skin segments 70 that are separate and coupled between two multipurpose stiffener members 98. In this version, the multipurpose stiffener members 98, such as the multipurpose stringers 100, for example, the multipurpose box stringers 100*a*, can clamp the vacuum tank skin 66, and the vacuum tank skin 66 does not pass all the way through the interior 101 of the multipurpose stiffener members 98, such as the multipurpose stringers 100, for example, the multipurpose box stringers 100*a*. In another version, the vacuum tank skin 66 may comprise a continuous sheet 188 (see FIG. 12B) that passes all the way through the interior 101 of the multipurpose stiffener members 98, such as the multipurpose stringers 100, for example, the multipurpose box stringers 100*a*, and the vacuum tank skin 66 is functionally segmented into the vacuum tank skin segments 70 by the multipurpose stiffener members 98 coupled to the vacuum tank skin 66. The vacuum tank skin 66 is lightweight and capable of sustaining significant levels of external pressure, such as external pressure loads 40 (see FIG. 2). In one version, the multipurpose stiffener members 98, such as the multipurpose stringers 100, are attached to the vacuum tank skin 66, such as in the form of the continuous sheet 188. In another version, as shown in FIG. 11F, the multipurpose stiffener members 98, such as the multipurpose stringers 100, and the vacuum tank skin 66 may be made of a composite material 128*c* (see FIG. 2), such as carbon fiber reinforced polymer (CFRP) or another suitable composite material, and can be one integral structural component.

As shown in FIG. 4A, the vacuum tank skin 66 further has the longitudinal cross section 74 with the profile geometry 76 configured for buckling prevention 78 (see FIG. 2) for the vacuum tank skin 66 under external pressure loads 40 (see FIG. 2). As further shown in FIG. 4A, the profile geometry 76 of the longitudinal cross section 74 of the vacuum tank skin 66 has a shape 86 comprising a corrugated shape 86*a*, for example, a sinusoidal shape 86*b*. As further shown in FIG. 4A, the profile geometry 76 comprises repeating patterns 185 of corrugations 186. As further shown in FIG. 4A, the vacuum tank skin 66 has the outer mold line 72, the inner mold line 73, a first end 190*a* or forward end, and a second end 190*b* or aft end.

The vacuum tank skin 66 provides a pressure barrier 80 (see FIG. 2) between the outside ambient pressure 82 (see FIG. 2) and the vacuum 60 (see FIG. 2) in the interior 58 (see FIG. 4A) of the segmented structurally integrated vacuum tank 11. The vacuum tank skin 66 carries hoop compression resulting from this pressure difference. Further, the vacuum tank skin 66 carries some flight loads 42 (see FIG. 2), such as fuselage torsion, when the structure 12 (see FIG. 2) comprises an aircraft 14 (see FIG. 2).

As shown in FIGS. 4A-4C, the segmented structurally integrated vacuum tank 11 further comprises the multipurpose stiffener members 98, such as the multipurpose stringers 100, for example, the multipurpose box stringers 100*a*, each coupled between two of the vacuum tank skin segments 70. Each of the multipurpose stiffener members 98, such as the multipurpose stringers 100, for example, the multipurpose box stringers 100*a*, is configured to carry one or more system transport lines 102 (see FIGS. 2, 6A-6D) in the interior 101 (see FIGS. 4A-4C) of the multipurpose stiffener members 98. As shown in FIG. 4B, each multipurpose box stringer 100*a* has a box-shaped cross section 192. Further, as shown in FIG. 4A, each multipurpose stiffener member 98, such as the multipurpose stringer 100, for example, the multipurpose box stringer 100*a*, is a closed section 103. In other versions, each multipurpose stiffener member 98, such as the multipurpose stringer 100, for example, the multipurpose box stringer 100*a*, may be an open section.

For aircraft 14 (see FIG. 1), the multipurpose stiffener members 98, such as the multipurpose stringers 100, for example, the multipurpose box stringers 100*a*, primarily carry flight loads 42 (see FIG. 2), and the vacuum tank skin 66 carries some flight loads 42, such as fuselage torsion. For aircraft 14 (see FIG. 1), the multipurpose stiffener members 98, such as the multipurpose stringers 100, are designed and sized to carry the bending loads 110, such as the fuselage bending loads 110*a* (see FIG. 2) carried by the aft fuselage barrel section 18*a* (see FIG. 1) of the fuselage 16 (see FIG. 1).

As shown in FIG. 4C, each of the multipurpose stiffener members 98, such as the multipurpose stringers 100, for example, the multipurpose box stringers 100*a*, has the external profile 112 that is preferably a substantially straight external profile 113. As further shown in FIG. 4C, each of the multipurpose stiffener members 98, such as the multipurpose stringers 100, can have an internal profile 114 corresponding to the profile geometry 76 of the vacuum tank skin 66, or can have a substantially straight internal profile. As further shown in FIG. 4C, each of the multipurpose stiffener members 98, such as the multipurpose stringers 100, have the exterior side 115*a* and the interior side 115*b*. The exterior side 115*a* of the multipurpose stiffener members 98, such as the multipurpose stringers 100, for example, the multipurpose box stringers 100*a*, is substantially straight, which facilitates attachment to the outer aero skin 20 (see FIGS. 3A, 11A). As further shown in FIGS. 4A, 4C, each of the multipurpose stiffener members 98, such as the multipurpose stringers 100, for example, the multipurpose box stringers 100*a*, has a first end 194*a*, or forward end, and a second end 194*b*, or aft end.

As shown in FIGS. 4A-4C, in one version, the segmented structurally integrated vacuum tank 11 comprises six (6) multipurpose stiffener members 98, such as six (6) multipurpose stringers 100, for example, six (6) multipurpose box stringers 100*a*, arranged in the equal distance spaced relationship 178 (see FIG. 4B) around the circumference 180 (see FIG. 4B) of the segmented structurally integrated vacuum tank 11. In other versions, the number of multipurpose stiffener members 98, such as the multipurpose stringers 100, for example, the multipurpose box stringers 100*a*, may be two (2) to five (5), or seven (7) to twenty (20), or possibly greater than twenty (20), depending on the size of the structure 12.

As shown in FIG. 4B, the vacuum tank skin segments 70 of the vacuum tank skin 66 and the multipurpose stiffener members 98, such as the multipurpose stringers 100, form a cylinder 195 with a substantially cylindrical shape 196. In preferred versions, the cylinder 195 has a diameter with a length preferably in a range of 6 (six) feet (1.8 meters) to 20 (twenty) feet (6.1 meters) long. The outer diameter may have another suitable length. Further, the length of the vacuum tank skin 66 from the first end 190*a* (see FIG. 4A) to the second end 190*b* (see FIG. 4A) is preferably in a range of 6 (six) feet (1.8 meters) to 20 (twenty) feet (6.1 meters) long. More preferably, the length is 10 (ten) feet (3.0 meters) long, 15 (fifteen) feet (4.6 meters) long, 20 (twenty) feet (6.1 meters) long, or another suitable length greater than 20 (twenty) feet (6.1 meters).

As shown in FIGS. 4A-4C, the segmented vacuum jacketed tank system 10, such as the segmented vacuum jacketed circular shaped tank system 10*b*, further comprises the pressure tank 116, such as the internal pressure tank 116*a*, mounted within the segmented structurally integrated vacuum tank 11. As shown in FIG. 4A, the pressure tank 116 comprises the pressure tank main portion 122 comprising a pressure tank skin 124 having the outer surface 125 and the inner surface 126. The pressure tank skin 124 of the internal pressure tank 116a may be corrugated or non-corrugated. As shown in FIGS. 4A-4C, with the segmented vacuum jacketed circular shaped tank system 10b, the outer surface 125 and the inner surface 126 of the pressure tank skin 124 have the circular shape 184, and match the circular shape 184 of the outer surface 68 and the inner surface 69 of the vacuum tank skin 66 comprising the vacuum tank skin segments 70. As shown in FIGS. 4A-4C, a bracket 332, such as a heavy bracket, or a channel shaped or C-shaped fitting, is preferably coupled, or attached, to portions 126a of the inner surface 126 of the pressure tank 116 and fitted adjacent to or near the interior side 115b and portions 254a of an inner section 254 of each multipurpose stiffener member 98, such as each multipurpose stringer 100, for example, each multipurpose box stringer 100a, maintaining the gap 150 between the outer surface 125 of the pressure tank skin 124 and the inner surface 69 of the vacuum tank skin 66. The brackets 332 may be coupled, or attached, to the inner surface 126 of the pressure tank 116 with attachment means such as bonding, bolts, rivets, or other suitable attachment means. Each bracket 332 carries hoop tension loads around the interior side 115b and portions 254a of the inner section 254 of each multipurpose stiffener member 98, such as each multipurpose stringer 100, for example, each multipurpose box stringer 100a. As further shown in FIGS. 4A-4C, stiffener parts 334, such as beams, posts, or other suitable stiffener parts, may optionally be attached to one or more of the brackets 332. FIGS. 4A-4C show the stiffener parts 334, such as two stiffener parts 334, attached to the bracket 332 which is coupled around the interior side 115b and the portions 254a of the inner section 254 of a topmost centered multipurpose stiffener member 98c, and FIGS. 4A-4C further show the stiffener parts 334 attached to all of the other brackets 332. The brackets 332 and the optional stiffener parts 334 provide bending rigidity and enable a continuous load path around the multipurpose stiffener members 98, such as the multipurpose stringers 100, for example, the multipurpose box stringers 100a for the hoop tension forces in the pressure tank skin 124.

As further shown in FIGS. 4A-4C, in one version, the pressure tank 116 further comprises an internal structure 134 in the interior 120 of the pressure tank 116 comprising interior shear walls 135 forming six (6) interior sections 136. In other versions, the pressure tank 116 has two (2) to five (5) interior sections 136, or seven (7) to twenty (20) interior sections 136, or more than twenty (20) interior sections 136. As shown in FIGS. 4A-4C, in one version, the interior shear walls 135 of the internal structure 134 comprise a truss structure 145. In other versions, each interior shear wall 135 comprises a flat sheet 140 (see FIG. 2), a tension structure 142 (see FIG. 2), a wire 144 (see FIG. 2), or another suitable interior shear wall structure.

As shown in FIGS. 4A-4C, the segmented vacuum jacketed tank system 10, such as the segmented vacuum jacketed circular shaped tank system 10b, further comprises the vacuum cavity 148 forming the gap 150 formed between the segmented structurally integrated vacuum tank 11 and the pressure tank 116. With the segmented vacuum jacketed circular shaped tank system 10b, the gap 150 is small and constant between the segmented structurally integrated vacuum tank 11 and the pressure tank 116.

As shown in FIGS. 4A-4C, a geometry 198 of both the external segmented structurally integrated vacuum tank 11a and the internal pressure tank 116a is a circular geometry 198a that has a common amplitude and that is concentric. This arrangement is advantageous as the manufacturing of circular segments and circular sections is simple, and for the vacuum tank skin 66 having the corrugated shape 86a with corrugations 186, the manufacturing process may include roll-forming or another suitable manufacturing process. As shown in FIG. 4B, the vacuum tank skin 66 may have a vacuum tank skin thickness 200, such as a vacuum tank skin constant thickness 200a, and the pressure tank skin 124 may have a pressure tank skin thickness 202, such as a pressure tank skin constant thickness 202a. In other versions, the vacuum tank skin thickness 200 and the pressure tank skin thickness 202 may be non-constant and comprise a pressure tank skin variable thickness 202b (see FIG. 7).

Figure 5C:
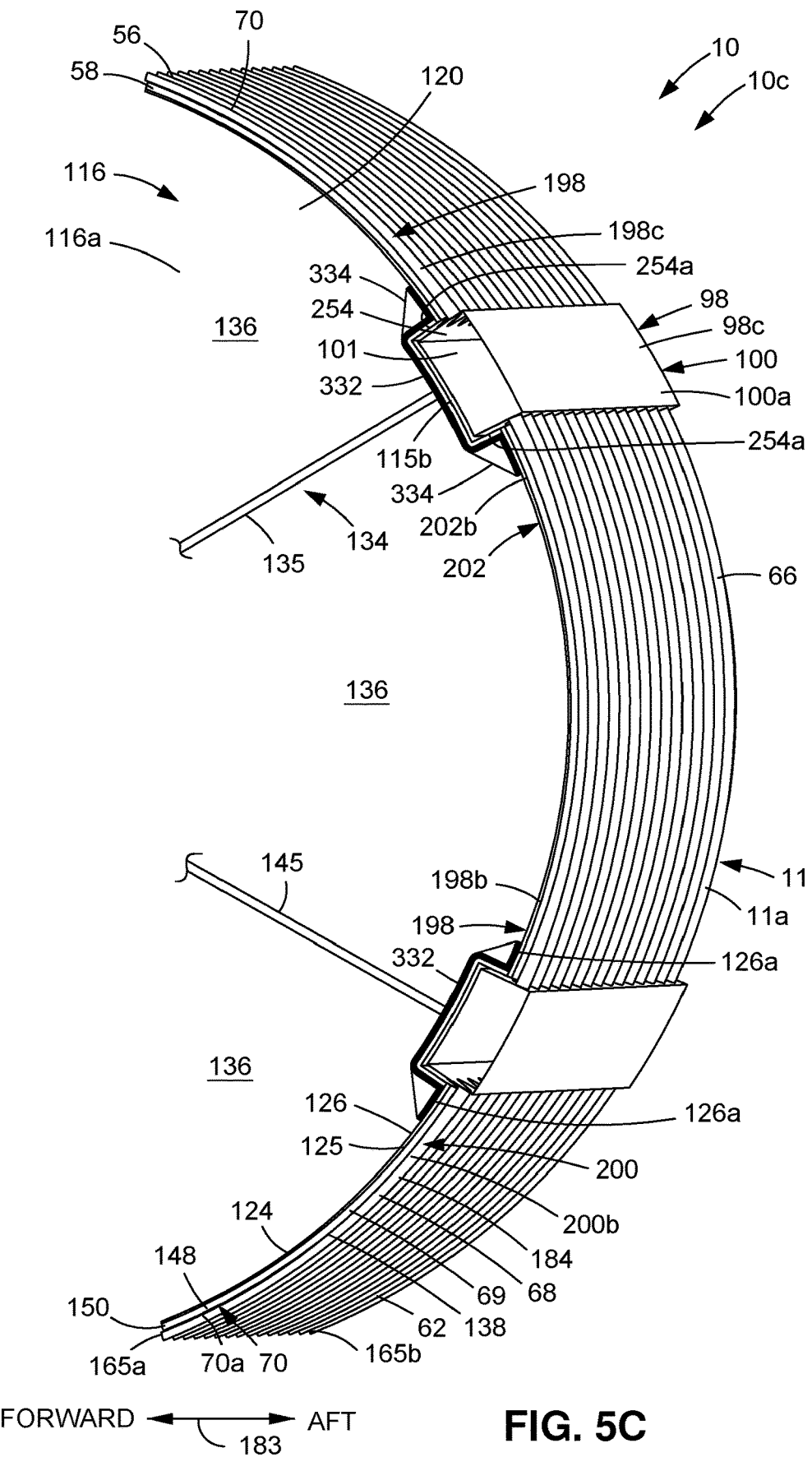
FIG. 5C is an illustration of an enlarged partial front left side perspective view of the segmented vacuum jacketed tank system of FIG. 5A.

Now referring to FIGS. 5A-5C, FIG. 5A is an illustration of a front right side perspective view of another version of an exemplary segmented vacuum jacketed tank system 10 of the disclosure in the form of a segmented vacuum jacketed circular and lobed shaped tank system 10c. FIG. 5B is an illustration of a front view of the segmented vacuum jacketed tank system 10, such as the segmented vacuum jacketed circular and lobed shaped tank system 10c, of FIG. 5A. FIG. 5C is an illustration of an enlarged partial front left side perspective view of the segmented vacuum jacketed tank system 10, such as the segmented vacuum jacketed circular and lobed shaped tank system 10c, of FIG. 5A. FIGS. 5A, 5C show a forward-aft direction 183 to indicate, for example, the forward end 165a of the vacuum tank main portion 62 and the aft end 165b of the vacuum tank main portion 62. FIGS. 5A-5C do not include the vacuum tank end portions 64 (see FIG. 3A) and the pressure tank end portions 123 (see FIG. 3A).

As shown in FIGS. 5A-5C, the segmented vacuum jacketed tank system 10, such as the segmented vacuum jacketed circular and lobed shaped tank system 10c, comprises the segmented structurally integrated vacuum tank 11, such as the external segmented structurally integrated vacuum tank 11a, having the exterior 56, the interior 58, and the vacuum tank main portion 62 comprising the vacuum tank skin 66. As shown in FIGS. 5A-5C, the vacuum tank skin 66 has the outer surface 68, or crest line or peak line, and the inner surface 69, or trough line or valley line, and the vacuum tank skin 66 comprises vacuum tank skin segments 70, such as in the form of vacuum tank skin arc segments 70a. Outer radii, or the crests or peaks, are a circle centered at a center of a fuselage 16 (see FIG. 1), and interior radii, or the troughs or valleys, are approximately 75% of the outer radii.

As shown in FIGS. 5A-5C, with the segmented vacuum jacketed circular and lobed shaped tank system 10c, the outer surface 68 of the vacuum tank skin 66 comprising the vacuum tank skin segments 70 has a circular shape 184, and the inner surface 69 of the vacuum tank skin 66 comprising the vacuum tank skin segments 70 has a lobed shape 138. As further shown in FIGS. 5A-5C, with the segmented vacuum jacketed circular and lobed shaped tank system 10c, the outer surface 125 and the inner surface 126 of the pressure tank skin 124 have the lobed shape 138, and match the lobed shape 138 of the inner surface 69 of the vacuum tank skin 66 comprising the vacuum tank skin segments 70. Thus, the vacuum tank skin 66 has a circular crest line, or outer surface 68, and a lobed trough line, or inner surface 69, and the pressure tank skin 124 has pressure tank lines, or outer surface 125 and inner surface 126, that are lobed shape 138. As shown in FIGS. 5A-5C, the vacuum tank skin 66 comprising the vacuum tank skin segments 70 has a vacuum tank skin thickness 200, such as a vacuum tank skin variable thickness 200b, and the pressure tank skin 124 has a pressure tank skin thickness 202, such as a pressure tank skin variable thickness 202b.

As shown in FIG. 5A, the vacuum tank skin 66 comprises vacuum tank skin segments 70 that are separate and coupled between two multipurpose stiffener members 98. In this version, the multipurpose stiffener members 98, such as the multipurpose stringers 100, for example, the multipurpose box stringers 100a, can clamp the vacuum tank skin 66, and the vacuum tank skin 66 does not pass all the way through the interior 101 of the multipurpose stiffener members 98, such as the multipurpose stringers 100, for example, the multipurpose box stringers 100a. In another version, the vacuum tank skin 66 may comprise the continuous sheet 188 (see FIG. 12B) that passes all the way through the interior 101 of the multipurpose stiffener members 98, such as the multipurpose stringers 100, for example, the multipurpose box stringers 100a, and the vacuum tank skin 66 is functionally segmented into the vacuum tank skin segments 70 by the multipurpose stiffener members 98 coupled to the vacuum tank skin 66. The vacuum tank skin 66 is lightweight and capable of sustaining significant levels of external pressure, such as external pressure loads 40 (see FIG. 2). In one version, the multipurpose stiffener members 98, such as the multipurpose stringers 100, are attached to the vacuum tank skin 66, such as in the form of the continuous sheet 188. In another version, as shown in FIG. 11F, the multipurpose stiffener members 98, such as the multipurpose stringers 100, and the vacuum tank skin 66 may be made of composite material 128c (see FIG. 2), such as carbon fiber reinforced polymer (CFRP) or another suitable composite material, and can be one integral structural component.

As shown in FIG. 5A, the vacuum tank skin 66 further has the longitudinal cross section 74 with the profile geometry 76 configured for buckling prevention 78 (see FIG. 2) for the vacuum tank skin 66 under external pressure loads 40 (see FIG. 2). As further shown in FIG. 5A, the profile geometry 76 of the longitudinal cross section 74 of the vacuum tank skin 66 has the shape 86 comprising the corrugated shape 86a, for example, the sinusoidal shape 86b. As further shown in FIG. 5A, the profile geometry 76 comprises repeating patterns 185 of corrugations 186. As further shown in FIG. 5A, the vacuum tank skin 66 has the outer mold line 72, the inner mold line 73, the first end 190a or forward end, and the second end 190b or aft end.

The vacuum tank skin 66 provides a pressure barrier 80 (see FIG. 2) between the outside ambient pressure 82 (see FIG. 2) and the vacuum 60 (see FIG. 2) in the interior 58 (see FIG. 5A) of the segmented structurally integrated vacuum tank 11. The vacuum tank skin 66 carries hoop compression resulting from this pressure difference. Further, the vacuum tank skin 66 carries some flight loads 42 (see FIG. 2), such as fuselage torsion, when the structure 12 (see FIG. 2) comprises an aircraft 14 (see FIG. 2).

As shown in FIGS. 5A-5C, the segmented structurally integrated vacuum tank 11 further comprises the multipurpose stiffener members 98, such as the multipurpose stringers 100, for example, the multipurpose box stringers 100a, each coupled between two of the vacuum tank skin segments 70. Each of the multipurpose stiffener members 98, such as the multipurpose stringers 100, for example, the multipurpose box stringers 100a, is configured to carry one or more system transport lines 102 (see FIGS. 2, 6A-6D) in the interior 101 (see FIGS. 5A-5C) of the multipurpose stiffener members 98. As shown in FIG. 5B, each multipurpose box stringer 100a has a box-shaped cross section 192. Further, as shown in FIG. 5A, each multipurpose stiffener member 98, such as the multipurpose stringer 100, for example, the multipurpose box stringer 100a, is a closed section 103. In other versions, each multipurpose stiffener member 98, such as the multipurpose stringer 100, for example, the multipurpose box stringer 100a, may be an open section.

For aircraft 14 (see FIG. 1), the multipurpose stiffener members 98, such as the multipurpose stringers 100, for example, the multipurpose box stringers 100a, primarily carry flight loads 42 (see FIG. 2), and the vacuum tank skin 66 carries some flight loads 42, such as fuselage torsion. For aircraft 14 (see FIG. 1), the multipurpose stiffener members 98, such as the multipurpose stringers 100, are designed and sized to carry bending loads 110, such as the fuselage bending loads 110a (see FIG. 2) carried by the aft fuselage barrel section 18a (see FIG. 1) of the fuselage 16 (see FIG. 1).

As shown in FIG. 5A, each of the multipurpose stiffener members 98, such as the multipurpose stringers 100, for example, the multipurpose box stringers 100a, has the external profile 112 that is preferably a substantially straight external profile 113. As further shown in FIG. 5A, each of the multipurpose stiffener members 98, such as the multipurpose stringers 100, can have the internal profile 114 corresponding to the profile geometry 76 of the vacuum tank skin 66, or can have a substantially straight internal profile. As further shown in FIG. 5A, each of the multipurpose stiffener members 98, such as the multipurpose stringers 100, have the exterior side 115a and have the interior side 115b. The exterior side 115a of the multipurpose stiffener members 98, such as the multipurpose stringers 100, for example, the multipurpose box stringers 100a, is substantially straight, which facilitates attachment to the outer aero skin 20 (see FIGS. 3A, 11A). As further shown in FIG. 5A, each of the multipurpose stiffener members 98, such as the multipurpose stringers 100, for example, the multipurpose box stringers 100a, has the first end 194a, or forward end, and the second end 194b, or aft end.

As shown in FIGS. 5A-5C, in one version, the segmented structurally integrated vacuum tank 11 comprises six (6) multipurpose stiffener members 98, such as six (6) multipurpose stringers 100, for example, six (6) multipurpose box stringers 100a, arranged in the equal distance spaced relationship 178 (see FIG. 5B) around the circumference 180 (see FIG. 5B) of the segmented structurally integrated vacuum tank 11. In other versions, the number of multipurpose stiffener members 98, such as the multipurpose stringers 100, for example, the multipurpose box stringers 100a, may be two (2) to five (5), or seven (7) to twenty (20), or possibly greater than twenty (20), depending on the size of the structure 12.

As shown in FIG. 5B, the vacuum tank skin segments 70 of the vacuum tank skin 66 and the multipurpose stiffener members 98, such as the multipurpose stringers 100, form a cylinder 195 with a substantially cylindrical shape 196. In preferred versions, the cylinder 195 has a diameter with a length preferably in a range of 6 (six) feet (1.8 meters) to 20 (twenty) feet (6.1 meters) long. The outer diameter may have another suitable length. Further, the length of the vacuum tank skin 66 from the first end 190a (see FIG. 5A) to the second end 190b (see FIG. 5A) is preferably in a range of 6 (six) feet (1.8 meters) to 20 (twenty) feet (6.1 meters) long. More preferably, the length is 10 (ten) feet (3.0 meters) long, 15 (fifteen) feet (4.6 meters) long, 20 (twenty) feet (6.1 meters) long, or another suitable length greater than 20 (twenty) feet (6.1 meters).

As shown in FIGS. 5A-5C, the segmented vacuum jacketed tank system 10, such as the segmented vacuum jacketed circular and lobed shaped tank system 10c, further comprises the pressure tank 116, such as the internal pressure tank 116a, mounted within the segmented structurally integrated vacuum tank 11. As shown in FIG. 5A, the pressure tank 116 comprises the pressure tank main portion 122 comprising the pressure tank skin 124 having the outer surface 125 and the inner surface 126. The pressure tank skin 124 of the internal pressure tank 116a may be corrugated or non-corrugated. As shown in FIGS. 5A-5C, with the segmented vacuum jacketed circular and lobed shaped tank system 10c, the outer surface 125 and the inner surface 126 of the pressure tank skin 124 have the lobed shape 138, and match the lobed shape 138 of the inner surface 69 of the vacuum tank skin 66 comprising the vacuum tank skin segments 70.

As further shown in FIGS. 5A-5C, in one version, the pressure tank 116 further comprises the internal structure 134 in the interior 120 of the pressure tank 116 comprising interior shear walls 135 forming six (6) interior sections 136. In other versions, the pressure tank 116 has two (2) to five (5) interior sections 136, or seven (7) to twenty (20) interior sections 136, or more than twenty (20) interior sections. As shown in FIGS. 5A-5C, in one version, the interior shear walls 135 of the internal structure 134 comprise a truss structure 145. In other versions, each interior shear wall 135 comprises a flat sheet 140 (see FIG. 2), a tension structure 142 (see FIG. 2), a wire 144 (see FIG. 2), or another suitable interior shear wall structure. As shown in FIGS. 5A-5C, the bracket 332, such as the heavy bracket, or the channel shaped or C-shaped fitting, is preferably coupled, or attached, to portions 126a of the inner surface 126 of the pressure tank 116 and fitted adjacent to or near the interior side 115b and portions 254a of an inner section 254 of each multipurpose stiffener member 98, such as each multipurpose stringer 100, for example, each multipurpose box stringer 100a. The brackets 332 may be coupled, or attached, to the inner surface 126 of the pressure tank 116 with attachment means such as bonding, bolts, rivets, or other suitable attachment means. Each bracket 332 carries hoop tension loads around the interior side 115b and portions 254a of the inner section 254 of each multipurpose stiffener member 98, such as each multipurpose stringer 100, for example, each multipurpose box stringer 100a. As further shown in FIGS. 5A-5C, stiffener parts 334, such as beams, posts, or other suitable stiffener parts, may optionally be attached to one or more of the brackets 332. FIGS. 5A-5B show in one version the stiffener parts 334, such as two stiffener parts 334, attached to the bracket 332 which is coupled around the interior side 115b and the portions 254a of the inner section 254 of the topmost centered multipurpose stiffener member 98c, and FIGS. 5A-5C further show the stiffener parts 334 attached to all of the other brackets 332.

As shown in FIGS. 5A-5C, the segmented vacuum jacketed tank system 10, such as the segmented vacuum jacketed circular and lobed shaped tank system 10c, further comprises the vacuum cavity 148 forming the gap 150 formed between the segmented structurally integrated vacuum tank 11 and the pressure tank 116. With the segmented vacuum jacketed circular and lobed shaped tank system 10c, the gap 150 is small and constant between the segmented structurally integrated vacuum tank 11 and the pressure tank 116.

As shown in FIGS. 5A-5C, the geometry 198 of the pressure tank 116 is a lobed geometry 198b where the outer surface 125 and the inner surface 126 of the pressure tank skin 124 are lobed shape 138. As shown in FIGS. 5A-5C, the geometry 198 of the external segmented structurally integrated vacuum tank 11a is a hybrid circular and lobed geometry 198c, where the outer surface 68 of the vacuum tank skin 66 comprising the vacuum tank skin segments 70 is circular shape 184, and the inner surface 69 of the vacuum tank skin 66 comprising the vacuum tank skin segments 70 is lobed shape 138. This arrangement is advantageous because the increased radius of the interior crests of the vacuum tank skin 66 having the lobed shape 138, or lobed skin, allows an increased volume of cryogenic fluid 48 (see FIG. 2), such as liquid hydrogen 50 (see FIG. 2) or liquid natural gas 52 (see FIG. 2), compared to if the radius of the interior crests of the vacuum tank skin 66 having the lobed shape 138, or lobed skin, is substantially equal to the radius of the interior surface of the multipurpose stiffener members 98, such as the multipurpose stringers 100, while still preserving a circular or uniformly varying external loft surface. The magnitude of the maximum difference between radii between the crests and the troughs of the vacuum tank skin 66 having the lobed shape 138, or lobed skin, is calculated so that the buckling capacity of the vacuum tank skin 66 is adequate to sustain the compressive hoop stress from the external pressure load. The multipurpose stiffener members 98, such as the multipurpose stringers 100, are configured to have a significant depth, while not penalizing the radius and volume of the pressure tank 116 (see FIGS. 5A-5C).

Now referring to FIGS. 6A-6D, FIGS. 6A-6D show a version of a segmented structurally integrated vacuum tank 11 with various system transport lines 102. FIGS. 6A-6D show the vacuum tank main portion 62 comprising the vacuum tank skin 66 with the vacuum tank skin segments 70 having the outer surface 68 and the inner surface 69.

FIG. 6A is an illustration of a front right side perspective view of a version of the segmented structurally integrated vacuum tank 11, such as the external segmented structurally integrated vacuum tank 11a, with three (3) system transport lines 102, such as electrical lines 102b, positioned in and through the interior 101 of each multipurpose stiffener member 98, such as each multipurpose stringer 100, for example, each multipurpose box stringer 100a, coupled between two vacuum tank skin segments 70 of the vacuum tank skin 66.

Figure 6B:
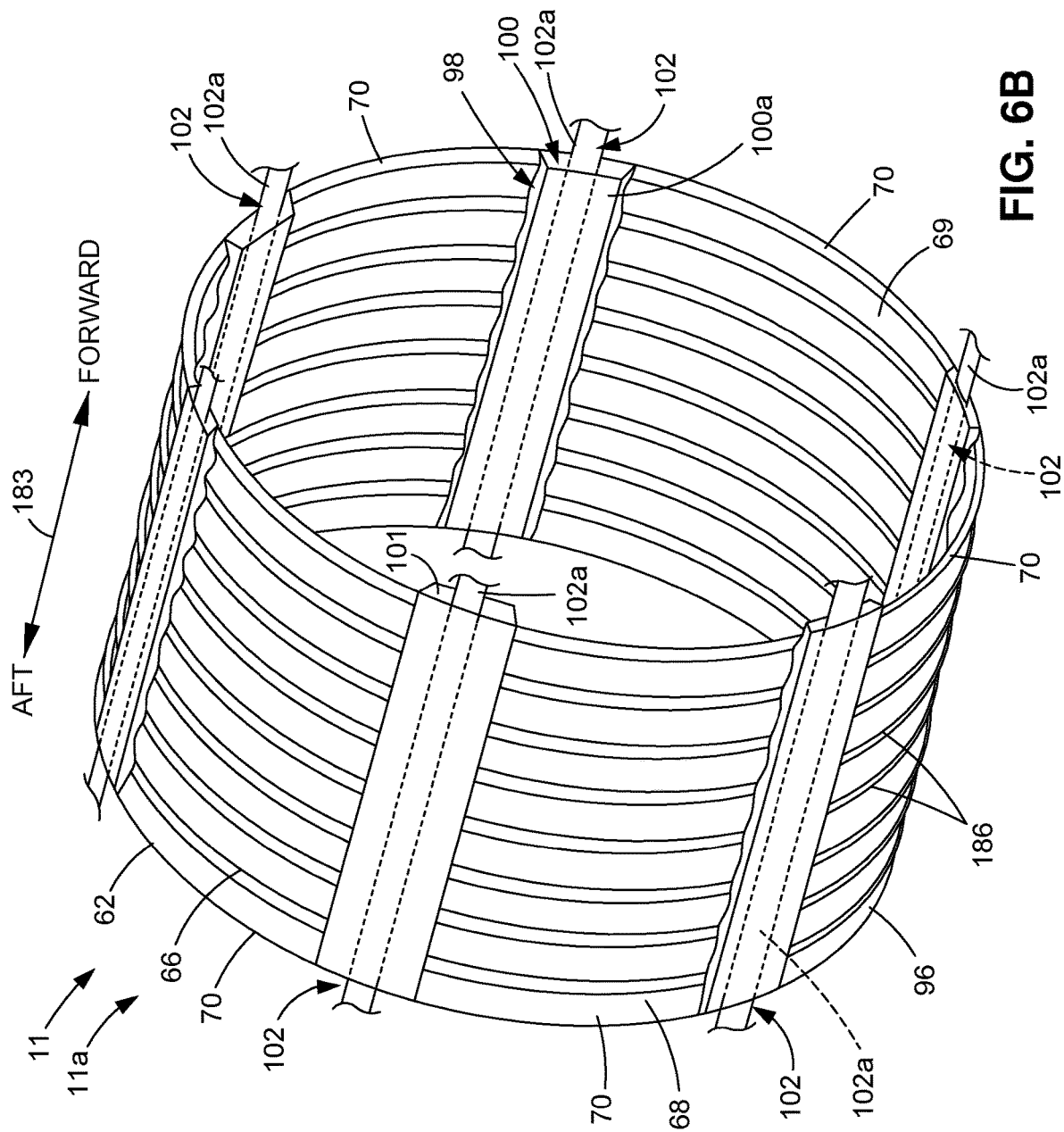
FIG. 6B is an illustration of a front right side perspective view of the segmented structurally integrated vacuum tank of FIG. 6A with one system transport line positioned in and through an interior of each multipurpose stiffener member.

FIG. 6B is an illustration of a front right side perspective view of the segmented structurally integrated vacuum tank 11, such as the external segmented structurally integrated vacuum tank 11a, of FIG. 6A, with one (1) system transport line 102, such as a fuel line 102a, or fuel tube or pipe, positioned in and through the interior 101 of each multipurpose stiffener member 98, such as each multipurpose stringer 100, for example, each multipurpose box stringer 100a, coupled between two vacuum tank skin segments 70 of the vacuum tank skin 66.

Figure 6C:
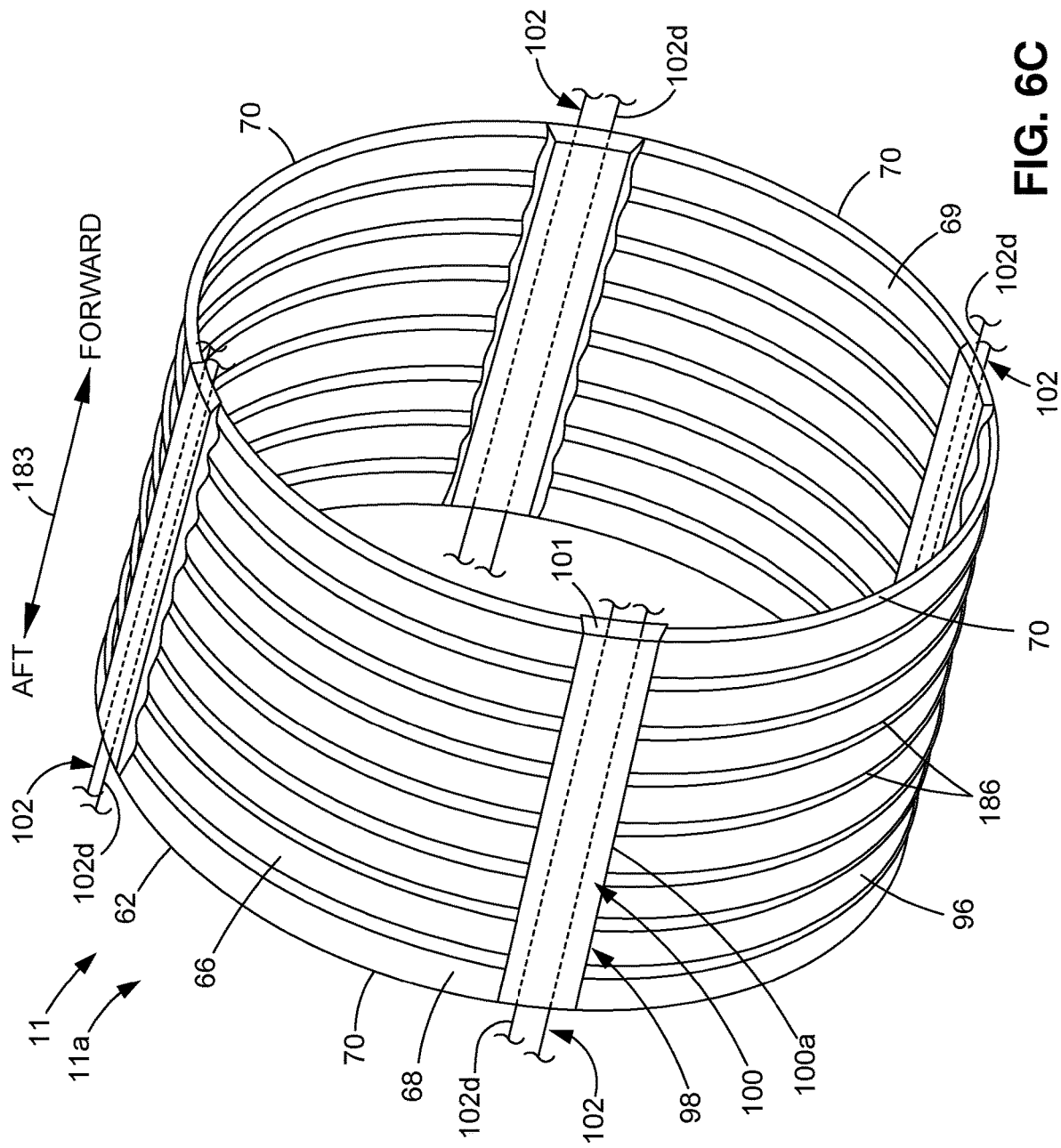
FIG. 6C is an illustration of a front right side perspective view of the segmented structurally integrated vacuum tank of FIG. 6A with two system transport lines positioned in and through an interior of each multipurpose stiffener member.

FIG. 6C is an illustration of a front right side perspective view of the segmented structurally integrated vacuum tank 11, such as the external segmented structurally integrated vacuum tank 11a, of FIG. 6A, with two (2) system transport lines 102, such as hydraulic lines 112d, positioned in and through the interior 101 of each multipurpose stiffener member 98, such as each multipurpose stringer 100, for example, each multipurpose box stringer 100a, coupled between two vacuum tank skin segments 70 of the vacuum tank skin 66.

Figure 6D:
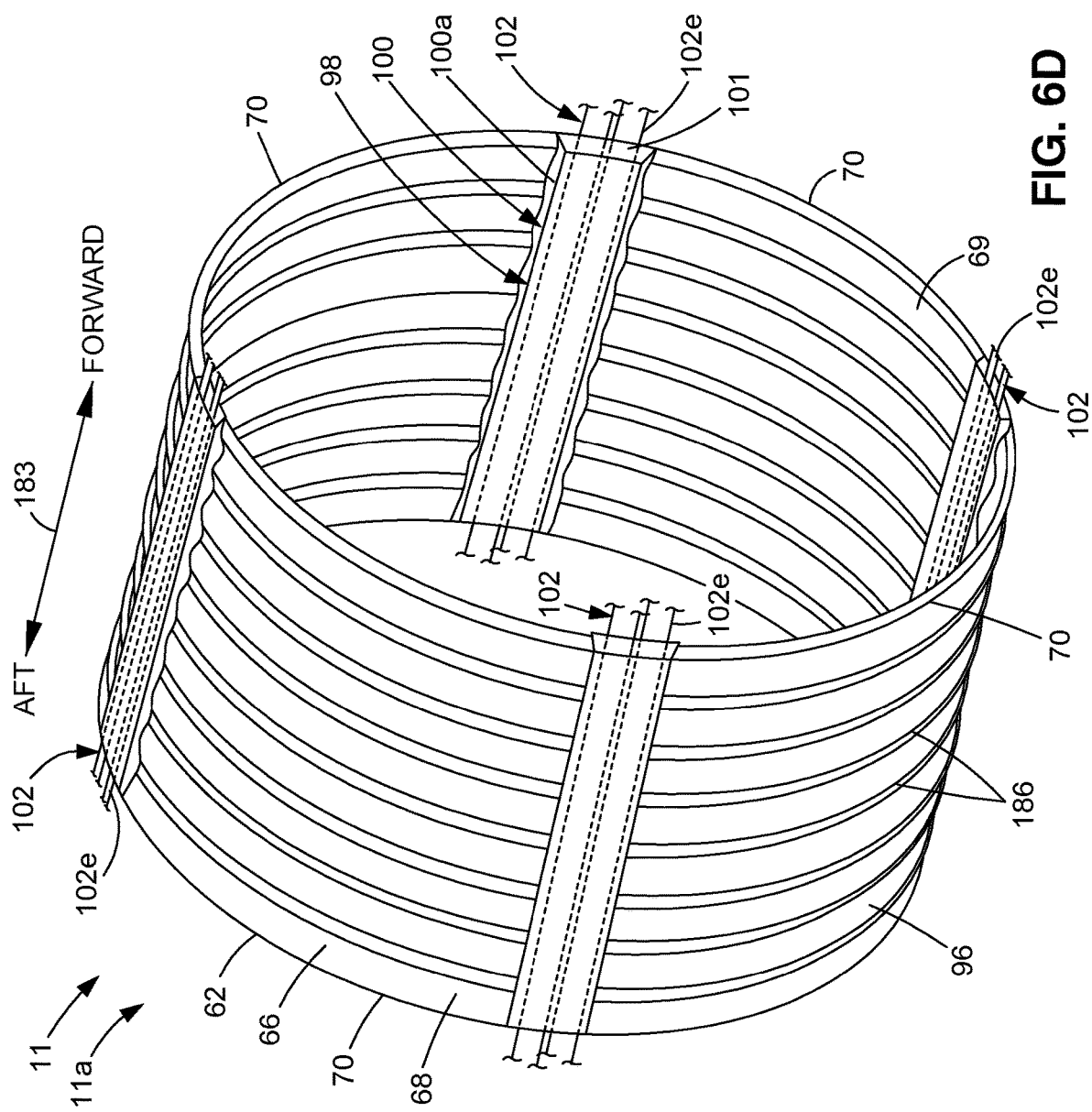
FIG. 6D is an illustration of a front right side perspective view of the segmented structurally integrated vacuum tank of FIG. 6A with four system transport lines positioned in and through an interior of each multipurpose stiffener member.

FIG. 6D is an illustration of a front right side perspective view of the segmented structurally integrated vacuum tank 11, such as the external segmented structurally integrated vacuum tank 11a, of FIG. 6A, with four (4) system transport lines 102, such as pneumatic lines 102e, positioned in and through the interior 101 of each multipurpose stiffener member 98, such as each multipurpose stringer 100, for example, each multipurpose box stringer 100a, coupled between two vacuum tank skin segments 70 of the vacuum tank skin 66.

As shown in FIGS. 6A-6D, in one version, the vacuum tank skin 66 comprises the corrugated solid skin 96, or corrugated solid panel, having corrugations 186. The corrugated solid skin 96, or corrugated solid panel, combines the advantages of a solid panel and a sandwich panel. The corrugated solid skin 96, or corrugated solid panel, has the advantages of being simple and inexpensive to manufacture, easy to join together, light in weight, and providing stability. Further, the undulating skin of the vacuum tank skin 66 in the form of the corrugated solid skin 96, or corrugated solid panel, precludes buckling under external pressure loading. The corrugated solid skin 96, or corrugated solid panel, takes static loads, including external pressure loads 40 (see FIG. 2), and takes fuselage torsional moment when the structure 12 comprises an aircraft 14. The corrugated solid skin 96, or corrugated solid panel, may comprise a single sheet and a continuous sheet 188 or may comprise vacuum tank skin segments 70 that are separate.

The vacuum tank skin 66 (see FIGS. 6A-6D) may be made of a metal material 128a (see FIG. 2) including aluminum, aluminum alloy, steel, stainless steel, titanium alloy, copper, copper alloy, or another suitable metal material, may be made of a polymer material 128b (see FIG. 2), including thermoplastic, polytetrafluoroethylene (PTFE), polyetheretherketone (PEEK), high density polyethylene, polyamide, elastomer, rubber, or another suitable polymer material, may be made of a composite material 128c (see FIG. 2), including carbon fiber reinforced polymer (CFRP), or another suitable composite material, may be made of a combination of one or more of the metal materials 128a, the polymer materials 128b, and the composite materials 128c, or may be made of another suitable material 128.

The vacuum tank skin 66 (see FIGS. 6A-6D) provides a pressure barrier 80 (see FIG. 2) between the outside ambient pressure 82 (see FIG. 2) and the vacuum 60 (see FIG. 2) in the interior 58 (see FIG. 6A) of the segmented structurally integrated vacuum tank 11 (see FIG. 6A). The vacuum tank skin 66 (see FIG. 6A) carries hoop compression resulting from this pressure difference. Further, the vacuum tank skin 66 (see FIG. 6A) carries some flight loads 42 (see FIG. 2), such as fuselage torsion, when the structure 12 (see FIG. 2) comprises an aircraft 14 (see FIG. 2). FIG. 6A further shows the outer mold line 72, the inner mold line 73, the first end 190a or forward end, the second end 190b or aft end, the longitudinal cross section 74 and the profile geometry 76 having the shape 86, such as the corrugated shape 86a, of the vacuum tank skin 66.

FIGS. 6A-6D further show the multipurpose stiffener members 98, such as the multipurpose stringers 100, for example, the multipurpose box stringers 100a, each coupled between two vacuum tank skin segments 70 of the vacuum tank skin 66. FIG. 6A shows the external profile 112 that is preferably a substantially straight external profile 113. As further shown in FIG. 6A, each of the multipurpose stiffener members 98, such as the multipurpose stringers 100, for example, the multipurpose box stringers 100a, can have the internal profile 114 corresponding to the profile geometry 76 of the vacuum tank skin 66, or can have a substantially straight internal profile. As further shown in FIG. 5A, each of the multipurpose stiffener members 98, such as the multipurpose stringers 100, for example, the multipurpose box stringers 100a, have the exterior side 115a and the interior side 115b. As shown in FIG. 6A, the vacuum tank skin segments 70 of the vacuum tank skin 66 and the multipurpose stiffener members 98, such as the multipurpose stringers 100, form the cylinder 195 with the substantially cylindrical shape 196. FIGS. 6A-6D further show the forward-aft direction 183.

Now referring to FIGS. 6E-6F. FIG. 6E is an illustration of a side view of a portion 66a of the vacuum tank skin 66, such as in the form of a corrugated solid skin 96, or corrugated solid panel, showing corrugations 186, and FIG. 6F is an illustration of an enlarged side view of a corrugation 186 shown in circle 6F of FIG. 6E. As shown in FIG. 6E, the vacuum tank skin 66, such as in the form of the corrugated solid skin 96, or corrugated solid panel, has the longitudinal cross section 74 comprising a corrugated cross section 74a and the profile geometry 76 has the corrugated shape 86a, such as in the form of the sinusoidal shape 86b. As shown in FIG. 6E, the corrugations 186 have the corrugated shape 86a, such as in the form of the sinusoidal shape 86b, with peaks 88 and valleys 90 that alternate, and have a substantially straight portion 92 in between each peak 88 and each valley 90, and the corrugated shape 86a, such as in the form of the sinusoidal shape 86b, has a first side 94a and a second side 94b.

FIG. 6F shows the corrugation 186 having the corrugated shape 86a, such as in the form of the sinusoidal shape 86b, with the peak 88, the valley 90, and the substantially straight portion 92 in between the peak 88 and the valley 90. FIG. 6F further shows a vacuum tank skin thickness ($t_{skin}$) 200 and an effective thickness (teff) 204 of the corrugated solid skin 96 (see FIG. 6E), or corrugated solid panel. The effective thickness (teff) 204 is used to calculate the buckling load of the vacuum tank skin 66 that is carrying hoop compression. Larger values of effective thickness (teff) 204 are more advantageous with respect to buckling load capacity. As shown in FIG. 6F, the effective thickness (teff) 204 of the corrugated solid skin 96, or corrugated solid panel, is much larger than the vacuum tank skin thickness ($t_{skin}$) 200, which gives the advantage of the corrugated solid skin 96, or corrugated solid panel, being lightweight for a given buckling load. In one example, the vacuum tank skin 66 shown in FIG. 6A may have a vacuum tank skin thickness ($t_{skin}$) 200 of 0.080 inch (0.20 centimeter), or another suitable vacuum tank skin thickness 200. In one example, the multipurpose stiffener member 98, such as the multipurpose stringer 100, shown in FIGS. 6A-6D, may have a multipurpose stringer wall thickness in a range between 0.1 inch (0.254 centimeter) and 0.5 inch (1.27 centimeter), or another suitable multipurpose stringer wall thickness. Combining the plurality of multipurpose stiffener members 98, such as the plurality of multipurpose stringers 100, with the vacuum tank skin 66 provides sufficient stiffness to carry the structural loads 109 (see FIG. 2), for example, bending loads 110 (see FIG. 2), such as the fuselage bending loads 110a (see FIG. 2).

Figure 7:
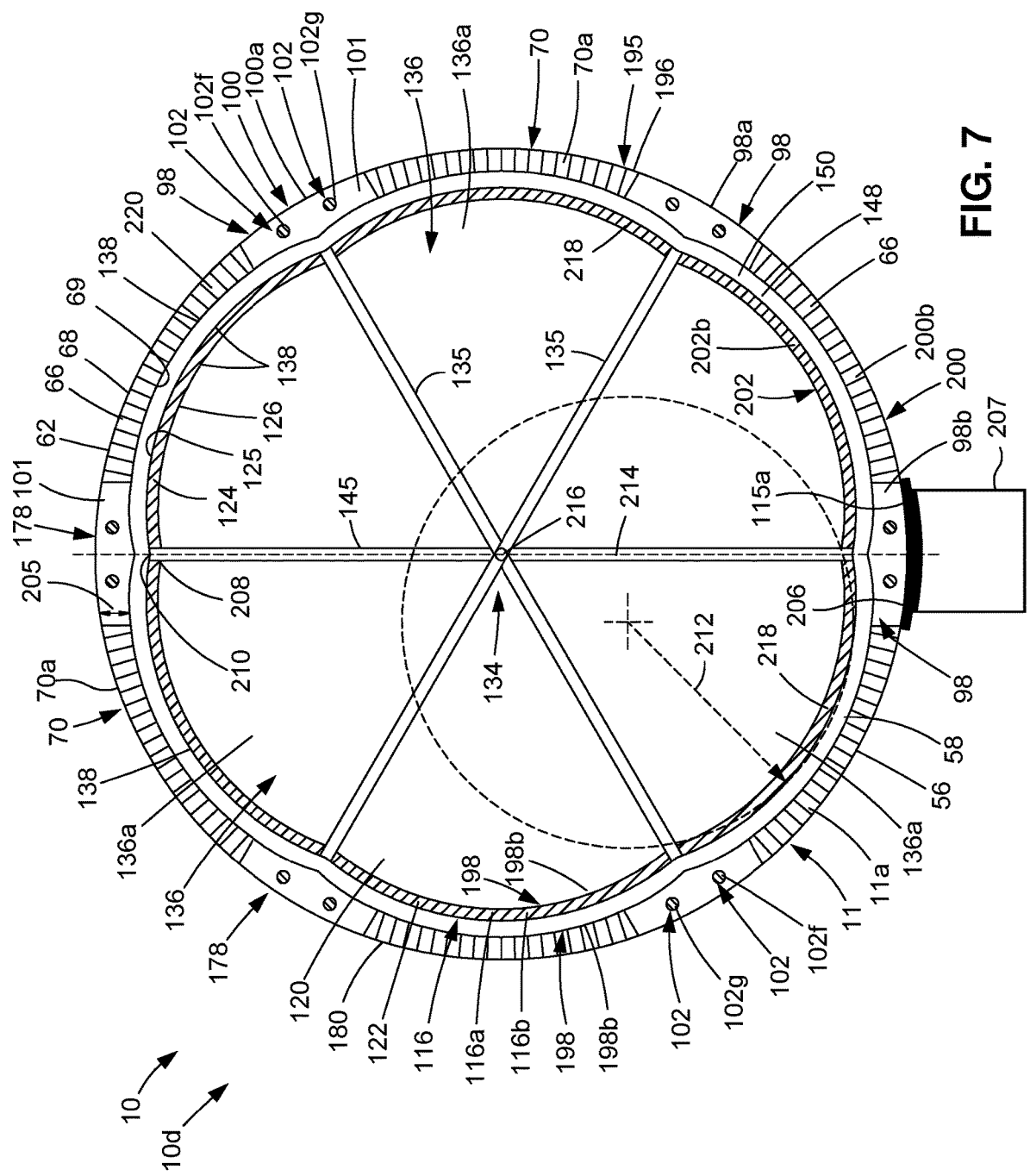
FIG. 7 is an illustration of a front side of another version of a segmented vacuum jacketed tank system of the disclosure in the form of a segmented vacuum jacketed lobed shaped tank system with six lobed interior sections and six multipurpose stiffener members.

Now referring to FIG. 7, FIG. 7 is an illustration of a front side of another version of a segmented vacuum jacketed tank system 10 of the disclosure in the form of a segmented vacuum jacketed lobed shaped tank system 10d with six (6) interior sections 136, such as six (6) lobed interior sections 136a, of the pressure tank 116, such as the internal pressure tank 116a, and with six (6) multipurpose stiffener members 98, such as six (6) multipurpose stringers 100, for example, six (6) multipurpose box stringers 100a, and six (6) vacuum tank skin segments 70, such as six (6) vacuum tank skin arc segments 70a, of the segmented structurally integrated vacuum tank 11, such as the external segmented structurally integrated vacuum tank 11a. FIG. 7 shows the pressure tank 116, such as the internal pressure tank 116a, in the form of an internal hydrogen tank 116b with six (6) lobed interior sections 136a.

As shown in FIG. 7, the segmented vacuum jacketed tank system 10, such as the segmented vacuum jacketed lobed shaped tank system 10d, comprises the segmented structurally integrated vacuum tank 11, such as the external segmented structurally integrated vacuum tank 11a, having the exterior 56, the interior 58, and the vacuum tank main portion 62 comprising the vacuum tank skin 66. As shown in FIG. 7, the vacuum tank skin 66 has the outer surface 68, or crest line or peak line, and the inner surface 69, or trough line or valley line, and the vacuum tank skin 66 comprises vacuum tank skin segments 70, such as in the form of vacuum tank skin arc segments 70a. Outer radii, or the crests or peaks, are a circle centered at a center of a fuselage 16 (see FIG. 1), and interior radii, or the troughs or valleys, are approximately 60% of the outer radii.

As shown in FIG. 7, with the segmented vacuum jacketed lobed shaped tank system 10d, the inner surface 69 of the vacuum tank skin 66 comprising the vacuum tank skin segments 70 has a lobed shape 138. As further shown in FIG. 7, with the segmented vacuum jacketed lobed shaped tank system 10d, the outer surface 125 and the inner surface 126 of the pressure tank skin 124 both have the lobed shape 138, and match the lobed shape 138 of the inner surface 69 of the vacuum tank skin 66 comprising the vacuum tank skin segments 70. Thus, the vacuum tank skin 66 has a lobed trough line, or inner surface 69, and the pressure tank skin 124 has pressure tank lines, or outer surface 125 and inner surface 126, that are lobed shape 138. As shown in FIG. 7, the vacuum tank skin 66 comprising the vacuum tank skin segments 70 has a vacuum tank skin thickness 200, such as a vacuum tank skin variable thickness 200b, and the pressure tank skin 124 may have a pressure tank skin thickness 202, such as a pressure tank skin variable thickness 202b. In another version, the pressure tank skin 124 may have the pressure tank skin thickness 202 comprising the pressure tank skin constant thickness 202a (see FIG. 4B).

As shown in FIG. 7, the geometry 198 of both the inner surface 69 of the external segmented structurally integrated vacuum tank 11a and the internal pressure tank 116a is a lobed geometry 198b with the vacuum tank skin segments 70 and the lobed interior sections 136a having the lobed shape 138. The vacuum tank skin variable thickness 200b, or depth, for example, the thickness or depth of the corrugations 186 (see FIG. 6E) of the vacuum tank skin 66, can vary from being equivalent to a thickness 205 (see FIG. 7) of the multipurpose stiffener member 98, such as the multipurpose stringer 100, for example, the multipurpose box stringer 100a, to a value much thinner in the vacuum tank skin 66 between the two multipurpose stiffener members 98, such as the multipurpose stringers 100, for example, the multipurpose box stringers 100a. The magnitude of the radii corresponding to the trough location and the crest location of the vacuum tank skin 66 at the location approximately mid-way circumferentially between the multipurpose stiffener members 98, such as the multipurpose stringers 100, can be adjusted so that the buckling load of that arrangement is equivalent to the buckling load of an arrangement where these radii do not vary along the circumference 180 of the segmented structurally integrated vacuum tank 11. The vacuum tank skin variable thickness 200b allows for a greater volume 54 (see FIG. 2) of cryogenic fluid 48 (see FIG. 2), or fuel, and a geometry 198 that is simpler for the internal pressure tank 116a.

As shown in FIG. 7, the vacuum tank skin 66 comprises vacuum tank skin segments 70 that are separate and coupled between two multipurpose stiffener members 98. In this version, the multipurpose stiffener members 98, such as the multipurpose stringers 100, for example, the multipurpose box stringers 100a, can clamp the vacuum tank skin 66, and the vacuum tank skin 66 does not pass all the way through the interior 101 of the multipurpose stiffener members 98, such as the multipurpose stringers 100, for example, the multipurpose box stringers 100a. In another version, the vacuum tank skin 66 may comprise the continuous sheet 188 (see FIG. 12B) that passes all the way through the interior 101 of the multipurpose stiffener members 98, such as the multipurpose stringers 100, for example, the multipurpose box stringers 100a, and the vacuum tank skin 66 is functionally segmented into the vacuum tank skin segments 70 by the multipurpose stiffener members 98 coupled to the vacuum tank skin 66. The vacuum tank skin 66 is lightweight and capable of sustaining significant levels of external pressure, such as external pressure loads 40 (see FIG. 2). In one version, the multipurpose stiffener members 98, such as the multipurpose stringers 100, are attached to the vacuum tank skin 66, such as in the form of the continuous sheet 188. In another version, as shown in FIG. 11F, the multipurpose stiffener members 98, such as the multipurpose stringers 100, and the vacuum tank skin 66 may be made of a composite material 128c (see FIG. 2), such as carbon fiber reinforced polymer (CFRP) or another suitable composite material, and can be one integral structural component.

As shown in FIG. 7, the segmented structurally integrated vacuum tank 11 further comprises the multipurpose stiffener members 98, such as the multipurpose stringers 100, for example, the multipurpose box stringers 100a, each coupled between two of the vacuum tank skin segments 70. The multipurpose stiffener members 98 comprise multipurpose mega-stiffener members 98a (see FIG. 7).

As shown in FIG. 7, the multipurpose stiffener members 98, such as the multipurpose stringers 100, for example, the multipurpose box stringers 100a, contain or carry two (2) system transport lines 102, including compressed air lines 102f and power lines 102g, in the interior 101 of the multipurpose stiffener members 98. The multipurpose stiffener members 98, such as the multipurpose stringers 100, for example, the multipurpose box stringers 100a, can contain or carry one (1) system transport line 102 or more than two (2) system transport lines 102, and can contain or carry the same system transport lines 102 or different system transport lines 102.

As shown in FIG. 7, for aircraft 14, one of the multipurpose stiffener members 98 comprises the bottommost centered multipurpose stiffener member 98b equipped with a tail skid attachment fitting 206 coupled to the exterior side 115a of the bottommost centered multipurpose stiffener member 98b. A tail skid 207 (see FIG. 7) is coupled, or attached, to the tail skid attachment fitting 206. The tail skid 207 is used against, or to prevent, a tail strike which occurs when the tail 28 (see FIG. 1) of the aircraft 14 (see FIG. 1) strikes the ground or other stationary object on takeoff or landing of the aircraft 14. A tail strike may cause damage to the aircraft, which may result in costly repairs and downtime of the aircraft 14 during the repairs. A tail strike is one condition that is considered for hydrogen tanks on aircraft 14. The tail skid 207 is a structural attachment attached to the exterior side 115a of the bottommost centered multipurpose stiffener member 98b that absorbs any contact when the aft fuselage barrel section 18a or the tail 28 of the aircraft 14 strikes the ground or other stationary object on takeoff or landing of the aircraft 14. The bottommost centered multipurpose stiffener member 98b provides an optimum location to position and attach the tail skid attachment fitting 206 and the tail skid 207 coupled, or attached, to the tail skid attachment fitting 206.

For aircraft 14 (see FIG. 1), the multipurpose stiffener members 98, such as the multipurpose stringers 100, for example, the multipurpose box stringers 100a, primarily carry flight loads 42 (see FIG. 2), and the vacuum tank skin 66 carries some flight loads 42, such as fuselage torsion. For aircraft 14 (see FIG. 1), the multipurpose stiffener members 98, such as the multipurpose stringers 100, are designed and sized to carry bending loads 110, such as the fuselage bending loads 110a (see FIG. 2) carried by the aft fuselage barrel section 18a (see FIG. 1) of the fuselage 16 (see FIG. 1).

As shown in FIG. 7, in one version, the segmented structurally integrated vacuum tank 11 comprises six (6) multipurpose stiffener members 98, such as six (6) multipurpose stringers 100, for example, six (6) multipurpose box stringers 100a, arranged in the equal distance spaced relationship 178 around the circumference 180 of the segmented structurally integrated vacuum tank 11. In other versions, the number of multipurpose stiffener members 98, such as the multipurpose stringers 100, for example, the multipurpose box stringers 100a, may be two (2) to five (5), or seven (7) to twenty (20), or possibly greater than twenty (20), depending on the size of the structure 12. In other versions, the multipurpose stiffener members 98, such as the multipurpose stringers 100, may be positioned in a non-equal distance spacing with respect to each other. Although FIGS. 3B-6D and 7-9 show the multipurpose stiffener members 98, such as the multipurpose stringers 100, symmetrically arranged around the circumference 180 of the segmented structurally integrated vacuum tank 11, the multipurpose stiffener members 98, such as the multipurpose stringers 100, need not be equal, or symmetrically arranged, around the circumference 180 of the segmented structurally integrated vacuum tank 11.

As shown in FIG. 7, the vacuum tank skin segments 70 of the vacuum tank skin 66 and the multipurpose stiffener members 98, such as the multipurpose stringers 100, form a cylinder 195 with a substantially cylindrical shape 196. In preferred versions, the cylinder 195 has a diameter with a length preferably in a range of 6 (six) feet (1.8 meters) to 20 (twenty) feet (6.1 meters) long. The outer diameter may have another suitable length.

As shown in FIG. 7, the segmented vacuum jacketed tank system 10, such as the segmented vacuum jacketed lobed shaped tank system 10d, further comprises the pressure tank 116, such as the internal pressure tank 116a, mounted within the segmented structurally integrated vacuum tank 11. As shown in FIG. 7, the pressure tank 116 comprises the pressure tank main portion 122 comprising the pressure tank skin 124 having the outer surface 125 and the inner surface 126. The pressure tank skin 124 of the internal pressure tank 116a may be corrugated or non-corrugated. For drawing clarity, the thickness of the pressure tank skin 124 is shown thicker in FIG. 7 (and in FIGS. 8-9) than it might actually be. Typically, the thickness of the pressure tank skin 124 may be about 0.030 inch to 0.050 inch.

As further shown in FIG. 7, in one version, the pressure tank 116 further comprises the internal structure 134 in the interior 120 of the pressure tank 116 comprising interior shear walls 135 forming six (6) interior sections 136, such as six (6) lobed interior sections 136a. In other versions, the pressure tank 116 has two (2) to five (5) interior sections 136, or seven (7) to twenty (20) interior sections 136, or more than twenty (20) interior sections 136.

As shown in FIG. 7, at a junction 208 of each of two (2) interior sections 136, such as two (2) lobed interior sections 136a, is a discontinuity of curvature 210, resulting in an outward kick load that may circularize the shape of the pressure tank 116. The internal structure 134 is used to carry that kick load. As shown in FIG. 7, in one version, the interior shear walls 135 of the internal structure 134 comprise a truss structure 145. In other versions, each interior shear wall 135 comprises a flat sheet 140 (see FIG. 2), a tension structure 142 (see FIG. 2), a wire 144 (see FIG. 2), or another suitable interior shear wall structure. Each of these interior shear walls 135 may function as, or support, anti-slosh baffles 146 (see FIG. 2) for the cryogenic fluid 48, or fuel. FIG. 7 further shows a vertical axis 214 through a center 216 of the internal pressure tank 116a.

As shown in FIG. 7, the segmented vacuum jacketed tank system 10, such as the segmented vacuum jacketed lobed shaped tank system 10d, further comprises the vacuum cavity 148 forming the gap 150 formed between the segmented structurally integrated vacuum tank 11 and the pressure tank 116. With the segmented vacuum jacketed lobed shaped tank system 10d, the gap 150 is small and constant between the segmented structurally integrated vacuum tank 11 and the pressure tank 116.

FIG. 7 shows the segmented vacuum jacketed lobed shaped tank system 10d with the pressure tank 116, such as the internal pressure tank 116a, having six (6) interior sections 136, such as six (6) lobed interior sections 136a. FIG. 7 shows a radius of curvature 212 of a lobed interior section 136a of the pressure tank 116. Having six (6) lobed interior sections 136a has advantages for both the internal pressure tank 116a and the external segmented structurally integrated vacuum tank 11a. For example, having six (6) lobed interior sections 136a provides a decreased radius of curvature for internal walls 218 (see FIG. 7) of the internal pressure tank 116a and for external walls 220 (see FIG. 7) of the external segmented structurally integrated vacuum tank 11a. For the internal pressure tank 116a, having a decreased radius of curvature is advantageous because a smaller radius of curvature results in lower hoop tension stresses in the pressure tank skin 124. For the pressure tank 116, such as the internal pressure tank 116a, having a decreased radius of curvature is advantageous because the decreased radius of curvature helps to decrease the buckling load, as does the reduced distance between the multipurpose stiffener members 98, which act as supports to the vacuum tank skin 66. For the segmented structurally integrated vacuum tank 11, the magnitude of the radii corresponding to the trough location and the crest location of the vacuum tank skin 66 at the location approximately mid-way circumferentially between the multipurpose stiffener members 98, such as the multipurpose stringers 100, can be adjusted so that the buckling load of that arrangement is equivalent to the buckling load of an arrangement where these radii do not vary along the circumference 180 of the segmented structurally integrated vacuum tank 11 (see FIG. 6E).

Figure 8:
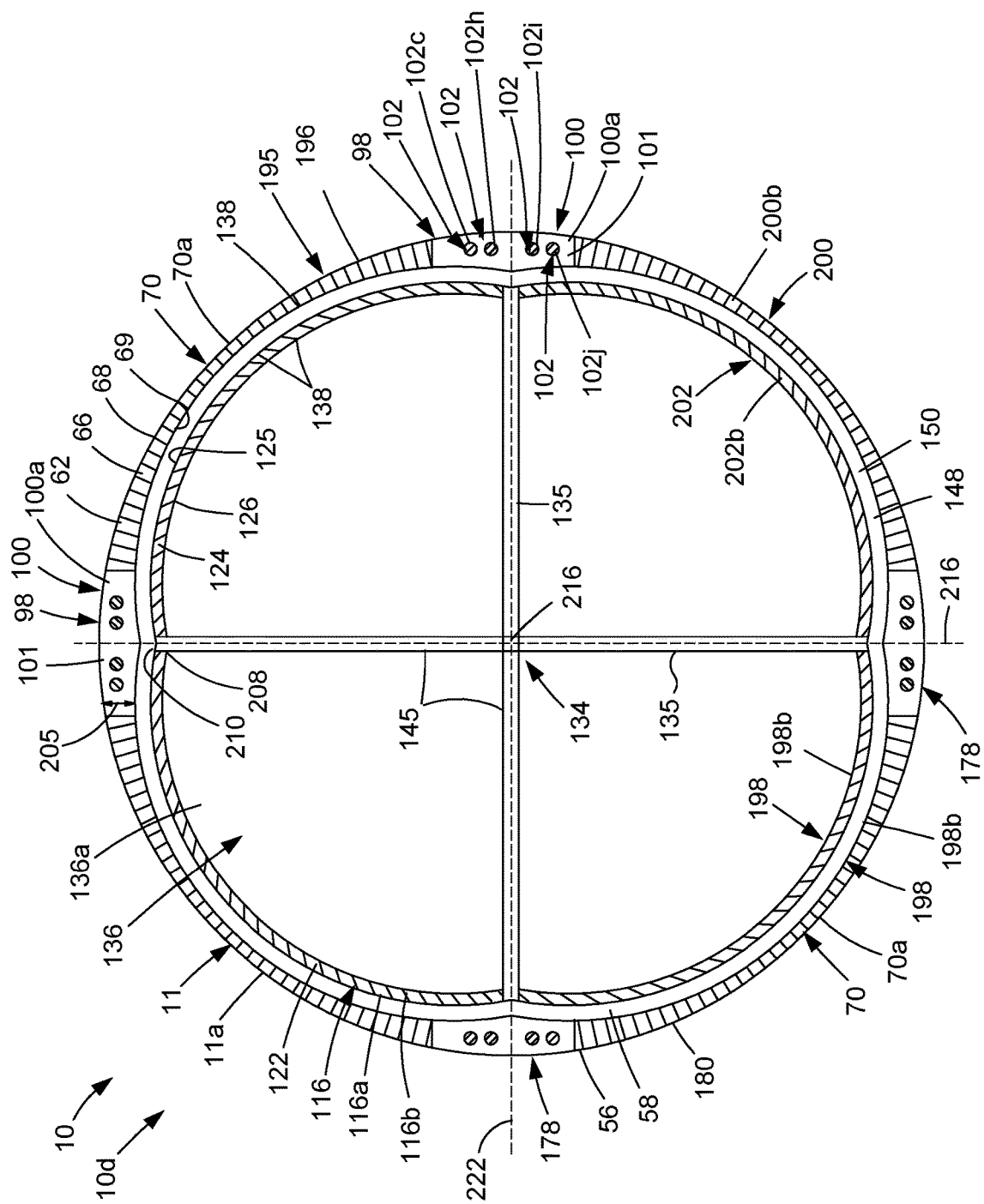
FIG. 8 is an illustration of a front side of another version of a segmented vacuum jacketed tank system of the disclosure in the form of a segmented vacuum jacketed lobed shaped tank system with four lobes and four multipurpose stiffener members.

In addition, having six (6) lobed interior sections 136a provides a more redundant fuselage structure. If one of the multipurpose stiffener members 98, such as the multipurpose stringers 100, is structurally compromised, the remaining five (5) multipurpose stiffener members 98, such as the remaining five (5) multipurpose stringers 100, are more capable of carrying the flight loads 42 (see FIG. 1), compared to the segmented vacuum jacketed lobed shaped tank system 10d with the four (4) lobed interior sections 136a, as shown in FIG. 8. Further, having six (6) lobed interior sections 136a may provide an improved integration with aircraft structure or systems, and provides a decreased circumferential length for the external walls 220 of the external segmented structurally integrated vacuum tank 11a between the multipurpose stiffener members 98, such as the multipurpose stringers 100. A decreased circumferential length has a positive effect upon the buckling load.

Now referring to FIG. 8, FIG. 8 is an illustration of a front side of another version of a segmented vacuum jacketed tank system 10 of the disclosure in the form of a segmented vacuum jacketed lobed shaped tank system 10d with four (4) interior sections 136, such as four (4) lobed interior sections 136a, of the pressure tank 116, such as the internal pressure tank 116a, and with four (4) multipurpose stiffener members 98, such as four (4) multipurpose stringers 100, for example, four (4) multipurpose box stringers 100a, and four (4) vacuum tank skin segments 70, such as four (4) vacuum tank skin arc segments 70a, of the segmented structurally integrated vacuum tank 11, such as the external segmented structurally integrated vacuum tank 11a. FIG. 8 shows the pressure tank 116 in the form of an internal hydrogen tank 116b with four (4) lobed interior sections 136a.

As shown in FIG. 8, the segmented vacuum jacketed tank system 10, such as the segmented vacuum jacketed lobed shaped tank system 10d, comprises the segmented structurally integrated vacuum tank 11, such as the external segmented structurally integrated vacuum tank 11a, having the exterior 56, the interior 58, and the vacuum tank main portion 62 comprising the vacuum tank skin 66. As shown in FIG. 8, the vacuum tank skin 66 has the outer surface 68, or crest line or peak line, and the inner surface 69, or trough line or valley line, and the vacuum tank skin 66 comprises vacuum tank skin segments 70, such as in the form of vacuum tank skin arc segments 70a. Outer radii, or the crests or peaks, are a circle centered at a center of a fuselage 16 (see FIG. 1), and interior radii, or the troughs or valleys, are approximately 80% of the outer radii.

As shown in FIG. 8, with the segmented vacuum jacketed lobed shaped tank system 10d, the inner surface 69 of the vacuum tank skin 66 comprising the vacuum tank skin segments 70 has the lobed shape 138. As further shown in FIG. 8, with the segmented vacuum jacketed lobed shaped tank system 10d, the outer surface 125 and the inner surface 126 of the pressure tank skin 124 both have the lobed shape 138, and match the lobed shape 138 of the inner surface 69 of the vacuum tank skin 66 comprising the vacuum tank skin segments 70. As shown in FIG. 8, the vacuum tank skin 66 comprising the vacuum tank skin segments 70 has a vacuum tank skin thickness 200, such as a vacuum tank skin variable thickness 200b, and the pressure tank skin 124 has a pressure tank skin thickness 202, such as a pressure tank skin variable thickness 202b. In another version, the pressure tank skin 124 may have the pressure tank skin thickness 202 comprising the pressure tank skin constant thickness 202a (see FIG. 4B).

As shown in FIG. 8, the geometry 198 of both inner surface 69 of the external segmented structurally integrated vacuum tank 11a and the internal pressure tank 116a is the lobed geometry 198b with the vacuum tank skin segments 70 and the lobed interior sections 136a having the lobed shape 138. The vacuum tank skin variable thickness 200b, or depth, for example, the thickness or depth of the corrugations 186 (see FIG. 6E) of the vacuum tank skin 66, can vary from being equivalent to a thickness 205 (see FIG. 8) of the multipurpose stiffener member 98, such as the multipurpose stringer 100, for example, the multipurpose box stringer 100a, to a value much thinner in the vacuum tank skin 66 between the two multipurpose stiffener members 98, such as the multipurpose stringers 100, for example, the multipurpose box stringers 100a. The magnitude of the radii corresponding to the trough location and the crest location of the vacuum tank skin 66 at the location approximately mid-way circumferentially between the multipurpose stiffener members 98, such as the multipurpose stringers 100, can be adjusted so that the buckling load of that arrangement is equivalent to the buckling load of an arrangement where these radii do not vary along the circumference 180 of the segmented structurally integrated vacuum tank 11. The vacuum tank skin variable thickness 200b allows for a greater volume 54 (see FIG. 2) of cryogenic fluid 48 (see FIG. 2), or fuel, and a geometry 198 that is simpler for the internal pressure tank 116a.

As shown in FIG. 8, the vacuum tank skin 66 comprises vacuum tank skin segments 70 that are separate and coupled between two multipurpose stiffener members 98. In this version, the multipurpose stiffener members 98, such as the multipurpose stringers 100, for example, the multipurpose box stringers 100a, can clamp the vacuum tank skin 66, and the vacuum tank skin 66 does not pass all the way through the interior 101 of the multipurpose stiffener members 98, such as the multipurpose stringers 100, for example, the multipurpose box stringers 100a.

As shown in FIG. 8, the segmented structurally integrated vacuum tank 11 further comprises the multipurpose stiffener members 98, such as the multipurpose stringers 100, for example, the multipurpose box stringers 100a, each coupled between two of the vacuum tank skin segments 70. The multipurpose stiffener members 98 comprise multipurpose mega-stiffener members 98a (see FIG. 8).

As shown in FIG. 8, the multipurpose stiffener members 98, such as the multipurpose stringers 100, for example, the multipurpose box stringers 100a, contain or carry four (4) system transport lines 102, including electrical signal lines 102c, lighting lines 102h, auxiliary power unit lines 102i, and data bus lines 102j, in the interior 101 of the multipurpose stiffener members 98. The multipurpose stiffener members 98, such as the multipurpose stringers 100, for example, the multipurpose box stringers 100a, can contain or carry one (1) to three (3) system transport lines 102 or more than four (4) system transport lines 102, and can contain or carry the same system transport lines 102 or different system transport lines 102.

As shown in FIG. 8, in one version, the segmented structurally integrated vacuum tank 11 comprises four (4) multipurpose stiffener members 98, such as four (4) multipurpose stringers 100, for example, four (4) multipurpose box stringers 100a, arranged in the equal distance spaced relationship 178 around the circumference 180 of the segmented structurally integrated vacuum tank 11. In other versions, the number of multipurpose stiffener members 98, such as the multipurpose stringers 100, for example, the multipurpose box stringers 100a, may be two (2) to three (3), or five (5) to twenty (20), or possibly greater than twenty (20), depending on the size of the structure 12.

As shown in FIG. 8, the vacuum tank skin segments 70 of the vacuum tank skin 66 and the multipurpose stiffener members 98, such as the multipurpose stringers 100, form a cylinder 195 with a substantially cylindrical shape 196. In preferred versions, the cylinder 195 has a diameter with a length preferably in a range of 6 (six) feet (1.8 meters) to 20 (twenty) feet (6.1 meters) long. The outer diameter may have another suitable length.

As shown in FIG. 8, the segmented vacuum jacketed tank system 10, such as the segmented vacuum jacketed lobed shaped tank system 10d, further comprises the pressure tank 116, such as the internal pressure tank 116a, mounted within the segmented structurally integrated vacuum tank 11. As shown in FIG. 8, the pressure tank 116 comprises the pressure tank main portion 122 comprising the pressure tank skin 124 having the outer surface 125 and the inner surface 126. The pressure tank skin 124 of the internal pressure tank 116a may be corrugated or non-corrugated.

As further shown in FIG. 8, in one version, the pressure tank 116 further comprises the internal structure 134 in the interior 120 of the pressure tank 116 comprising interior shear walls 135 forming four (4) interior sections 136, such as four (4) lobed interior sections 136a. In other versions, the pressure tank 116 has two (2) to three (3) interior sections 136, or five (5) to twenty (20) interior sections 136, or more than twenty (20) interior sections 136.

As shown in FIG. 8, at the junction 208 of each of two (2) interior sections 136, such as two (2) lobed interior sections 136a, is the discontinuity of curvature 210, resulting in an outward kick load that may circularize the shape of the pressure tank 116. The internal structure 134 is used to carry that kick load. As shown in FIG. 8, in one version, the interior shear walls 135 of the internal structure 134 comprise a truss structure 145. In other versions, each interior shear wall 135 comprises a flat sheet 140 (see FIG. 2), a tension structure 142 (see FIG. 2), a wire 144 (see FIG. 2), or another suitable interior shear wall structure. Each of these interior shear walls 135 may function as, or support, anti-slosh baffles 146 (see FIG. 2) for the cryogenic fluid 48, or fuel. FIG. 8 further shows the vertical axis 214 through the center 216 of the internal pressure tank 116a and a lateral axis 222 through the center 216 of the internal pressure tank 116a.

As shown in FIG. 8, the segmented vacuum jacketed tank system 10, such as the segmented vacuum jacketed lobed shaped tank system 10d, further comprises the vacuum cavity 148 forming the gap 150 formed between the segmented structurally integrated vacuum tank 11 and the pressure tank 116. With the segmented vacuum jacketed lobed shaped tank system 10d, the gap 150 is small and constant between the segmented structurally integrated vacuum tank 11 and the pressure tank 116.

Figure 9:
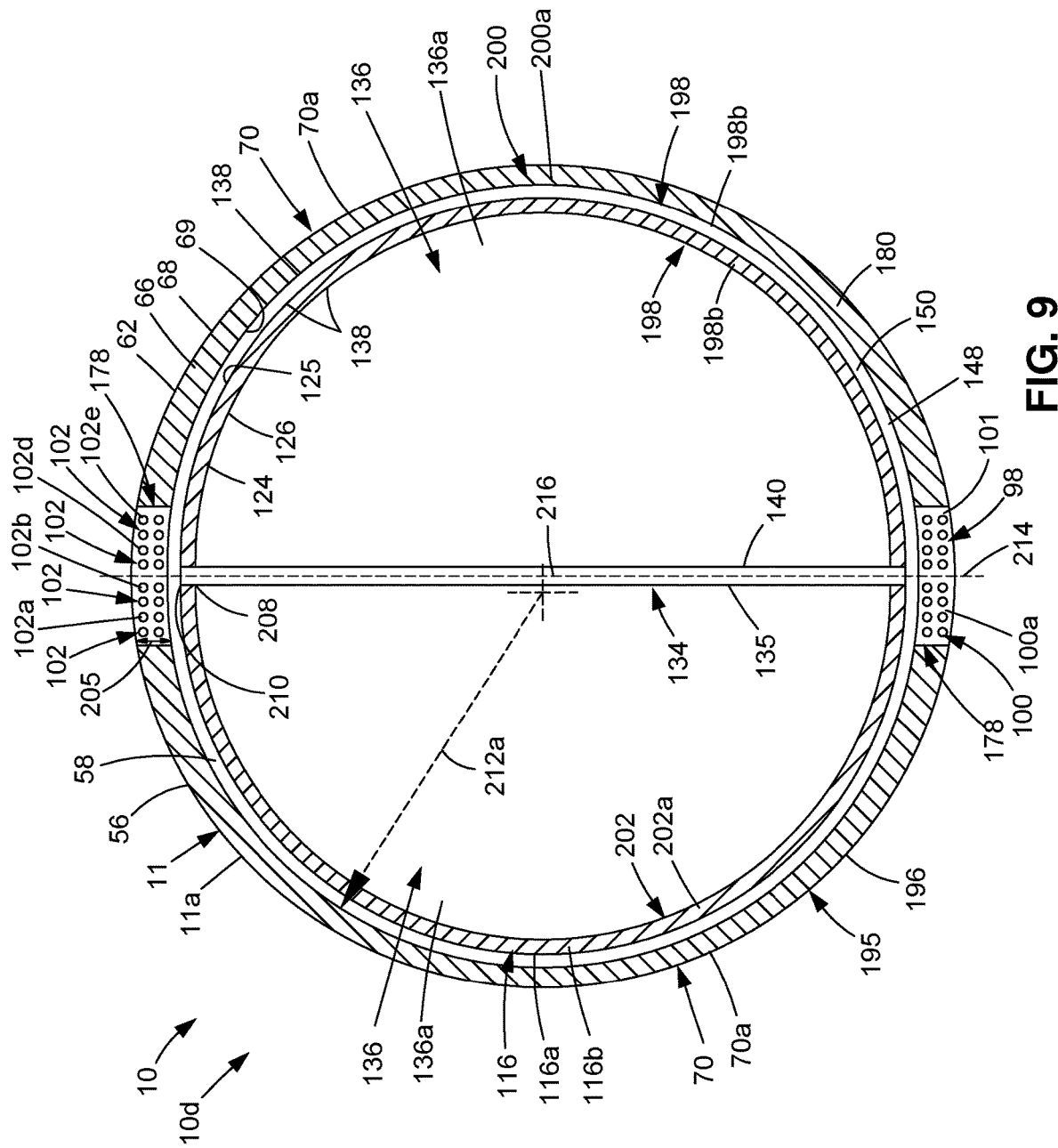
FIG. 9 is an illustration of a front side of another version of a segmented vacuum jacketed tank system of the disclosure in the form of a segmented vacuum jacketed lobed shaped tank system with two lobes and two multipurpose stiffener members.

Now referring to FIG. 9, FIG. 9 is an illustration of a front side of another version of a segmented vacuum jacketed tank system 10 of the disclosure in the form of a segmented vacuum jacketed lobed shaped tank system 10d with two (2) interior sections 136, such as two (2) lobed interior sections 136a, of the pressure tank 116, such as the internal pressure tank 116a, and with two (2) multipurpose stiffener members 98, such as two (2) multipurpose stringers 100, for example, two (2) multipurpose box stringers 100a, and two (2) vacuum tank skin segments 70, such as two (2) vacuum tank skin arc segments 70a, of the segmented structurally integrated vacuum tank 11, such as the external segmented structurally integrated vacuum tank 11a. FIG. 9 shows the pressure tank 116 in the form of an internal hydrogen tank 116b with two (2) lobed interior sections 136a.

As shown in FIG. 9, the segmented vacuum jacketed tank system 10, such as the segmented vacuum jacketed lobed shaped tank system 10d, comprises the segmented structurally integrated vacuum tank 11, such as the external segmented structurally integrated vacuum tank 11a, having the exterior 56, the interior 58, and the vacuum tank main portion 62 comprising the vacuum tank skin 66. As shown in FIG. 9, the vacuum tank skin 66 has the outer surface 68, or crest line or peak line, and the inner surface 69, or trough line or valley line, and the vacuum tank skin 66 comprises vacuum tank skin segments 70, such as in the form of vacuum tank skin arc segments 70a. Outer radii, or the crests or peaks, are a circle centered at a center of a fuselage 16 (see FIG. 1), and interior radii, or the troughs or valleys, are approximately 95% of the outer radii.

As shown in FIG. 9, with the segmented vacuum jacketed lobed shaped tank system 10d, the inner surface 69 of the vacuum tank skin 66 comprising the vacuum tank skin segments 70 has the lobed shape 138. As further shown in FIG. 9, with the segmented vacuum jacketed lobed shaped tank system 10d, the outer surface 125 and the inner surface 126 of the pressure tank skin 124 both have the lobed shape 138, and match the lobed shape 138 of the inner surface 69 of the vacuum tank skin 66 comprising the vacuum tank skin segments 70. As shown in FIG. 9, the vacuum tank skin 66 comprising the vacuum tank skin segments 70 has a vacuum tank skin thickness 200, such as a vacuum tank skin variable thickness 200b, and the pressure tank skin 124 has a pressure tank skin thickness 202, such as a pressure tank skin variable thickness 202b. In another version, the pressure tank skin 124 may have the pressure tank skin thickness 202 comprising the pressure tank skin constant thickness 202a (see FIG. 4B).

As shown in FIG. 9, the geometry 198 of both the inner surface 69 of the external segmented structurally integrated vacuum tank 11a and the internal pressure tank 116a is the lobed geometry 198b with the vacuum tank skin segments 70 and the lobed interior sections 136a having the lobed shape 138. The vacuum tank skin variable thickness 200b, or depth, for example, the thickness or depth of the corrugations 186 (see FIG. 6E) of the vacuum tank skin 66, can vary from being equivalent to a thickness 205 (see FIG. 9) of the multipurpose stiffener member 98, such as the multipurpose stringer 100, for example, the multipurpose box stringer 100a, to a value much thinner in the vacuum tank skin 66 between the two multipurpose stiffener members 98, such as the multipurpose stringers 100, for example, the multipurpose box stringers 100a. The magnitude of the radii corresponding to the trough location and the crest location of the vacuum tank skin 66 at the location approximately mid-way circumferentially between the multipurpose stiffener members 98, such as the multipurpose stringers 100, can be adjusted so that the buckling load of that arrangement is equivalent to the buckling load of an arrangement where these radii do not vary along the circumference 180 of the segmented structurally integrated vacuum tank 11. The vacuum tank skin variable thickness 200b allows for a greater volume 54 (see FIG. 2) of cryogenic fluid 48 (see FIG. 2), or fuel, and a geometry 198 that is simpler for the internal pressure tank 116a.

As shown in FIG. 9, the vacuum tank skin 66 comprises vacuum tank skin segments 70 that are separate and coupled between two multipurpose stiffener members 98. In this version, the multipurpose stiffener members 98, such as the multipurpose stringers 100, for example, the multipurpose box stringers 100a, can clamp the vacuum tank skin 66, and the vacuum tank skin 66 does not pass all the way through the interior 101 of the multipurpose stiffener members 98, such as the multipurpose stringers 100, for example, the multipurpose box stringers 100a.

As shown in FIG. 9, the segmented structurally integrated vacuum tank 11 further comprises the multipurpose stiffener members 98, such as the multipurpose stringers 100, for example, the multipurpose box stringers 100a, each coupled between two of the vacuum tank skin segments 70. The multipurpose stiffener members 98 comprise multipurpose mega-stiffener members 98a (see FIG. 9).

As shown in FIG. 9, the multipurpose stiffener members 98, such as the multipurpose stringers 100, for example, the multipurpose box stringers 100a, contain or carry sixteen (16) system transport lines 102, including fuel lines 102a, electrical lines 102b, hydraulic lines 102d, and pneumatic lines 102e, in the interior 101 of the multipurpose stiffener members 98. The multipurpose stiffener members 98, such as the multipurpose stringers 100, for example, the multipurpose box stringers 100a, can contain or carry one (1) to fifteen (15) system transport lines 102 or more than sixteen (16) system transport lines 102, and can contain or carry the same system transport lines 102 or different system transport lines 102.

As shown in FIG. 9, in one version, the segmented structurally integrated vacuum tank 11 comprises two (2) multipurpose stiffener members 98, such as two (2) multipurpose stringers 100, for example, two (2) multipurpose box stringers 100a, arranged in the equal distance spaced relationship 180 of the circumference 178 of the segmented structurally integrated vacuum tank 11. In other versions, the number of multipurpose stiffener members 98, such as the multipurpose stringers 100, for example, the multipurpose box stringers 100a, may be three (3) to twenty (20), or possibly greater than twenty (20), depending on the size of the structure 12.

As shown in FIG. 9, the vacuum tank skin segments 70 of the vacuum tank skin 66 and the multipurpose stiffener members 98, such as the multipurpose stringers 100, form a cylinder 195 with a substantially cylindrical shape 196. In preferred versions, the cylinder 195 has a diameter with a length preferably in a range of 6 (six) feet (1.8 meters) to 20 (twenty) feet (6.1 meters) long. The outer diameter may have another suitable length.

As shown in FIG. 9, the segmented vacuum jacketed tank system 10, such as the segmented vacuum jacketed lobed shaped tank system 10d, further comprises the pressure tank 116, such as the internal pressure tank 116a, mounted within the segmented structurally integrated vacuum tank 11. As shown in FIG. 9, the pressure tank 116 comprises the pressure tank main portion 122 comprising the pressure tank skin 124 having the outer surface 125 and the inner surface 126. The pressure tank skin 124 of the internal pressure tank 116a may be corrugated or non-corrugated.

As further shown in FIG. 9, in one version, the pressure tank 116 further comprises the internal structure 134 in the interior 120 of the pressure tank 116 comprising an interior shear wall 135 forming two (2) interior sections 136, such as two (2) lobed interior sections 136a. In other versions, the pressure tank 116 has three (3) interior sections 136 to twenty (20) interior sections 136, or more than twenty (20) interior sections 136.

As shown in FIG. 9, at the junction 208 of each of two (2) interior sections 136, such as two (2) lobed interior sections 136a, is the discontinuity of curvature 210, resulting in an outward kick load that may circularize the shape of the pressure tank 116. The internal structure 134 is used to carry that kick load. As shown in FIG. 9, in one version, the interior shear wall 135 of the internal structure 134 comprises a flat sheet 140. In other versions, the interior shear wall 135 comprises a tension structure 142 (see FIG. 2), a wire 144 (see FIG. 2), a truss structure 145 (see FIG. 7), or another suitable interior shear wall structure. The interior shear wall 135 may function as, or support, anti-slosh baffles 146 (see FIG. 2) for the cryogenic fluid 48, or fuel. FIG. 9 further shows the vertical axis 214 through the center 216 of the internal pressure tank 116a.

As shown in FIG. 9, the segmented vacuum jacketed tank system 10, such as the segmented vacuum jacketed lobed shaped tank system 10d, further comprises the vacuum cavity 148 forming the gap 150 formed between the segmented structurally integrated vacuum tank 11 and the pressure tank 116. With the segmented vacuum jacketed lobed shaped tank system 10d, the gap 150 is small and constant between the segmented structurally integrated vacuum tank 11 and the pressure tank 116.

Now referring to FIGS. 10A-10G, FIGS. 10A-10G show various shapes 86 of profile geometry portions 76b of the profile geometry 76 of the vacuum tank skin 66 (see FIG. 2) that may be used in the segmented structurally integrated vacuum tank 11 of the disclosure. The profile geometry portions 76b that make up the profile geometry 76 may be smooth and curved, or may have sharp breaks in the curvature, or may be of another suitable shape.

Now referring to FIG. 10A, FIG. 10A is an illustration of a version of a shape 86 of a profile geometry portion 76b of a vacuum tank skin 66 (see FIG. 2, 3A) of the disclosure showing a superimposed curves shape 86c (see also FIG. 3A), such as a first superimposed curves shape 86k. As shown in FIG. 10A, the superimposed curves shape 86c, such as the first superimposed curves shape 86k, comprises two (2) curves 224, such as two (2) superimposed curves 224a, in a curved outward position 226, that are outwardly formed or raised along sides 228 that downwardly slope from the peak 88. As shown in FIG. 10A, each superimposed curve 224a is positioned between the peak 88 and a valley 90. FIG. 10A further shows an outer side 230a and an inner side 230b of the superimposed curves shape 86c, such as the first superimposed curves shape 86k. As shown in FIG. 10A, the two (2) superimposed curves 224a are symmetric with respect to the peak 88 and the first superimposed curves shape 86k is also a symmetrical shape 86d.

Now referring to FIG. 10B, FIG. 10B is an illustration of another version of a shape 86 of a profile geometry portion 76b of a vacuum tank skin 66 (see FIG. 2) of the disclosure showing another superimposed curves shape 86c, such as a second superimposed curves shape 86m. As shown in FIG. 10B, the superimposed curves shape 86c, such as the second superimposed curves shape 86m, comprises four (4) curves 224, such as four (4) superimposed curves 224a, with two (2) superimposed curves 224a in the curved outward position 226 and two (2) superimposed curves 224a in a curved inward position 232. FIG. 10B further shows the peak 88, the sides 228, and the valleys 90. FIG. 10B further shows the first superimposed curves shape 86k of FIG. 10A in dotted lines, to show the modifications of the two (2) superimposed curves 224a in the curved inward position 232 formed from the sides 228 in FIG. 10A. As shown in FIG. 10B, each superimposed curve 224a is positioned between the peak 88 and a valley 90. As shown in FIG. 10B, each superimposed curve 224a in the curved inward position 232 is positioned between the peak 88 and a superimposed curve 224a in the curved outward position 226.

Now referring to FIG. 10C, FIG. 10C is an illustration of yet another version of a shape 86 of a profile geometry portion 76b of a vacuum tank skin 66 (see FIG. 2) of the disclosure showing a pointed corner shape 86f. As shown in FIG. 10C, the pointed corner shape 86f has two (2) pointed corner portions 234 in a pointed inward position 235. FIG. 10C further shows a peak 88, such as a pointed peak 88a, sides 228, two (2) curves 224, such as two (2) superimposed curves 224a, in the curved outward position 226, on each side of the pointed corner portions 234, and the valleys 90. FIG. 10C further shows the first superimposed curves shape 86k of FIG. 10A in dotted lines, to show the modifications of the two (2) pointed corner portions 234 in the pointed inward position 235 formed from the sides 228 in FIG. 10A. As shown in FIG. 10C, each pointed corner portion 234 in the pointed inward position 235 is positioned between the pointed peak 88a and a superimposed curve 224a in the curved outward position 226.

Now referring to FIG. 10D, FIG. 10D is an illustration of yet another version of a shape 86 of a profile geometry portion 76b of a vacuum tank skin 66 (see FIG. 2) of the disclosure showing a non-symmetrical shape 86e. The non-symmetrical shape 86e may preclude certain symmetrical buckling modes. As shown in FIG. 10D, the non-symmetrical shape 86e, in one version, has a curve 224, such as a center superimposed curve 224b, in the curved inward position 232 instead of a peak 88 (see FIGS. 10A, 10B). As further shown in FIG. 10D, the non-symmetrical shape 86e has two (2) curves 224, such as two (2) non-symmetrical superimposed curves 224c, in the curved outward position 226 on each side of the center superimposed curve 224b. As further shown in FIG. 10D, the non-symmetrical shape 86e has two (2) curves 224, such as two (2) superimposed curves 224a, in the curved outward position 226 on each side of the non-symmetrical superimposed curves 224c. FIG. 10D further shows the valleys 90. FIG. 10D further shows the first superimposed curves shape 86k of FIG. 10A in dotted lines, to show the modifications of the center superimposed curve 224b and the two (2) non-symmetrical superimposed curves 224c.

Now referring to FIG. 10E, FIG. 10E is an illustration of yet another version of a shape 86 of a profile geometry portion 76b of a vacuum tank skin 66 (see FIG. 2) of the disclosure showing a hat shape 86g. As shown in FIG. 10E, the hat shape 86g has flat edges 236, or flanges, angled sides 238 each having a first end 240a and a second end 240b, with the first end 240a extending outwardly at an obtuse angle from the flat edges 236, and a flat top 242 coupled between the second ends 240b of the angled sides 238, and having a flat, straight profile. As shown in FIG. 10E, the hat shape 86g is also a symmetrical shape 86d.

Now referring to FIG. 10F, FIG. 10F is an illustration of yet another version of a shape 86 of a profile geometry portion 76b of a vacuum tank skin 66 (see FIG. 2) of the disclosure showing a fractal shape 86h, such as a first approximately fractal shape 86i. As used herein, "fractal" means a non-regular geometric shape that has the same degree of non-regularity on all scales. FIG. 10F shows the hat shape 86g of FIG. 10E in dotted lines, to show the modifications of pointed indentations 244 made along the flat edges 236 (see FIG. 10E), the angled sides 238 (see FIG. 10E), and the flat top 242 (see FIG. 10E), which are subdivided in a similar manner. The pointed indentations 244 are in the pointed inward position 235 (see FIG. 10F) and have straight sides 245. FIG. 10F further shows remaining straight portions 246 of the angled sides 238 (see FIG. 10E) and the flat top 242 (see FIG. 10E). As shown in FIG. 10F, the fractal shape 86h, such as the first approximately fractal shape 86i, is also a symmetrical shape 86d.

Now referring to FIG. 10G, FIG. 10G is an illustration of yet another version of a shape 86 of a profile geometry portion 76b of a vacuum tank skin 66 (see FIG. 2) of the disclosure showing a fractal shape 86h, such as a second approximately fractal shape 86j. FIG. 10G shows the hat shape 86g of FIG. 10E in dotted lines, and shows the first approximately fractal shape 86i of FIG. 10F in dotted lines, to show the modifications of subdivided pointed indentations 244a made along the straight sides 245 and the remaining straight portions 246 of FIG. 10F, which are subdivided in a similar manner. The straight sides 245 and the remaining straight portions 246 of FIG. 10F are subdivided to reduce buckling length and can be subdivided in a self-similar manner. As shown in FIG. 10G, the subdivided pointed indentations 244a are either in the pointed inward position 235 or a pointed outward position 248. As shown in FIG. 10G, the fractal shape 86h, such as the second approximately fractal shape 86j, is also a symmetrical shape 86d.

Now referring to FIG. 11A, FIG. 11A is an illustration of a cross-sectional front view showing clamped vacuum tank skin portions 66b of the vacuum tank skin 66 comprising the vacuum tank skin segments 70 clamped between a multipurpose stiffener member 98, such as a multipurpose stringer 100, for example, a multipurpose box stringer 100a, and clamped together with fastener assemblies 250, and showing an outer aero skin 20 attached to the exterior side 115a of the multipurpose stiffener member 98, such as the multipurpose stringer 100, for example, the multipurpose box stringer 100a.

As shown in FIG. 11A, the multipurpose box stringer 100a is comprised of two pieces including an outer section 252 and an inner section 254, where the outer section 252 and the inner section 254 clamp outer surface portions 68a of the outer surface 68 and inner surface portions 69a of the inner surface 69 of the vacuum tank skin 66, and are clamped together with the fastener assemblies 250. As shown in FIG. 11A, the outer section 252 of the multipurpose box stringer 100a has an access hole 256, which is one of many access holes 256 the outer section 252 has, that is open to the interior 101 which carries the system transport lines 102, including a fuel line 102a and electrical lines 102b. Other system transport lines 102 may also be run through the interior 101 of the multipurpose box stringer 100a. As shown in FIG. 11A, the system transport lines 102 are contained within an interior cell 316 positioned between webs 260, such as radial internal webs. Each interior cell 316 preferably runs longitudinally the length of the multipurpose stiffener member 98, such as the multipurpose stringer 100, for example, the multipurpose box stringer 100a for the one or more system transport lines 102, the liquid fuel 318, or the nitrogen gas 324 to be accommodated. FIG. 11A shows a single interior cell version 317a of the interior 101 with one interior cell 316. As further shown in FIG. 11A, the outer section 252 of the multipurpose box stringer 100a has an opening 258. The access hole 256 and the opening 258 may be used to insert the fastener assemblies 250 into the multipurpose box stringer 100a. As shown in FIG. 11A, the webs 260, such as the radial internal webs, are adjacent to a location 262 of one or more fastener assemblies 250, on either side, forward and aft.

As shown in FIG. 11A, the outer section 252, the vacuum tank skin 66 such as a clamped vacuum tank skin portion 66b, and the inner section 254 are clamped together with the fastener assemblies 250. Although the two fastener assemblies 250 are shown as symmetrical on each side of the web 260, in FIG. 11A, the fastener assemblies 250 need not be symmetrical, and the fastener assemblies 250 may be staggered in a radial view.

As further shown in FIG. 11A, in one version, each fastener assembly 250 positioned in the interior 101 of the multipurpose box stringer 100a, comprises a fastener 264, such as a bolt 264a, coupled to a washer 265, a nut 266, and a fitting 268, such as an intercostal shelf 270. The fitting 268, such as the intercostal shelf 270, can be localized to the location 262 of the fasteners 264, such as the bolts 264a, and do not need to run an entire length of the multipurpose box stringer 100a. As further shown in FIG. 11A, the intercostal shelf 270 comprises a first intercostal shelf portion 270a positioned in an interior 272 of the outer section 252 against an outer surface portion 68a of the vacuum tank skin 66. As further shown in FIG. 11A, the intercostal shelf 270 comprises a second intercostal shelf portion 270b positioned in an interior 274 of the inner section 254 against an inner surface portion 69a of the vacuum tank skin 66. The fastener assemblies 250 are inserted through the access hole 256 and the opening 258 formed in the exterior side 115a of the outer section 252. As shown in FIG. 11A, each bolt 264a is inserted through openings 276 in the first intercostal shelf portion 270a and the second intercostal shelf portion 270b. As further shown in FIG. 11C, each bolt 252a is also inserted through opening 278 in the vacuum tank skin 66.

The intercostal shelf 270 is an integral part of the outer section 252 of the multipurpose box stringer 100a and need not contact the vacuum tank skin 66. The purpose of the first intercostal shelf portion 270a and the second intercostal shelf portion 270b is to transfer the preload from the fastener assembly 250 through the first intercostal shelf portion 270a and the second intercostal shelf portion 270b into the sidewalls of the outer section 252 and the inner section 254 of the multipurpose box stringer 100a, so that there is clamping force between the outer section 252 and the inner section 254 onto the vacuum tank skin 66, holding it in place.

As shown in FIG. 11A, the exterior side 115a of the multipurpose stiffener member 98, such as the multipurpose stringer 100, for example, the multipurpose box stringer 100a, with the access hole 256 and the opening 258 allows for access for assembly and inspection but also maintains sufficient portions to provide shear capability and some axial capability. As shown in FIG. 11A, a portion 280 of the exterior side 115a is attached to the outer aero skin 20, via an attachment element 282, such as a rivet 282a. As shown in FIG. 11A, the outer aero skin 20 comprises a first side 284a and a second side 284b, and the second side 284b is adjacent the exterior side 115a. The exterior side 115a and the outer aero skin 20 surfaces are parallel, so that the attachment element 282 is normal to both surfaces. The exterior side 115a is substantially straight, or slightly curved which facilitates attachment to the outer aero skin 20. The outer aero skin 20 provides an aerodynamic surface for the fuselage 16 (see FIGS. 1, 2, 3A) at the fuselage mold line 22 (see FIG. 1). Since the vacuum tank skin 66 is already carrying flight loads 42, the outer aero skin 20 need not be structural. The outer aero skin 20 may be comprised of fiberglass, carbon composite, plastic, a fabric that is stretched and always in tension, or another suitable material. The outer aero skin 20 may be attached to the exterior side 115a or to the side or sides of the multipurpose stiffener members 98, such as the multipurpose stringers 100, with the attachment elements 282. Alternatively, the outer aero skin 20 may be attached to the exterior side 115a by bonding, or another suitable attachment element means.

As further shown in FIG. 11A, one or more sealing elements 285 may be added to provide added sealing protection. As shown in FIG. 11A, a sealing element 285, such as an externally applied sealing element 285a, is externally applied at corner areas 286 between external portions 288 of the outer section 252 and outer surface portions 68a of the vacuum tank skin 66. In one version, the externally applied sealing element 285a is in the form of an external sealant, such as a silicone based external sealant, a urethane based external sealant, an acrylic based external sealant, or another suitable sealant. As shown in FIG. 11A, the externally applied sealing element 285a, such as in the form of the external sealant, may be applied after the segmented structurally integrated vacuum tank 11 has been assembled. This is a low risk solution for sealing between the outer section 252 of the multipurpose box stringer 100a and the vacuum tank skin 66.

As further shown in FIG. 11A, a sealing element 285, such as a rubber grommet sealing element 285b, is installed around a portion 290 of the fastener 264, such as the bolt 264a, where it passes through the opening 278 in the vacuum tank skin 66. This is a low risk, lightweight solution for sealing between the fastener 264 and the vacuum tank skin 66, since the sealing location is very localized. In one version, the rubber grommet sealing element 285b is in the form of a rubber grommet, such as a silicone rubber grommet, a polyurethane rubber grommet, or another suitable rubber grommet.

The sealing element 285 may further comprise a fayed surface sealing element added to the interface between the outer section 252 and the vacuum tank skin 66 before it is clamped with the fastener assembly 250. The width of the pad where the two surfaces mate can be designed such that the clamping pressure stress is not too large or too small. The fayed surface sealing element may be in the form of a sealant, such as a silicone based sealant, a urethane based sealant, an acrylic based sealant, or another suitable sealant. As used herein, "fayed surface" means two mating surfaces joined or fitted closely or tightly together and containing a sealant between or around the two mating surfaces, so that there is no gap or crevice between the two mating surfaces.

Figure 11B:
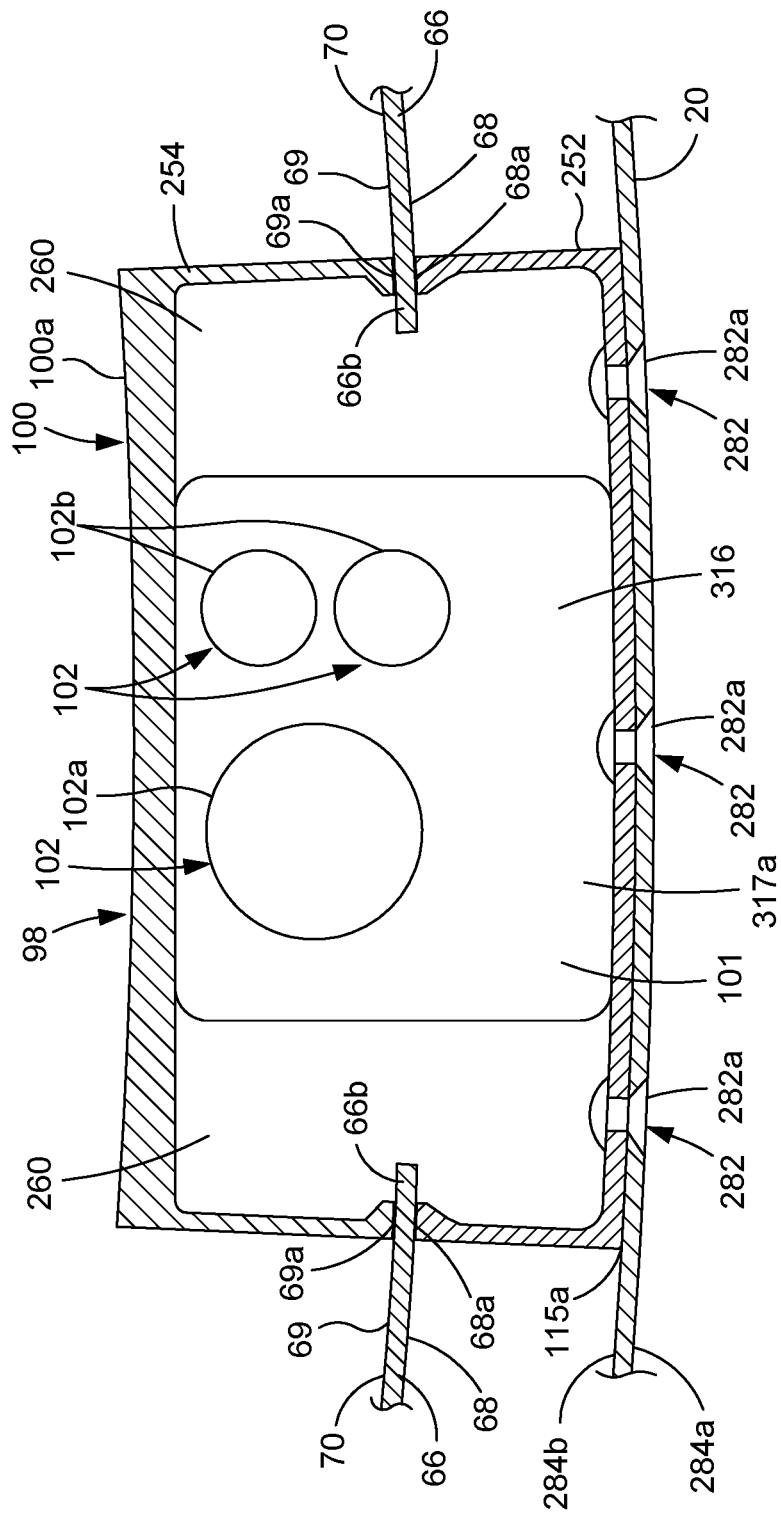
FIG. 11B is an illustration of a cross-sectional front view showing a multipurpose box stringer attached to an outer aero skin.
Figure 11C:
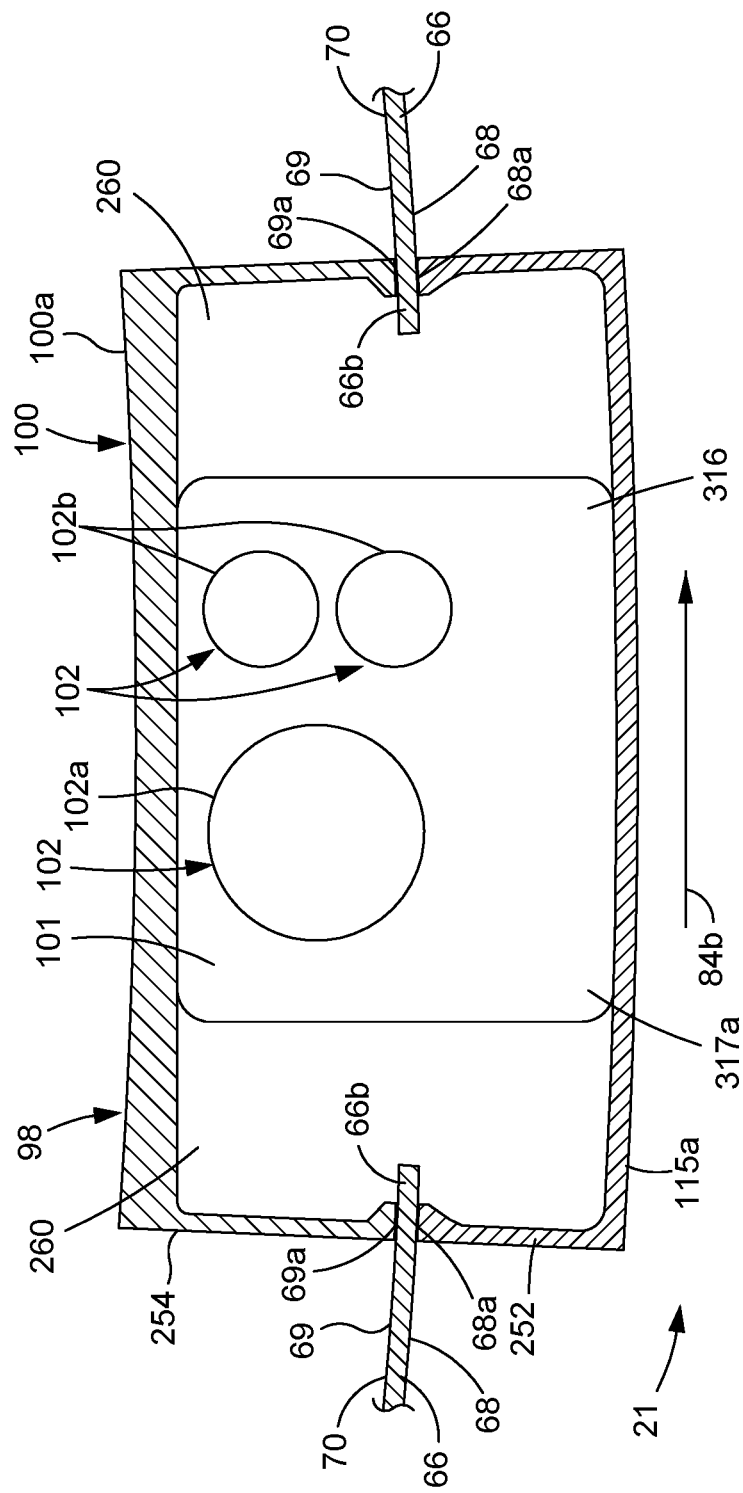
FIG. 11C is an illustration of a cross-sectional front view showing the multipurpose box stringer of FIG. 11B, and showing no outer aero skin attached to the multipurpose box stringer in an omitted outer aero skin configuration.

Now referring to FIG. 11B, FIG. 11B is an illustration of a cross-sectional front view showing the multipurpose stiffener member 98, such as the multipurpose stringer 100, for example, the multipurpose box stringer 100a, of FIG. 11A, attached to the outer aero skin 20, and showing clamped vacuum tank skin portions 66b of the vacuum tank skin 66 comprising the vacuum tank skin segments 70 clamped between the outer section 252 and the inner section 254 of the multipurpose box stringer 100a, and showing a section without fastener assemblies 250 (see FIG. 11A). FIG. 11B shows the multipurpose box stringer 100a comprising the outer section 252 and the inner section 254, the system transport lines 102, including the fuel line 102a and the electrical lines 102b, contained or carried within the interior cell 316 positioned between webs 260, such as radial internal webs. FIG. 11B shows the single interior cell version 317a of the interior 101 with one interior cell 316. As shown in FIG. 11B, the outer section 252 and the inner section 254 clamp outer surface portions 68a of the outer surface 68 and inner surface portions 69a of the inner surface 69 of the vacuum tank skin 66.

As shown in FIG. 11B, the exterior side 115a of the multipurpose stiffener member 98, such as the multipurpose stringer 100, for example, the multipurpose box stringer 100a, is attached to the outer aero skin 20, via attachment elements 282, such as a rivets 282a. The exterior side 115a and the outer aero skin 20 surfaces are parallel, so that the attachment elements 282 are normal to both surfaces. The exterior side 115a is substantially straight or slightly curved, which facilitates attachment to the outer aero skin 20. As shown in FIG. 11B, the outer aero skin 20 comprises the first side 284a and the second side 284b, and the second side 284b is adjacent the exterior side 115a. The outer aero skin 20 may also be attached to the exterior side 115a by bonding, or by another suitable attachment element means.

Now referring to FIG. 11C, FIG. 11C is an illustration of a cross-sectional front view showing the multipurpose stiffener member 98, such as the multipurpose stringer 100, for example, the multipurpose box stringer 100a, of FIG. 11B, and showing no outer aero skin 20 (see FIG. 11B) attached to the multipurpose stiffener member 98, such as the multipurpose stringer 100, for example, the multipurpose box stringer 100a, in an omitted outer aero skin configuration 21. FIG. 11C shows clamped vacuum tank skin portions 66b of the vacuum tank skin 66 comprising the vacuum tank skin segments 70 clamped between the outer section 252 and the inner section 254 of the multipurpose box stringer 100a, and showing a section without fastener assemblies 250 (see FIG. 11A). FIG. 11C shows the multipurpose box stringer 100a comprising the outer section 252 and the inner section 254, the system transport lines 102, including the fuel line 102a and the electrical lines 102b, contained or carried within the interior cell 316 positioned between webs 260, such as radial internal webs. FIG. 11C shows the single interior cell version 317a of the interior 101 with one interior cell 316. As shown in FIG. 11C, the outer section 252 and the inner section 254 clamp outer surface portions 68a of the outer surface 68 and inner surface portions 69a of the inner surface 69 of the vacuum tank skin 66.

As shown in FIG. 11C, there is no outer aero skin 20 (see FIG. 11B) attached to the exterior side 115a of the multipurpose stiffener member 98, such as the multipurpose stringer 100, for example, the multipurpose box stringer 100a, in the omitted outer aero skin configuration 21, so that the vacuum tank skin 66 and the multipurpose stiffener member 98, such as the multipurpose stringer 100, for example, the multipurpose box stringer 100a, are exposed to air flow 84b of the air 84 (see FIG. 2), such as the ambient air 84a (see FIG. 2). In this version, the vacuum tank skin 66, even if corrugated, functions as the external skin of the aircraft 14 (see FIG. 1). Since the boundary layer 23 (see FIG. 1), such as the aft fuselage boundary layer 23a (see FIG. 1), at the aft fuselage barrel section 18a (see FIG. 1) of the fuselage 16 (see FIG. 1) is large, such as one (1) inch to ten (10) inches, the corrugations 186 (see FIG. 6E) may not cause increased drag. FIG. 1 shows the boundary layer 23, including the aft fuselage boundary layer 23a near the exterior of the aft fuselage barrel section 18a. The aft fuselage boundary layer 23a is thick near the exterior of the aft fuselage barrel section 18a. The aft fuselage boundary layer 23a may be thick enough in portions of the aft fuselage barrel section 18a that even corrugations 186 (see FIG. 6C) normal to the longitudinal direction that are two to three inches deep will not incur a significant drag penalty, and the outer aero skin 20 can be omitted.

Figure 11D:
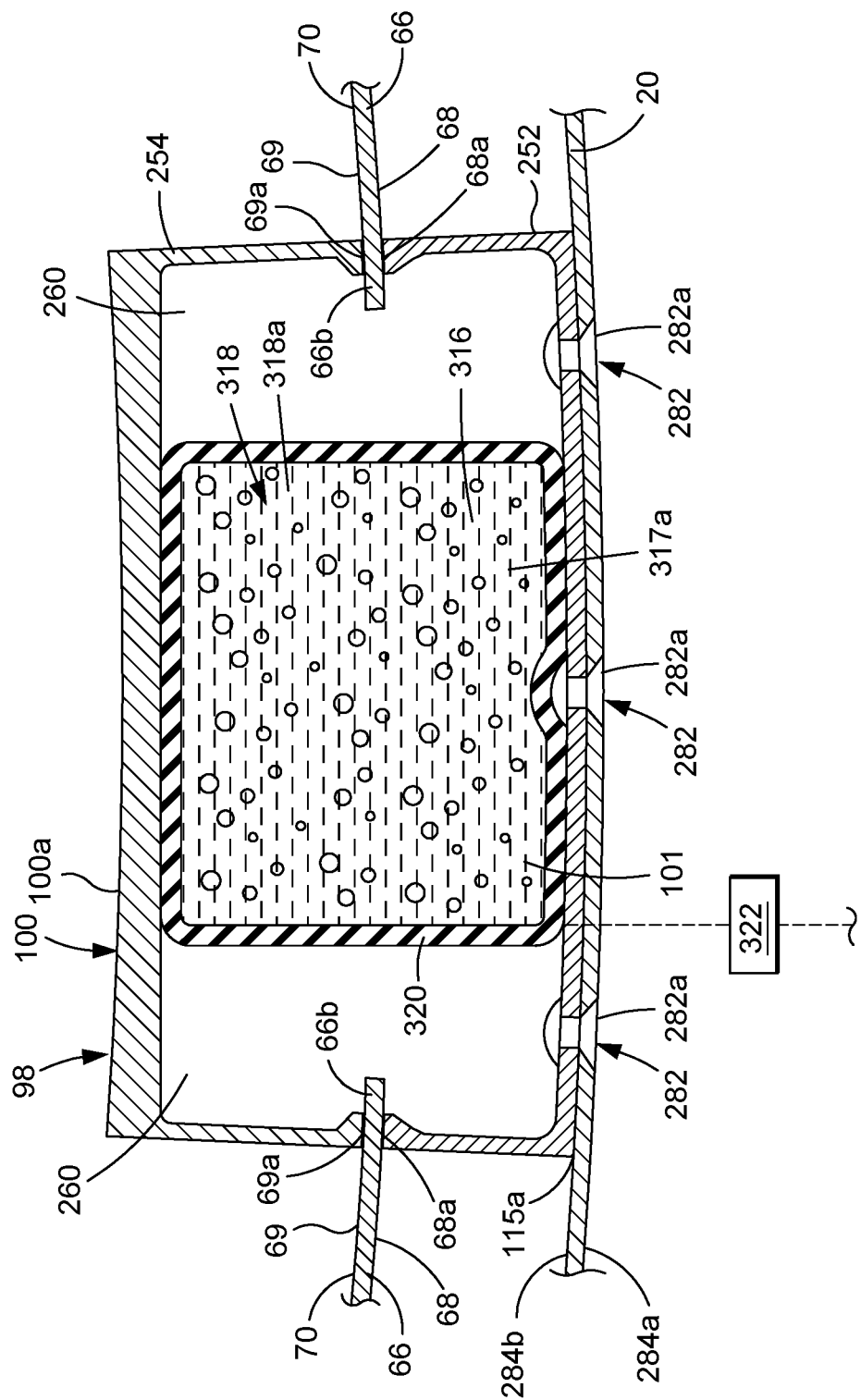
FIG. 11D is an illustration of a cross-sectional front view showing the multipurpose box stringer of FIG. 11B, and showing an interior cell filled with a liquid fuel.

Now referring to FIG. 11D, FIG. 11D is an illustration of a cross-sectional front view showing the multipurpose stiffener member 98, such as the multipurpose stringer 100, for example, the multipurpose box stringer 100a, of FIG. 11B, and showing an interior cell 316 in the interior 101 of the multipurpose box stringer 100a filled with a liquid fuel 318, such as a liquid jet fuel 318a, instead of the system transport lines 102 (see FIGS. 11A-11C). As shown in FIG. 11D, the interior cell 316 is lined with a bladder member 320 that acts as a sealing mechanism and facilitates prevention of leaks of the liquid fuel 318 from the interior cell 316. The bladder member 320 may be made of a plastic material and/or a rubber material, or another suitable material. The bladder member 320 is optional. As further shown in FIG. 11D, the bladder member 320 and/or the interior cell 316 is/are coupled to a liquid fuel valve 322 that is used to control the flow of the liquid fuel 318, such as the liquid jet fuel 318a, into and out of the interior cell 316. As further shown in FIG. 11D, the interior cell 316 is positioned between webs 260, such as radial internal webs. FIG. 11D shows the single interior cell version 317a of the interior 101 with one interior cell 316. In another version, the webs 260 may have openings in them to allow smaller system transport lines 102 to run through them, such as electrical lines 102b, thus essentially forming interior cells 316, and in that case, the interior 101 would be the multiple interior cell version 318b (see, for example, FIG. 11G).

As further shown in FIG. 11D, the exterior side 115a of the multipurpose stiffener member 98, such as the multipurpose stringer 100, for example, the multipurpose box stringer 100a, is attached to the outer aero skin 20, via attachment elements 282, such as rivets 282a. The exterior side 115a and the outer aero skin 20 surfaces are parallel, so that the attachment elements 282 are normal to both surfaces. The exterior side 115a is substantially straight or slightly curved, which facilitates attachment to the outer aero skin 20. As shown in FIG. 11D, the outer aero skin 20 comprises the first side 284a and the second side 284b, and the second side 284b is adjacent the exterior side 115a. The outer aero skin 20 may also be attached to the exterior side 115a by bonding, or by another suitable attachment element means. FIG. 11D further shows clamped vacuum tank skin portions 66b of the vacuum tank skin 66 comprising the vacuum tank skin segments 70 clamped between the outer section 252 and the inner section 254 of the multipurpose box stringer 100a. As shown in FIG. 11D, the outer section 252 and the inner section 254 clamp outer surface portions 68a of the outer surface 68 and inner surface portions 69a of the inner surface 69 of the vacuum tank skin 66. The multipurpose stiffener member 98, such as the multipurpose stringer 100, for example, the multipurpose box stringer 100a, can be an integral section, as is shown in FIG. 11G.

Figure 11E:
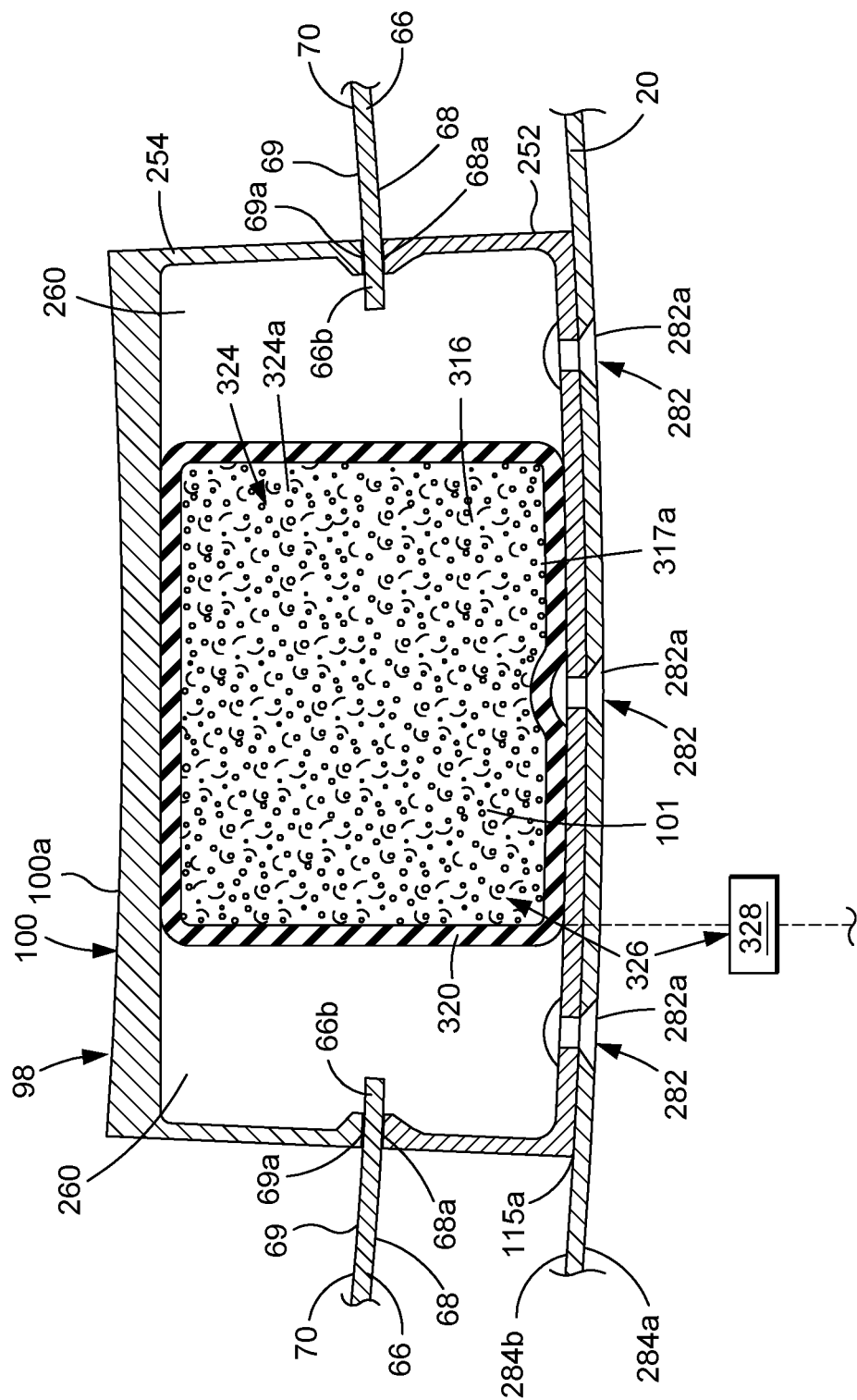
FIG. 11E is an illustration of a cross-sectional front view showing the multipurpose box stringer of FIG. 11B, and showing an interior cell filled with a nitrogen gas.
Figure 11F:
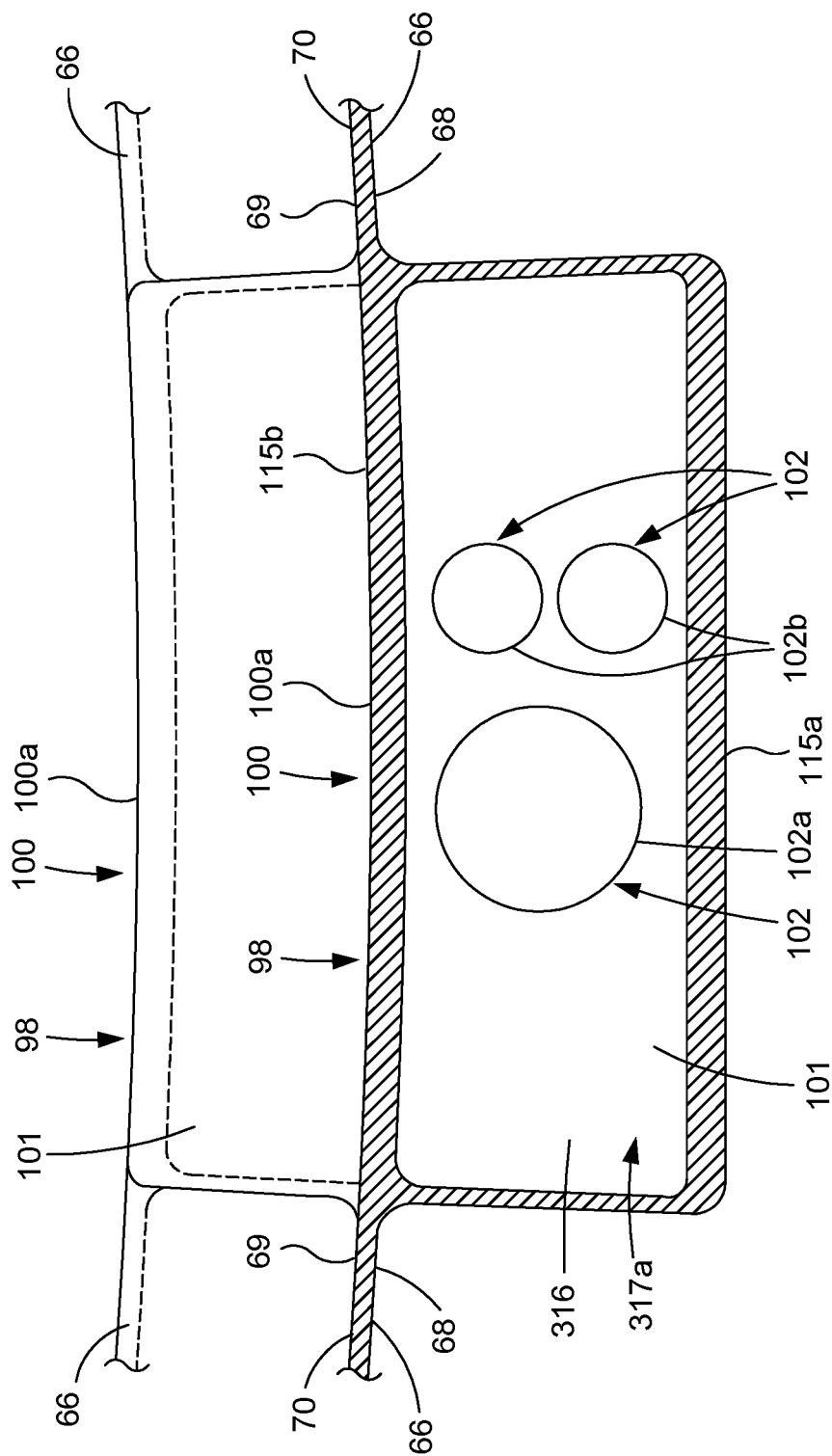
FIG. 11F is an illustration of a cross-sectional front view showing a multipurpose box stringer and vacuum tank skin made of a composite material, and showing an interior cell containing system transport lines.
Figure 11G:
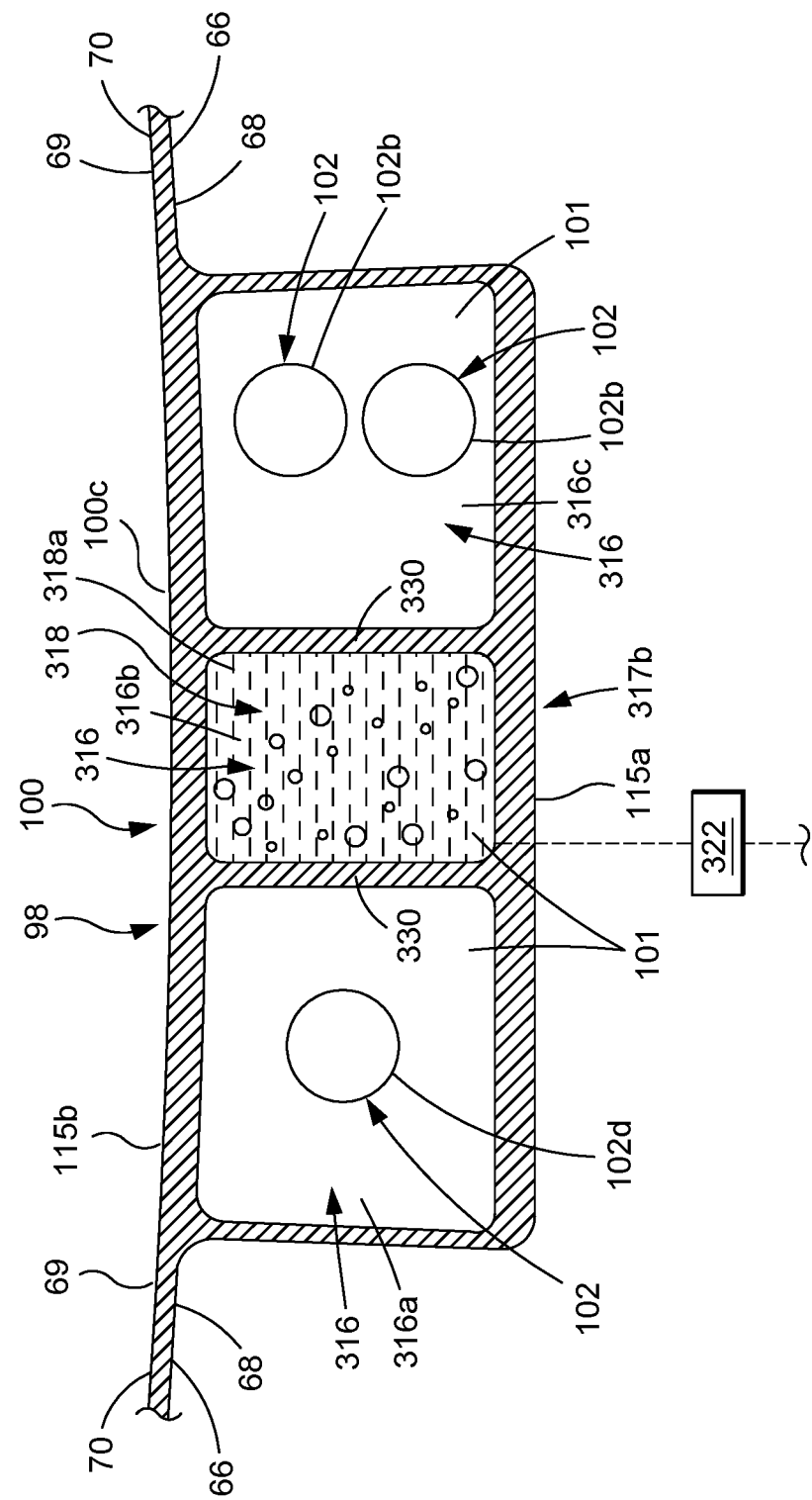
FIG. 11G is an illustration of a cross-sectional front view showing a multipurpose box stringer with multiple interior cells.

Now referring to FIG. 11E, FIG. 11E is an illustration of a cross-sectional front view showing the multipurpose stiffener member 98, such as the multipurpose stringer 100, for example, the multipurpose box stringer 100a, of FIG. 11B, and showing the interior cell 316 in the interior 101 of the multipurpose box stringer 100a filled with a nitrogen gas 324, such as an inert nitrogen gas 324a, instead of the liquid fuel 318 (see FIG. 11D) or the system transport lines 102 (see FIGS. 11A-11C). As shown in FIG. 11E, the interior cell 316 is lined with the bladder member 320 that acts as a sealing mechanism and facilitates prevention of leaks of the nitrogen gas 324, such as the inert nitrogen gas 324a, from the interior cell 316. The bladder member 320 may be made of a plastic material and/or a rubber material, or another suitable material. The bladder member 320 is optional. As further shown in FIG. 11E, the bladder member 320 and/or the interior cell 316 is/are coupled to a nitrogen gas valve 328 that is used to control the flow of the nitrogen gas 324, such as the inert nitrogen gas 324a, into and out of the interior cell 316. The nitrogen gas 324, such as the inert nitrogen gas 324a, and the nitrogen gas valve 328 are part of a nitrogen gas inerting system 326 (see FIG. 11E). For aircraft 14 (see FIGS. 1, 2), the interior cell 316 facilitates and allows transport of the nitrogen gas 324 to flow from a forward location forward of the multipurpose stiffener member 98, such as the multipurpose stringer 100, and forward of the segmented structurally integrated vacuum tank 11 (see FIGS. 2, 3A), through the interior cell 316 of the multipurpose stiffener member 98, such as the multipurpose stringers 100, and to an aft location aft of the multipurpose stiffener member 98, such as the multipurpose stringer 100, and aft of the segmented structurally integrated vacuum tank 11, such as to the tail 28 (see FIG. 1) of the aircraft 14. For example, there may be bleed air from the propulsion unit 26 (see FIG. 1), such as the engine, to supply warm air for anti-icing of control surfaces. As further shown in FIG. 11E, the interior cell 316 is positioned between webs 260, such as radial internal webs. FIG. 11E shows the single interior cell version 317a of the interior 101 with one interior cell 316. In another version, the webs 260 may have openings in them to allow smaller system transport lines 102 to run through them, such as electrical lines 102b, thus essentially forming interior cells 316, and in that case, the interior 101 would be the multiple interior cell version 318b (see, for example, FIG. 11G).

As further shown in FIG. 11E, the exterior side 115a of the multipurpose stiffener member 98, such as the multipurpose stringer 100, for example, the multipurpose box stringer 100a, is attached to the outer aero skin 20, via attachment elements 282, such as rivets 282a. The exterior side 115a and the outer aero skin 20 surfaces are parallel, so that the attachment elements 282 are normal to both surfaces. The exterior side 115a is substantially straight or slightly curved, which facilitates attachment to the outer aero skin 20. As shown in FIG. 11E, the outer aero skin 20 comprises the first side 284a and the second side 284b, and the second side 284b is adjacent the exterior side 115a. The outer aero skin 20 may also be attached to the exterior side 115a by bonding, or by another suitable attachment element means. FIG. 11E further shows clamped vacuum tank skin portions 66b of the vacuum tank skin 66 comprising the vacuum tank skin segments 70 clamped between the outer section 252 and the inner section 254 of the multipurpose box stringer 100a. As shown in FIG. 11E, the outer section 252 and the inner section 254 clamp outer surface portions 68a of the outer surface 68 and inner surface portions 69a of the inner surface 69 of the vacuum tank skin 66.

Now referring to FIG. 11F, FIG. 11F is an illustration of a cross-sectional front view showing the multipurpose stiffener member 98, such as the multipurpose stringer 100, for example, the multipurpose box stringer 100a, having the exterior side 115a and the interior side 115b, and showing the vacuum tank skin 66 with the outer surface 68 and the inner surface 69 and comprising the vacuum tank skin segments 70. In this version, the multipurpose box stringer 100a and the vacuum tank skin 66 are made of a composite material 128c (see FIG. 2), such as carbon fiber reinforced polymer (CFRP), or another suitable composite material. FIG. 11F further shows the interior cell 316 in the interior 101 containing the system transport lines 102, such as the fuel line 102a and the electrical lines 102b. FIG. 11F shows the single interior cell version 317a of the interior 101 with one interior cell 316.

FIG. 11F shows the section of the multipurpose box stringer 100a containing the system transport lines 102, and also shows in thin solid lines and dashed lines looking past the section, the multipurpose stiffener member 98, such as the multipurpose stringer 100, for example, the multipurpose box stringer 100a, with the interior 101, and the vacuum tank skin 66. FIG. 11F shows the structure of the multipurpose box stringer 100a and the vacuum tank skin 66 in the dashed lines beyond the section plane of the multipurpose box stringer 100a containing the system transport lines 102.

Where the profile geometry 76 (see FIG. 5A) of the longitudinal cross section 74 (see FIG. 5A) of the vacuum tank skin 66 (see FIGS. 5A, 11F) has the shape 86 (see FIG. 5A) comprising the corrugated shape 86a (see FIG. 5A), for example, the sinusoidal shape 86b (see FIG. 5A), the interior side 115b (see FIG. 11F) of the multipurpose box stringer 100a (see FIG. 11F) follows, or corresponds to, the profile geometry 76 of the vacuum tank skin 66. As far as the pressure tank 116, such as the internal pressure tank 116a, is concerned, the presence of the multipurpose box stringer 100a would not be visible because the interior side 115b follows the corrugated shape 86a (see FIG. 5A), for example, the sinusoidal shape 86b (see FIG. 5A), of the inner surface 69 of the vacuum tank skin 66.

Now referring to FIG. 11G, FIG. 11G is an illustration of a cross-sectional front view showing a multipurpose stiffener member 98, such as a multipurpose stringer 100, for example, a multipurpose mega-stringer 100c, having an exterior side 115a and an interior side 115b, and showing the vacuum tank skin 66 with the outer surface 68 and the inner surface 69 and comprising the vacuum tank skin segments 70. In this version, FIG. 11G shows the multipurpose stringer 100 with multiple interior cell 316 in a multiple interior cell version 317b and shows an integral section. As shown in FIG. 11G, the multipurpose stringer 100 includes three (3) interior cells 316, such as a first interior cell 316a, a second interior cell 316b, and a third interior cell 316c. As shown in FIG. 11G, the first interior cell 316a contains in the interior 101 a system transport line 102 comprising the hydraulic line 102d, the second interior cell 316b contains in the interior 101 the liquid fuel 318, such as the liquid jet fuel 318a, and the third interior cell 316c contains in the interior 101 the system transport lines 102 comprising the electrical lines 102b. FIG. 11G further shows the second interior cell 316b coupled to the liquid fuel valve 322 that is used to control the flow of the liquid fuel 318, such as the liquid jet fuel 318a, into and out of the second interior cell 316b. FIG. 11G further shows a wall 330 separating the first interior cell 316a and the second interior cell 316b and shows another wall 330 separating the second interior cell 316b and the third interior cell 316c.

Now referring to FIGS. 12A-12B, FIG. 12A is an illustration of a schematic side view of an untapered cylinder profile 292 for a vacuum tank 294, such as a vacuum jacket 296, having the vacuum tank main portion 62 and vacuum tank end portions 64, where the vacuum tank main portion 62 comprises the vacuum tank skin 66 forming a cylinder 195, such as an untapered cylinder 195a, having the untapered cylinder profile 292, such as a substantially straight profile 298. FIG. 12B is an illustration of a schematic side view of a corrugated flat pattern 300 of corrugations 186 of the vacuum tank skin 66 of the vacuum tank 294 of FIG. 12A with the untapered cylinder profile 292. As shown in FIG. 15B, the vacuum tank skin 66 is a continuous sheet 302.

Now referring to FIGS. 13A-13B, FIG. 13A is an illustration of a schematic side view of a tapered cylinder profile 304 for a vacuum tank 294, such as a vacuum jacket 296, having the vacuum tank main portion 62 and vacuum tank end portions 64, where the vacuum tank main portion 62 comprises the vacuum tank skin 66 forming a cylinder 195, such as a tapered cylinder 195b, having the tapered cylinder profile 304, such as a tapered profile 306. FIG. 13B is an illustration of a schematic side view of a corrugated flat pattern 300a of corrugations 186 of the vacuum tank skin 66 of the vacuum tank 294 of FIG. 13A with the tapered cylinder profile 304. If the corrugated flat pattern 300a of the tapered cylinder 195b is roll-formed, the radius of curvature can be adjusted along the length of the tapered cylinder 195b. As shown in FIG. 13B, the vacuum tank skin 66 is a continuous sheet 302 and has a curved shape 308. A roll-forming operation may be applicable to the configuration in FIGS. 4A-4C where the vacuum tank skin segments 70 have a circular shape 184, and a roll-forming operation may not be applicable to the configuration in FIGS. 5A-5C where the vacuum tank skin segments 70 have a lobed shape 138, since the vacuum tank skin segments 70 of FIGS. 5A-5C are not a "swept" surface.

Now referring to FIGS. 14A-14B, FIG. 14A is an illustration of a schematic side view of another untapered cylinder profile 292a for a vacuum tank 294, such as a vacuum jacket 296, having the vacuum tank main portion 62 and vacuum tank end portions 64, where the vacuum tank main portion 62 comprises the vacuum tank skin 66 forming the cylinder 195, such as the untapered cylinder 195a, having the untapered cylinder profile 292a, such as a substantially straight profile 298.

FIG. 14B is an illustration of a schematic side view of a corrugated flat pattern 300b with a helix arrangement 310 of corrugations 186 of the vacuum tank skin 66 of the vacuum tank 294 of FIG. 14A with the untapered cylinder profile 292a. As shown in FIG. 14B, the vacuum tank skin 66 is a continuous sheet 302. FIG. 14B shows the helix arrangement 310 with a helix start 312 and a helix end 314. The corrugated flat pattern 300b with the helix arrangement 310 of corrugations 186 of FIG. 14B is similar to a bolt thread helix, which can enable the pressure tank 116 (see FIG. 3A) to be inserted into or mounted within the segmented structurally integrated vacuum tank 11 (see FIG. 3A) with a small gap 150 (see FIG. 3A) between the pressure tank 116 and the segmented structurally integrated vacuum tank 11. The configurations shown in FIGS. 11F and 11G enable the helix arrangement 310 shown in FIG. 14B.

Figure 15:
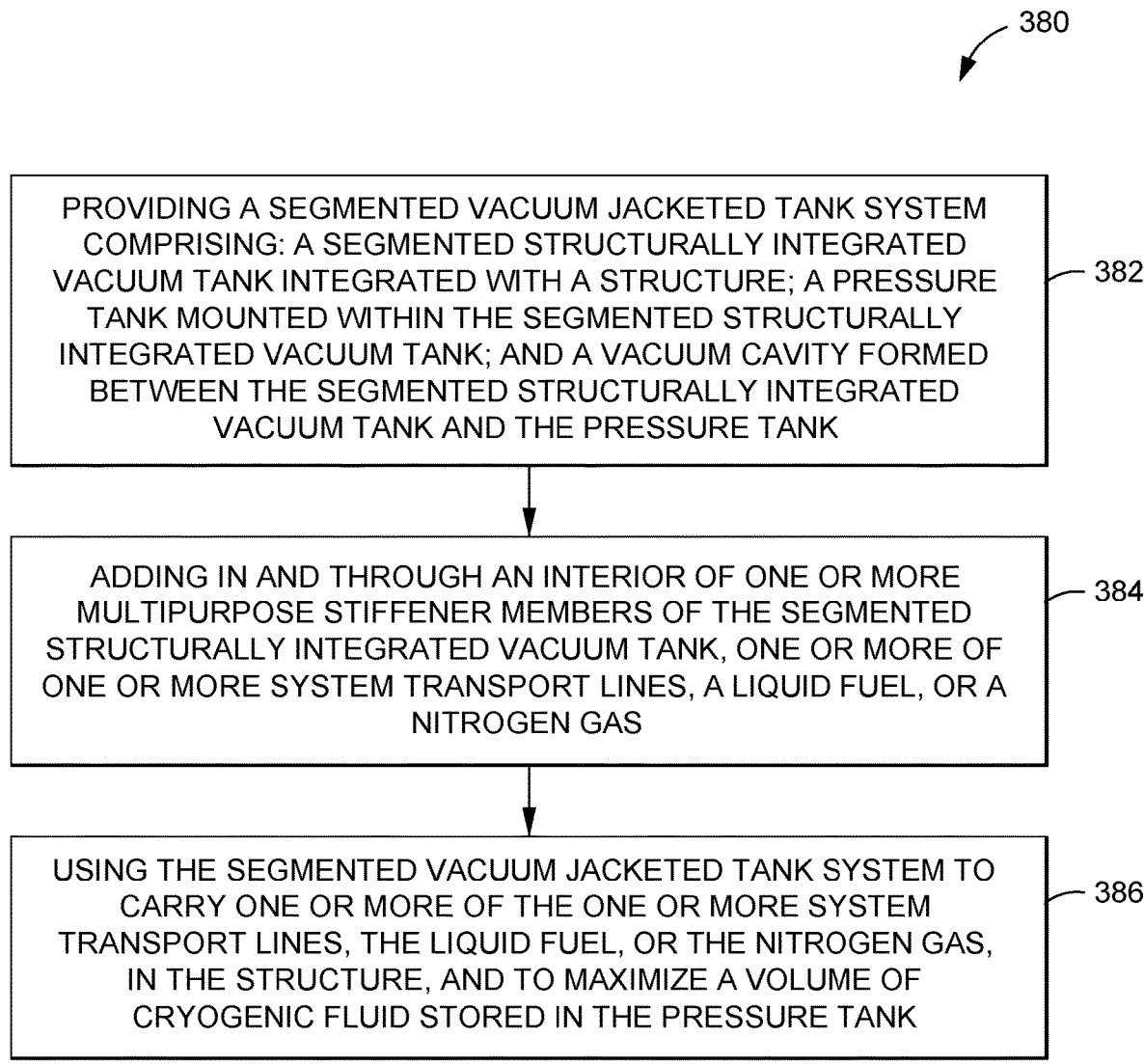
FIG. 15 is an illustration of a flow diagram of an exemplary version of a method of the disclosure.

Now referring to FIG. 15, FIG. 15 is an illustration of a flow diagram of an exemplary version of a method 380 of the disclosure. In another version of the disclosure, there is provided the method 380 of using a segmented vacuum jacketed tank system 10 (see FIG. 2), such as a segmented structurally integrated vacuum jacketed tank system 10a (see FIG. 2), to carry a plurality of system transport lines 102 in a structure 12 (see FIG. 2), and to maximize a volume 54 (see FIG. 2) of cryogenic fluid 48 (see FIGS. 2, 3C) stored in the structure 12. As shown in FIG. 2, the structure 12 may comprise an aircraft (AC) 14 (see also FIG. 1), such as a hydrogen-powered aircraft 14a, a rotorcraft (RC) 152, a watercraft (WC) 154, a train 155, an automobile (AUTO.) 156, a truck, a bus, or another suitable vehicle. Further, as shown in FIG. 2, the structure 12 may also comprise a non-vehicle structure, such as a power plant 158, a power station (PS) 160, including a portable power station (PS) 160a, or a stationary power station (PS) 160b, or another suitable non-vehicle structure.

The blocks in FIG. 15 represent operations and/or portions thereof, or elements, and lines connecting the various blocks do not imply any particular order or dependency of the operations or portions thereof, or elements. FIG. 15 and the disclosure of the steps of the method 380 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 15, the method 380 comprises the step 382 of providing the segmented vacuum jacketed tank system 10, such as the segmented structurally integrated vacuum jacketed tank system 10a. The segmented vacuum jacketed tank system 10, such as the segmented structurally integrated vacuum jacketed tank system 10a, comprises the segmented structurally integrated vacuum tank 11, such as the external segmented structurally integrated vacuum tank 11a, integrated with the structure 12. The segmented structurally integrated vacuum tank 11 has the vacuum tank main portion 62 (see FIGS. 2, 3A) extending between vacuum tank end portions 64 (see FIG. 3A). The vacuum tank main portion 62 comprises the vacuum tank skin 66 (see FIGS. 2, 3A, 4A, 5A. 6A) having an outer surface 68 (see FIGS. 4A, 5A, 6A) and an inner surface 69 (see FIGS. 4A, 5A, 6A).

The vacuum tank skin 66 comprises a plurality of vacuum tank skin segments 70 (see FIGS. 4A, 5A, 6A, 7-9). The vacuum tank skin 66 has a longitudinal cross section 74 (see FIGS. 2, 6A) with a profile geometry 76 (see FIGS. 2, 6A) configured for buckling prevention 78 (see FIG. 2) for the vacuum tank skin 66 under external pressure loads 40 (see FIG. 2), and flight loads 42 (see FIG. 2) when the structure 12 comprises an aircraft 14. The profile geometry 76, as shown in FIG. 2, has a shape 86 comprising one or more of, a corrugated shape 86a, a sinusoidal shape 86b, a superimposed curves shape 86c, a symmetrical shape 86d, a non-symmetrical shape 86e, a pointed corner shape 86f, a hat shape 86g, a fractal shape 86h, or another suitable shape.

The vacuum tank skin 66 is configured to provide a pressure barrier 80 (see FIG. 2) between an outside ambient pressure 82 (see FIG. 2) and a vacuum 60 (see FIG. 2) in an interior 58 (see FIGS. 2, 3B) of the vacuum tank main portion 62.

The vacuum tank main portion 62 further comprises one or more multipurpose stiffener members 98 (see FIGS. 2, 3A-3D, 4A, 5A, 6A, 7-9), such as one or more multipurpose stringers 100 (see FIGS. 2, 3A-3D, 4A, 5A, 6A, 7-9), each coupled between two of the plurality of vacuum tank skin segments 70. As shown in FIG. 2, each multipurpose stringer 100 comprises a multipurpose box stringer 100a, a multipurpose hat stringer 100b, or another suitable multipurpose stringer. The multipurpose stringer 100 is in the form of a multipurpose mega-stringer 100c (see FIGS. 4A, 5A). In preferred versions, the one or more multipurpose stiffener members 98, such as one or more multipurpose stringers 100, comprise a number in a range of one (1) multipurpose stiffener member 98, such as one (1) multipurpose stringer 100, to eight (8) multipurpose stiffener members 98, such as eight (8) multipurpose stringers 100. In more preferred versions, the one or more multipurpose stiffener members 98, such as one or more multipurpose stringers 100, comprise a number in a range of three (3) multipurpose stiffener members 98, such as three (3) multipurpose stringers 100, to six (6) multipurpose stiffener members 98, such as six (6) multipurpose stringers 100. In other versions, the number of multipurpose stiffener members 98, such as multipurpose stringers 100, may be greater than eight (8), such as nine (9) to twenty (20) multipurpose stiffener members 98, or nine (9) to twenty (20) multipurpose stringers 100, depending on the size of the structure 12 (see FIG. 2).

The one or more multipurpose stiffener members 98, such as the one or more multipurpose stringers 100, are configured to carry and hold a plurality of system transport lines 102 (see FIG. 2) in an interior 101 (see FIGS. 4A, 5A) of one or more of the one or more multipurpose stiffener members 98, such as the multipurpose stringers 100. The interior 101 for each multipurpose stiffener member 98, such as each multipurpose stringer 100, has an interior volume 101a (see FIGS. 4A, 5A) that is large and hollow and of a sufficient size and shape to carry and hold one or more system transport lines 102.

As shown in FIG. 2, the segmented vacuum jacketed tank system 10 may further optionally comprise one or more single purpose (SP) stiffener members 104 coupled to one or more of the outer surfaces 68 of the plurality of vacuum tank skin segments 70, or coupled to one or more of the outer surfaces 68 and one or more of the inner surfaces 69 of the vacuum tank skin segments 70. The one or more single purpose stiffener members 104 comprise one or more single purpose (SP) stringers 106 (see FIG. 2), one or more single purpose beams, one or more single purpose longitudinal supports, or other suitable single purpose stiffener members. As shown in FIG. 2, each single purpose stringer 106 comprises a box stringer 106a, a plank stringer 106b, a blade stringer 106c, a hat stringer 106d, a T-shaped stringer 106e, a C-shaped stringer 106f, a J-shaped stringer 106g, or another suitable single purpose stringer, such as an I-shaped stringer, an L-shaped stringer, or a U-shaped stringer. In one version, the single purpose stiffener members 104, such as the single purpose stringers 106, may be all of the same type of single purpose stiffener members 104, such as single purpose stringers 106. In other versions, the single purpose stiffener members 104, such as the single purpose stringers 106, may be two or more different types of single purpose stiffener members 104, such as single purpose stringers 106. In one version, the single purpose stiffener members 104, such as the single purpose stringers 106, are all the same size. In other versions, the single purpose stiffener members 104, such as the single purpose stringers 106, are not all the same size and one or more may be different sizes.

The vacuum tank skin 66 and the multipurpose stiffener members 98, such as the multipurpose stringers 100, and if present, the single purpose stiffener members 104, such as the single purpose stringers 106, are configured to carry structural load(s) 109 (see FIG. 2). The structural load(s) 109 can include axial loads 111 (see FIG. 2) which enable the fuselage 16 (see FIG. 1) to carry bending load(s) 110 (see FIG. 2), such as fuselage bending load(s) 110a (see FIG. 2), and axial load(s) 111 (see FIG. 2) such as tension or compression. For aircraft 14, the vacuum tank skin 66 and the multipurpose stringers 100, and if present, the single purpose stringers 106, are configured to carry bending loads 110, such as a fuselage bending loads 110a. The vacuum tank skin 66 alone is unable to carry the longitudinal loads, which enable the fuselage 16 (see FIG. 1) to carry the fuselage bending loads 110a, as it is a mechanism and may collapse and compress or expand similar to an accordion. However, combining the multipurpose stiffener members 98, such as the multipurpose stringers 100, and if present, the single purpose stiffener members 104, such as the single purpose stringers 106, with the vacuum tank skin 66 provides sufficient stiffness to carry the bending loads 110, such as the fuselage bending loads 110a. The multipurpose stiffener members 98, such as the multipurpose stringers 100, and if present, the single purpose stiffener members 104, such as the single purpose stringers 106, also carry the longitudinal load and locally stiffen the vacuum tank skin 66 in the area of the multipurpose stiffener members 98, such as the multipurpose stringers 100, and if present, the single purpose stiffener members 104, such as the single purpose stringers 106, so that there is an effective width phenomenon occurring. Thus, the vacuum tank skin 66 carries external pressure loads 40 and flight loads 42, and the multipurpose stiffener members 98, such as the multipurpose stringers 100, and if present, the single purpose stiffener members 104, such as the single purpose stringers 106, carry flight loads 42 and longitudinal load by means of carrying a small portion of the longitudinal load carried by the combination of the vacuum tank skin 66 and the multipurpose stiffener members 98, such as the multipurpose stringers 100, and if present, the single purpose stiffener members 104, such as the single purpose stringers 106. The effective width phenomenon is only active if the single purpose stringers 106 are substantially continuously attached to the vacuum tank skin 66 in the longitudinal direction. Single purpose stringers 106 such as blade stringers 106c (see FIG. 3D) function this way, but the plank stringers 106b (see FIG. 3C) do not as the plank stringers 106b would likely be attached to the vacuum tank skin 66 only at the crest locations.

The step 382 of providing the segmented vacuum jacketed tank system 10 further comprises providing the segmented vacuum jacketed tank system 10 comprising the segmented structurally integrated vacuum tank 11 integrated with the structure 12 comprising an aircraft 14 (see FIGS. 1, 2) with a fuselage 16 (see FIG. 1) having a plurality of fuselage barrel sections 18 (see FIG. 1), where the segmented structurally integrated vacuum tank 11 is structurally integrated with the fuselage 16. The fuselage 16 has an outer aero skin 20 (see FIGS. 1, 3A) at a fuselage mold line 22 (see FIGS. 1, 3A), and the outer aero skin 20 is coupled to an exterior side 115a (see FIG. 3A) of each of the plurality of multipurpose stiffener members 98 (see FIGS. 2, 3A, 4A, 5A, 6A), such as the plurality of multipurpose stringers 100 (see FIGS. 2, 3A, 4A, 5A, 6A).

The segmented structurally integrated vacuum tank 11 may be configured without the outer aero skin 20, in an omitted outer aero skin configuration 21 (see FIG. 11C), so that the vacuum tank skin 66 and the multipurpose stiffener members 98, such as the multipurpose stringers 100, are exposed to an air flow 84b (see FIGS. 2, 11C) of air 84 (see FIG. 2), such as ambient air 84a (see FIG. 2).

The segmented structurally integrated vacuum tank 11 comprises a single integrated structure 34 (see FIG. 2) that integrates or combines vacuum tank structure 36 (see FIG. 1) with portions of the structure 12, such as a fuselage structure 38 (see FIG. 1) of the fuselage 16 (see FIG. 1) for an aircraft 14. The segmented structurally integrated vacuum tank 11 has a dual function of a separate vacuum tank and one of the plurality of fuselage barrel sections 18 (see FIG. 1), for example, the aft fuselage barrel section 18a (see FIG. 1), but without requiring a separate vacuum tank and a separate fuselage structure arrangement. The segmented structurally integrated vacuum tank 11 further provides clearance elimination 44 (see FIG. 2) that results in improved volume ratio 46 (see FIG. 2) and a greater potential for reduced cost due to the elimination of separate fuselage structure. Further, the clearance elimination 44 provides weight reduction of the structure 12.

The step 382 of providing the segmented vacuum jacketed tank system 10 further comprises providing the segmented vacuum jacketed tank system 10 comprising the pressure tank 116 further comprising an internal structure 134 (see FIGS. 4A, 5A, 7-9) in an interior 120 (see FIGS. 2, 4A, 5A, 7-9) of the pressure tank 116, the internal structure 134 comprising one or more interior shear walls 135 (see FIGS. 2, 4A, 5A, 7-9) forming two or more interior sections 136 (see FIGS. 4A, 5A, 7-9), and further wherein each of the one or more interior shear walls 135 comprises a flat sheet 140 (see FIG. 2), a tension structure 142 (see FIG. 2), a wire 144 (see FIG. 2), a truss structure 145 (see FIG. 2), or another suitable interior shear wall structure.

The segmented vacuum jacketed tank system 10, such as the segmented structurally integrated vacuum jacketed tank system 10a, further comprises a pressure tank 116 (see FIGS. 2, 3A), such as an internal pressure tank 116a (see FIGS. 2, 3A), mounted within the segmented structurally integrated vacuum tank 11. The pressure tank 116 stores or contains a cryogenic fluid 48 (see FIG. 2) and comprises a pressure tank main portion 122 (see FIG. 3A) extending between pressure tank end portions 123 (see FIG. 3A). The pressure tank 116 stores and contains the stored cryogenic fluid 48 (see FIGS. 2, 3B-3D), such as liquid hydrogen 50 (see FIGS. 2, 3B-3D), liquid natural gas 52 (see FIG. 2), or another suitable cryogenic fluid 48. The pressure tank main portion 122 comprises a pressure tank skin 124 (see FIGS. 4A, 5A, 7-9) having an outer surface 125 (see FIGS. 4A, 5A, 7-9) and an inner surface 126 (see FIG. 4A, 5A, 7-9).

The segmented vacuum jacketed tank system 10, such as the segmented structurally integrated vacuum jacketed tank system 10a, further comprises a vacuum cavity 148 (see FIGS. 2, 3A) that forms a gap 150 (see FIGS. 2, 3A) formed between the vacuum tank inner surface 132b of the segmented structurally integrated vacuum tank 11 and the pressure tank outer surface 130a of the pressure tank 116. The size of the gap 150 is a consequence of the geometry and design of the segmented structurally integrated vacuum tank 11 and the pressure tank 116.

As shown in FIG. 15, the method 380 further comprises the step 384 of adding in and through an interior 101 of one or more of the one or more multipurpose stiffener members 98 (see FIG. 2), such as multipurpose stringers 100 (see FIG. 2), one or more of one or more system transport lines 102 (see FIG. 2), a liquid fuel 318 (see FIG. 2), or a nitrogen gas 324 (see FIG. 2). The step 384 of adding the one or more system transport lines 102 further comprises adding the one or more system transport lines 102 comprising, as shown in FIG. 2, one or more of one or more fuel lines 102a, one or more electrical lines 102b, one or more electrical signal lines 102c, one or more hydraulic lines 102d, one or more pneumatic lines 102e, one or more compressed air lines 102f, one or more power lines 102g, one or more lighting lines 102h, one or more auxiliary power unit lines 102i, one or more data bus lines 102j, and other suitable system transport lines 102.

For aircraft 14 (see FIG. 1), the one or more system transport lines 102 are for various systems on the aircraft 14, for example, electrical systems, hydraulic systems, pneumatic systems, environmental systems, and other suitable systems. For aircraft 14, the multipurpose stiffener members 98, such as the multipurpose stringers 100, allow the one or more system transport lines 102 to run from a forward location forward of the multipurpose stiffener members 98, such as the multipurpose stringers 100, and forward of the segmented structurally integrated vacuum tank 11, to run and pass through the interior 101 of the multipurpose stiffener members 98, such as the multipurpose stringers 100, and to run to an aft location aft of the multipurpose stiffener members 98, such as the multipurpose stringers 100, and aft of the segmented structurally integrated vacuum tank 11, such as to the tail 28 (see FIG. 1) of the aircraft 14.

As shown in FIG. 15, the method 380 further comprises the step 386 of using the segmented vacuum jacketed tank system 10 to carry one or more of the one or more system transport lines 102, the liquid fuel 318, or the nitrogen gas 324 in the structure 12, and to maximize the volume 54 (see FIG. 2) of the cryogenic fluid 48 stored or contained in the pressure tank 116.

Figure 16:
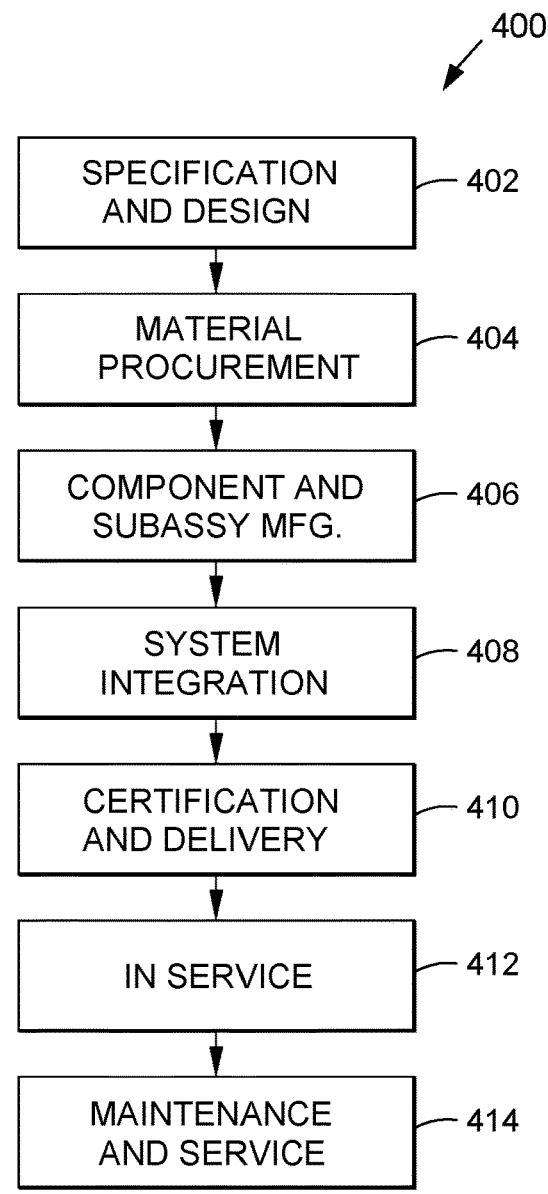
FIG. 16 is an illustration of a flow diagram of an exemplary aircraft manufacturing and service method.
Figure 17:
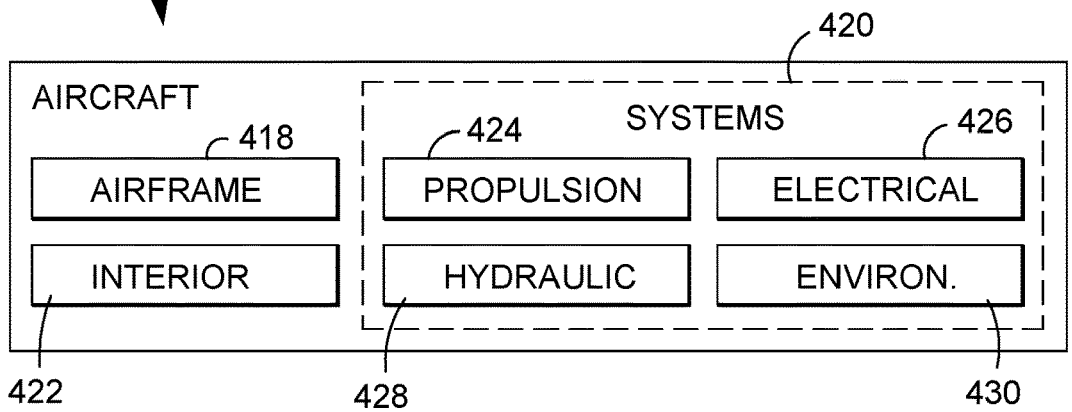
FIG. 17 is an illustration of an exemplary block diagram of an aircraft.

Now referring to FIGS. 16 and 17, FIG. 16 is an illustration of a flow diagram of an exemplary aircraft manufacturing and service method 400, and FIG. 17 is an illustration of an exemplary block diagram of an aircraft 416. Referring to FIGS. 16 and 17, versions of the disclosure may be described in the context of the aircraft manufacturing and service method 400 as shown in FIG. 16, and the aircraft 416 as shown in FIG. 17.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 17, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the segmented vacuum jacketed tank system 10 (see FIGS. 1, 2) with the segmented structurally integrated vacuum tank 11 (see FIGS. 1, 2), the aircraft 14 (see FIGS. 1, 2) implementing the segmented vacuum jacketed tank system 10 with the segmented structurally integrated vacuum tank 11, and the method 380 (see FIG. 15) provide for one or more multipurpose stiffener members 98 (see FIGS. 2, 4A, 5A, 6A, 7-9), such as one or more multipurpose mega-stiffener members 98a (see FIGS. 4A, 5A), for example, one or more multipurpose stringers 100 (see FIGS. 2, 4A, 5A, 6A, 7-9), such as one or more multipurpose mega-stringers 100c (see FIGS. 4A, 5A), each coupled between two of a plurality of vacuum tank skin segments 70 (see FIGS. 2, 4A, 5A, 6A, 7-9), and configured to carry, and carrying, a plurality of system transport lines 102 (see FIGS. 2, 6A-6D) in an interior 101 (see FIGS.

6A-6D, 7-9) of the multipurpose stiffener members 98, such as the multipurpose stiffener members 98. The multipurpose mega-stiffener members 98a, such as the multipurpose mega-stringers 100c, enable a segmented structurally integrated vacuum tank 11 arrangement that allows for improved integration of the system transport lines 102 with the structural configuration.

In addition, disclosed versions of the segmented vacuum jacketed tank system 10 (see FIGS. 1, 2) with the segmented structurally integrated vacuum tank 11 (see FIGS. 1, 2), the aircraft 14 (see FIGS. 1, 2) implementing the segmented vacuum jacketed tank system 10 with the segmented structurally integrated vacuum tank 11, and the method 380 (see FIG. 15) provide a design with very few, e.g., typically 2-8, multipurpose stiffener members 98, such as multipurpose stringers 100, due to the large size of the multipurpose stiffener members 98, such as the multipurpose stringers 100. A total number, e.g., 2-20, of large multipurpose stiffener members 98, such as multipurpose stringers 100, for example, multipurpose mega-stringers 100c, used with the segmented structurally integrated vacuum tank 11 is much less than a total number, e.g., 30-60, of smaller regular or standard stiffener members or stringers used with known fuselage and tank structures. The multipurpose mega-stiffener members 98a, such as the multipurpose mega-stringers 100c, can be structurally compact. Concentrating the bending material of the fuselage 16 (see FIG. 1) into fewer stiffener members enables that material to be concentrated into fewer stiffener members, thus allowing the walls of the structural multipurpose mega-stiffener member 98a feature to be thicker. More compact sections, such as with the multipurpose mega-stiffener members 98a, for example, the multipurpose mega-stringers 100c, have the potential to be more weight-efficient.

The primary components of the segmented structurally integrated vacuum tank 11 are the multipurpose stiffener members 98, such as the multipurpose stringers 100, and the vacuum tank skin 66 comprising vacuum tank skin segments 70 each coupled between two multipurpose stiffener members 98, such as multipurpose stringers 100. No frames, as is common for semi-monocoque structure, are needed. The multipurpose stiffener members 98, such as the multipurpose stringers 100, are designed and sized to carry flight loads 42 (see FIG. 2) and fuselage bending loads 110a (see FIG. 2). The multipurpose stiffener members 98, such as the multipurpose stringers 100, are larger in size than standard size stiffener members or stringers, and the multipurpose stiffener members 98, such as the multipurpose stringers 100, have an interior 101 (see FIGS. 7-9) that is hollow and configured to hold or carry one or more system transport lines 102 in and through the interior 101 to connect tail systems in the tail 28 (see FIG. 1) of an aircraft 14 (see FIG. 1) to other systems elsewhere in the aircraft 14. For aircraft 14, the multipurpose stiffener members 98, such as the multipurpose stringers 100, allow the system transport lines 102 to run from a forward location forward of the multipurpose stiffener members 98, such as the multipurpose stringers 100, and forward of the segmented structurally integrated vacuum tank 11, through the interior 101 of the multipurpose stiffener members 98, such as the multipurpose stringers 100, and to an aft location aft of the multipurpose stiffener members 98, such as the multipurpose stringers 100, and aft of the segmented structurally integrated vacuum tank 11, such as to the tail 28 (see FIG. 1) of the aircraft 14. The multipurpose stiffener members 98, such as the multipurpose stringers 100, may also offer a degree of protection for those systems.

In addition, for aircraft 14, one of the multipurpose stiffener members 98 comprises the bottommost centered multipurpose stiffener member 98b (see FIG. 7) equipped with the tail skid attachment fitting 206 (see FIG. 7) coupled to the exterior side 115a (see FIG. 7) of the bottommost centered multipurpose stiffener member 98b. A tail skid 207 (see FIG. 7) is coupled, or attached, to the tail skid attachment fitting 206. The tail skid 207 is used against, or to prevent, a tail strike which occurs when the tail 28 (see FIG. 1) of the aircraft 14 (see FIG. 1) strikes the ground or other stationary object on takeoff or landing of the aircraft 14. Tail strike is one condition that must be considered, and for a hydrogen tank, it may be especially critical. The segmented structurally integrated vacuum tank 11 provides a natural or optimum location to position and attach the tail skid attachment fitting 206 and the tail skid 207 coupled, or attached, to the tail skid attachment fitting 206.

Moreover, disclosed versions of the segmented vacuum jacketed tank system 10 (see FIGS. 1, 2) with the segmented structurally integrated vacuum tank 11 (see FIGS. 1, 2), the aircraft 14 (see FIGS. 1, 2) implementing the segmented vacuum jacketed tank system 10 with the segmented structurally integrated vacuum tank 11, and the method 380 (see FIG. 15) provide, in one version, a segmented vacuum jacketed lobed shaped tank system 10d (see FIG. 7) with the pressure tank 116, such as the internal pressure tank 116a, having two (2) to six (6), or more, interior sections 136, such as lobed interior sections 136a. In particular, having six (6) lobed interior sections 136a has advantages for both the internal pressure tank 116a and the external segmented structurally integrated vacuum tank 11a, such as for example, having six (6) lobed interior sections 136a provides a decreased radius of curvature for internal walls 218 (see FIG. 7) of the internal pressure tank 116a (see FIG. 7) of the external segmented structurally integrated vacuum tank 11a. For the internal pressure tank 116a, having a decreased radius of curvature is advantageous because a smaller radius of curvature results in lower hoop tension stresses in the pressure tank skin 124. For the external segmented structurally integrated vacuum tank 11a, having a decreased radius of curvature is advantageous because the decreased radius of curvature helps to decrease the buckling load, as does the reduced distance between the multipurpose stiffener members 98, which act as supports to the vacuum tank skin 66. In addition, having six (6) lobed interior sections 136a provides a more redundant fuselage structure. The magnitude of the radii corresponding to the trough location and the crest location of the vacuum tank skin 66 at the location approximately mid-way circumferentially between the multipurpose stiffener members 98, such as the multipurpose stringers 100, can be adjusted so that the buckling load of that arrangement is equivalent to the buckling load of an arrangement where these radii do not vary along the circumference 180 of the segmented structurally integrated vacuum tank 11. If one of the multipurpose stiffener members 98, such as the multipurpose stringers 100, is structurally compromised, the remaining five (5) multipurpose stiffener members 98, such as the remaining five (5) multipurpose stringers 100, are more capable of carrying the flight loads 42 (see FIG. 1). Further, having six (6) lobed interior sections 136a may provide an improved integration with aircraft structure or systems, and provides a decreased circumferential length for the external walls 220 (see FIG. 7) of the external segmented structurally integrated vacuum tank 11a between the multipurpose stiffener members 98, such as the multipurpose stringers 100. A decreased circumferential length has a positive effect upon the buckling load.

In addition, disclosed versions of the segmented vacuum jacketed tank system 10 (see FIGS. 1, 2) with the segmented structurally integrated vacuum tank 11 (see FIGS. 1, 2), the aircraft 14 (see FIGS. 1, 2) implementing the segmented vacuum jacketed tank system 10 with the segmented structurally integrated vacuum tank 11, and the method 380 (see FIG. 15) provide a single integrated structure 34 (see FIG. 2) where instead of having a separate vacuum tank that is located and supported by fuselage structure 38 (see FIG. 1) and the vacuum tank structure 36 (see FIG. 1) are one integrated structure. For aircraft 14, the segmented structurally integrated vacuum tank 11 combines vacuum tank function and fuselage barrel structure into one structure. The single integrated structure 34 of the segmented structurally integrated vacuum tank 11 has a reduced weight and may result in reduced costs to manufacture, and the elimination of the clearance required between the fuselage 16 (see FIG. 1) and a known vacuum tank in a conventional arrangement results in an improved volume ratio 46 (see FIG. 2). The single integrated structure 34 of the segmented structurally integrated vacuum tank 11 with the vacuum tank skin 66 and the multipurpose stiffener members 98, such as the multipurpose stringers 100, carries both the external pressure loads 40 (see FIG. 2) and the flight loads 42 (see FIG. 2).

Further, the segmented structurally integrated vacuum tank 11 (see FIGS. 1, 2, 3A, 4A, 5A, 6A), provides for an efficient storage of cryogenic fluid 48 (see FIG. 2), such as liquid hydrogen 50 (see FIG. 2), liquid natural gas 52 (see FIG. 2), or another suitable cryogenic fluid 48, in the structure 12, such as the aircraft 14, for example, the fuselage 16 of the aircraft 14, without requiring separate fuselage structure and a separate vacuum tank. The efficient storage of the cryogenic fluid 48 in the structure 12, such as the aircraft 14, enables increased efficiency for hydrogen-powered aircraft 14a (see FIG. 2). In addition, disclosed versions of the segmented structurally integrated vacuum tank 11 (see FIGS. 1, 2, 3A, 4A, 5A, 6A), simplify the structure for the hydrogen tanks and liquid natural gas tanks, which may result in a lower cost of manufacturing. The single integrated structure 34 of the segmented structurally integrated vacuum tank 11 increases the volume 54 (see FIG. 2) and maximizes the volume 54 of the internal pressure tank 116a (see FIG. 3A) for storing cryogenic fluid 48 (see FIG. 3B) and increases an amount of cryogenic fluid 48 that can be stored or contained in the internal pressure tank 116a.

Moreover, by combining the vacuum tank skin 66 with the multipurpose stiffener members 98 (see FIGS. 2, 4A, 5A, 6A), such as the multipurpose stringers 100 (see FIGS. 2, 4A, 5A, 6A), to form the segmented structurally integrated vacuum tank 11 (see FIG. 2), the segmented structurally integrated vacuum tank 11 is able to carry structural loads 109 (see FIG. 2), such as fuselage bending loads 110a (see FIG. 2), such as when the structure 12 (see FIG. 2) comprises an aircraft 14 (see FIGS. 1, 2). In addition, the multipurpose stiffener members 98, such as the multipurpose stringers 100, of the segmented structurally integrated vacuum tank 11 do not require attachment to fuselage frames, thus eliminating the need for such fuselage frame attachments for these multipurpose stiffener members 98, such as multipurpose stringers 100. The elimination of such fuselage frame and fuselage frame attachments may result in decreased weight of the aircraft 14 and decreased overall part count in the manufacturing of the aircraft 14. Moreover, in one version, the vacuum tank skin 66 of the segmented structurally integrated vacuum tank 11 comprising the vacuum tank skin segments 70 (see FIG. 2) has the advantages of being simple and inexpensive to manufacture, easy to join together, light in weight, and providing stability. Further, the undulating skin of the vacuum tank skin 66 in the form of the corrugated solid skin 96 (see FIG. 6E), or corrugated solid panel, precludes buckling under external pressure loading. The corrugated solid skin 96, or corrugated solid panel, takes static loads, including external pressure loads 40 (see FIG. 2), and takes fuselage torsional moment when the structure 12 comprises an aircraft 14. Further, the corrugated solid skin 96, or corrugated solid panel, provides an opportunity for advantageous area fraction due to relatively thin vacuum tank skin 66 structure. The increased effective thickness of the corrugated solid skin 96, or corrugated solid panel, due to the corrugations 186 (see FIG. 6E), enables a higher buckling load.

In addition, disclosed versions of the segmented vacuum jacketed tank system 10 (see FIGS. 1, 2) with the segmented structurally integrated vacuum tank 11 (see FIGS. 1, 2), the aircraft 14 (see FIGS. 1, 2) implementing the segmented vacuum jacketed tank system 10 with the segmented structurally integrated vacuum tank 11, and the method 380 (see FIG. 15) provide a vacuum tank skin 66 (see FIGS. 2, 4A, 5A, 6A) comprising the plurality of vacuum tank skin segments 70, where the vacuum tank skin 66 has the longitudinal cross section 74 (see FIGS. 2, 4A, 5A, 6A) with the profile geometry 76 (see FIGS. 2, 4A, 5A, 6A) for buckling prevention 78 (see FIG. 2) for the vacuum tank skin 66 under external pressure loads 40 (see FIG. 2). Further, the vacuum tank skin 66 provides a pressure barrier 80 (see FIG. 2) between an outside ambient pressure 82 (see FIG. 2) and a vacuum 60 (see FIG. 2) in an interior 58 (see FIG. 2) of the vacuum tank main portion 62. In addition, the multipurpose stringers 100, such as in the form of multipurpose box stringers 100a, may further include one or more sealing elements 285 (see FIG. 11A), including an externally applied sealing element 285a (see FIG. 11A), a rubber grommet sealing element 285b (see FIG. 11A), a fayed surface sealing element (not shown), or another suitable sealing element.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A segmented vacuum jacketed tank system, comprising:
a segmented structurally integrated vacuum tank having a vacuum tank main portion extending between vacuum tank end portions, the vacuum tank main portion comprising:
a vacuum tank skin having an outer surface with outer surface portions and an inner surface with inner surface portions, the vacuum tank skin comprising a plurality of vacuum tank skin segments, and having a longitudinal cross section with a profile geometry configured for buckling prevention for the vacuum tank skin under external pressure loads; and one or more multipurpose longerons, each coupled between two of the plurality of vacuum tank skin segments, and each coupled to at least two of the outer surface portions and at least two of the inner surface portions, the one or more multipurpose longerons each having an interior volume that is substantially hollow to accommodate and hold one or more of one or more system transport lines, a liquid fuel, or a nitrogen gas;

a pressure tank mounted within the segmented structurally integrated vacuum tank, and attached to an interior of the segmented structurally integrated vacuum tank, via a forward tank attach fitting and an aft tank attach fitting, the pressure tank configured to store a cryogenic fluid and comprising a pressure tank main portion extending between pressure tank end portions, the pressure tank main portion comprising a pressure tank skin having an outer surface and an inner surface; and a vacuum cavity formed between the segmented structurally integrated vacuum tank and the pressure tank, the vacuum cavity forming a gap between a pressure tank outer surface of the pressure tank, and a vacuum tank inner surface of the segmented structurally integrated vacuum tank, such that the pressure tank is not in direct contact with both the vacuum tank skin and the one or more multipurpose longerons.

2. The segmented vacuum jacketed tank system of claim 1, wherein the vacuum tank skin comprises the plurality of vacuum tank skin segments in a range of two vacuum tank skin segments to eight vacuum tank skin segments.

3. The segmented vacuum jacketed tank system of claim 1, wherein the profile geometry of the longitudinal cross section of the vacuum tank skin has a shape comprising one or more of a corrugated shape, a sinusoidal shape, a superimposed curves shape, a symmetrical shape, a non-symmetrical shape, a pointed corner shape, a hat shape, or a fractal shape.

4. The segmented vacuum jacketed tank system of claim 1, wherein the one or more multipurpose longerons comprise one or more multipurpose mega-stringers.

5. The segmented vacuum jacketed tank system of claim 1, wherein the one or more multipurpose longerons comprise a range of one multipurpose longeron to eight multipurpose longerons.

6. The segmented vacuum jacketed tank system of claim 1, wherein one of the one or more multipurpose longerons comprises a bottommost centered multipurpose longeron having a tail skid attachment fitting coupled to an exterior side of the bottommost centered multipurpose longeron, the tail skid attachment fitting coupled to a tail skid.

7. The segmented vacuum jacketed tank system of claim 1, wherein the vacuum tank main portion further comprises one or more single purpose longerons coupled to one or more of the outer surface portions of the plurality of vacuum tank skin segments.

8. The segmented vacuum jacketed tank system of claim 1, wherein the one or more system transport lines comprise one or more of one or more fuel lines, one or more electrical lines, one or more electrical signal lines, one or more hydraulic lines, one or more pneumatic lines, one or more compressed air lines, one or more power lines, one or more lighting lines, one or more auxiliary power unit lines, or one or more data bus lines.

9. The segmented vacuum jacketed tank system of claim 1, wherein the pressure tank further comprises an internal structure in an interior of the pressure tank, the internal structure comprising one or more interior shear walls forming two or more interior sections.

10. The segmented vacuum jacketed tank system of claim 9, wherein each of the one or more interior shear walls of the internal structure comprises a flat sheet, a tension structure, a wire, or a truss structure.

11. The segmented vacuum jacketed tank system of claim 9, wherein the one or more interior shear walls of the internal structure support anti-slosh baffles.

12. The segmented vacuum jacketed tank system of claim 1, wherein:

the outer surface and the inner surface of the vacuum tank skin, and the outer surface and the inner surface of the pressure tank skin have a circular shape;

the outer surface and the inner surface of the vacuum tank skin, and the outer surface and the inner surface of the pressure tank skin have a lobed shape; or the outer surface of the vacuum tank skin has the circular shape, and the inner surface of the vacuum tank skin and the outer surface and the inner surface of the pressure tank skin have the lobed shape.

13. An aircraft, comprising:

a fuselage with a plurality of fuselage barrel sections, and an outer aero skin at a fuselage mold line; and a segmented vacuum jacketed tank system, comprising:

a segmented structurally integrated vacuum tank integrated with the fuselage, the segmented structurally integrated vacuum tank having a vacuum tank main portion extending between vacuum tank end portions, the vacuum tank main portion comprising:

a vacuum tank skin having an outer surface with outer surface portions and an inner surface with inner surface portions, the vacuum tank skin comprising a plurality of vacuum tank skin segments, and having a longitudinal cross section with a profile geometry configured for buckling prevention for the vacuum tank skin under external pressure loads; and one or more multipurpose stringers longerons, each coupled between two of the plurality of vacuum tank skin segments, each coupled to at least two of the outer surface portions and at least two of the inner surface portions, and each coupled to the outer aero skin, the one or more multipurpose longerons each having an interior volume that is substantially hollow to accommodate and hold one or more of one or more system transport lines, a liquid fuel, or a nitrogen gas;

a pressure tank mounted within the segmented structurally integrated vacuum tank, and attached to an interior of the segmented structurally integrated vacuum tank, via a forward tank attach fitting and an aft tank attach fitting, the pressure tank configured to store a cryogenic fluid and comprising a pressure tank main portion extending between pressure tank end portions, the pressure tank main portion comprising a pressure tank skin having an outer surface and an inner surface; and a vacuum cavity formed between the segmented structurally integrated vacuum tank and the pressure tank, the vacuum cavity forming a gap between a pressure tank outer surface of the pressure tank, and a vacuum tank inner surface of the segmented structurally integrated vacuum tank, such that the pressure tank is not in direct contact with both the vacuum tank skin and the one or more multipurpose longerons.

14. The aircraft of claim 13, wherein the segmented structurally integrated vacuum tank is configured without the outer aero skin in an omitted outer aero skin configuration, so that the vacuum tank skin and the one or more multipurpose longerons are exposed to an air flow.

15. The aircraft of claim 13, wherein the pressure tank further comprises an internal structure in an interior of the pressure tank, the internal structure comprising one or more interior shear walls forming two or more interior sections, and further wherein each of the one or more interior shear walls comprises a flat sheet, a tension structure, a wire, or a truss structure.

16. The aircraft of claim 13, wherein the cryogenic fluid comprises one of:
    liquid hydrogen; or
    liquid natural gas.

17. A method of using a segmented vacuum jacketed tank system in a structure, the method comprising the steps of:
    providing the segmented vacuum jacketed tank system comprising:
        a segmented structurally integrated vacuum tank integrated with the structure, the segmented structurally integrated vacuum tank having a vacuum tank main portion extending between vacuum tank end portions, the vacuum tank main portion comprising:
            a vacuum tank skin having an outer surface with outer surface portions and an inner surface with inner surface portions, the vacuum tank skin comprising a plurality of vacuum tank skin segments, and having a longitudinal cross section with a profile geometry configured for buckling prevention for the vacuum tank skin under external pressure loads; and
            one or more multipurpose longerons, each coupled between two of the plurality of vacuum tank skin segments, and each coupled to at least two of the outer surface portions and at least two of the inner surface portions, the one or more multipurpose longerons each having an interior volume that is substantially hollow to accommodate and hold one or more of one or more system transport lines, a liquid fuel, or a nitrogen gas; and
        a pressure tank mounted within the segmented structurally integrated vacuum tank, and attached to an interior of the segmented structurally integrated vacuum tank, via a forward tank attach fitting and an aft tank attach fitting, the pressure tank storing a cryogenic fluid and comprising a pressure tank main portion extending between pressure tank end portions, the pressure tank main portion comprising a pressure tank skin having an outer surface and an inner surface; and
        a vacuum cavity formed between the segmented structurally integrated vacuum tank and the pressure tank, the vacuum cavity forming a gap between a pressure tank outer surface of the pressure tank, and a vacuum tank inner surface of the segmented structurally integrated vacuum tank, such that the pressure tank is not in direct contact with both the vacuum tank skin and the one or more multipurpose longerons;
    adding in and through the interior volume of one or more of the one or more multipurpose longerons one or more of the one or more system transport lines, the liquid fuel, or the nitrogen gas; and
    using the segmented vacuum jacketed tank system to carry one or more of the one or more system transport lines, the liquid fuel, or the nitrogen gas, in the structure, and to maximize a volume of the cryogenic fluid stored in the pressure tank.

18. The method of claim 17, wherein the step of providing the segmented vacuum jacketed tank system further comprises:
    providing the segmented vacuum jacketed tank system comprising the segmented structurally integrated vacuum tank integrated with the structure comprising an aircraft with a fuselage having a plurality of fuselage barrel sections, where the segmented structurally integrated vacuum tank is integrated with the fuselage, the fuselage having an outer aero skin at a fuselage mold line, and the outer aero skin coupled to an exterior side of each of the one or more multipurpose longerons.

19. The method of claim 17, wherein the step of providing the segmented vacuum jacketed tank system further comprises:
    providing the segmented vacuum jacketed tank system comprising the pressure tank further comprising an internal structure in an interior of the pressure tank, the internal structure comprising one or more interior shear walls forming two or more interior sections, and further wherein each of the one or more interior shear walls comprises a flat sheet, a tension structure, a wire, or a truss structure.

20. The method of claim 17, wherein the step of adding one or more of the one or more system transport lines further comprises:
    adding the one or more system transport lines comprising one or more of one or more fuel lines, one or more electrical lines, one or more electrical signal lines, one or more hydraulic lines, one or more pneumatic lines, one or more compressed air lines, one or more power lines, one or more lighting lines, one or more auxiliary power unit lines, and one or more data bus lines.

* * * * *

UNITED STATES PATENT AND TRADEMARK OFFICE
CERTIFICATE OF CORRECTION

Page 1 of 1

PATENT NO. : 12,287,067 B2
APPLICATION NO. : 18/336991
DATED : April 29, 2025
INVENTOR(S) : Robert E. Grip, Aaron J. Kutzmann and Nathaniel J. Noel It is certified that error appears in the above-identified patent and that said Letters Patent is hereby corrected as shown below:

In the Claims

Column 66, Claim 13, Line 41: Please delete the word "stringers" after the word "multipurpose".

Signed and Sealed this
Twenty-seventh Day of May, 2025

Coke Morgan Stewart
*Acting Director of the United States Patent and Trademark Office*